US012560287B2

(12) United States Patent
Jiang et al.

(10) Patent No.: US 12,560,287 B2
(45) Date of Patent: Feb. 24, 2026

(54) LED FILAMENT AND LIGHT BULB USING THE SAME

(71) Applicant: JIAXING SUPER LIGHTING ELECTRIC APPLIANCE CO., LTD, Jiaxing (CN)

(72) Inventors: Tao Jiang, Jiaxing (CN); Ronghuan Yang, Jiaxing (CN); Zhikun Wang, Jiaxing (CN); Jianjun Ding, Jiaxing (CN); Chihshan Yu, Jiaxing (CN); Heng Zhao, Jiaxing (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 0 days.

(21) Appl. No.: 19/019,468

(22) Filed: Jan. 14, 2025

(65) Prior Publication Data

US 2025/0172256 A1 May 29, 2025

Related U.S. Application Data

(63) Continuation-in-part of application No. PCT/CN2023/122455, filed on Sep. 28, 2023, and a (Continued)

(30) Foreign Application Priority Data

Sep. 28, 2014 (CN) ......................... 201410510593.6
Feb. 1, 2015 (CN) ......................... 201510053077.X
Jun. 10, 2015 (CN) ......................... 201510316656.9
Jun. 19, 2015 (CN) ......................... 201510347410.8
Aug. 7, 2015 (CN) ......................... 201510489363.0
Aug. 17, 2015 (CN) ......................... 201510502630.3
Sep. 2, 2015 (CN) ......................... 201510555889.4
Dec. 19, 2015 (CN) ......................... 201510966906.3
Apr. 27, 2016 (CN) ......................... 201610272053.0
(Continued)

(51) Int. Cl.
*F21K 9/232* (2016.01)
*F21K 9/235* (2016.01)
(Continued)

(52) U.S. Cl.
CPC .............. *F21K 9/232* (2016.08); *F21K 9/235* (2016.08); *F21K 9/238* (2016.08); *F21V 3/10* (2018.02);
(Continued)

(58) Field of Classification Search
CPC . F21K 9/238; F21K 9/237; F21K 9/64; F21K 9/232; F21Y 2107/00;
(Continued)

(56) References Cited

U.S. PATENT DOCUMENTS 8,750,671 B1 * 6/2014 Kelly ..................... F21V 7/005
362/628

* cited by examiner

*Primary Examiner* — William J Carter
(74) *Attorney, Agent, or Firm* — Simon Kuang Lu

(57) ABSTRACT

The LED filament includes an LED chip unit, a light conversion layer and electrodes. The light conversion layer covers the LED chip unit and parts of the electrodes. An outer surface of the light conversion layer is disposed with a layer body. The layer body covers the light conversion layer and at least covers parts of the electrodes. The layer body is provided with a chromogenic or light conversion material.

20 Claims, 54 Drawing Sheets

Related U.S. Application Data continuation-in-part of application No. 18/813,874, filed on Aug. 23, 2024, now Pat. No. 12,359,779, which is a continuation-in-part of application No. 18/642,164, filed on Apr. 22, 2024, now Pat. No. 12,313,227, which is a continuation of application No. 18/126,000, filed on Mar. 24, 2023, now Pat. No. 12,007,077, which is a continuation-in-part of application No. 17/408,519, filed on Aug. 23, 2021, now Pat. No. 11,686,436, which is a continuation-in-part of application No. 16/894,913, filed on Jun. 8, 2020, now Pat. No. 11,421,827, which is a continuation-in-part of application No. 16/748,070, filed on Jan. 21, 2020, now Pat. No. 10,784,428, which is a continuation-in-part of application No. 16/234,124, filed on Dec. 27, 2018, now Pat. No. 10,845,008, which is a continuation-in-part of application No. 15/858,036, filed on Dec. 29, 2017, now Pat. No. 10,544,905, which is a continuation-in-part of application No. 29/627,379, filed on Nov. 27, 2017, now Pat. No. Des. 879,330, and a continuation-in-part of application No. 29/619,287, filed on Sep. 28, 2017, now Pat. No. Des. 862,740, and a continuation-in-part of application No. 15/723,297, filed on Oct. 3, 2017, now Pat. No. 10,655,792, which is a continuation-in-part of application No. 15/168,541, filed on May 31, 2016, now Pat. No. 9,995,474, and a continuation-in-part of application No. 15/308,995, filed as application No. PCT/CN2015/090815 on Sep. 25, 2015, now Pat. No. 10,781,979, said application No. 15/723,297 is a continuation-in-part of application No. 15/499,143, filed on Apr. 27, 2017, now Pat. No. 10,240,724, which is a continuation-in-part of application No. 15/384,311, filed on Dec. 19, 2016, now Pat. No. 10,487,987, which is a continuation-in-part of application No. 15/366,535, filed on Dec. 1, 2016, now Pat. No. 10,473,271, and a continuation-in-part of application No. 15/237,983, filed on Aug. 16, 2016, now Pat. No. 10,228,093, said application No. 18/126,000 is a continuation-in-part of application No. 17/900,897, filed on Sep. 1, 2022, now Pat. No. 11,629,825, which is a continuation of application No. 17/356,576, filed on Jun. 24, 2021, now Pat. No. 11,525,547, which is a continuation of application No. 16/914,461, filed on Jun. 28, 2020, now Pat. No. 11,085,591, which is a continuation of application No. 16/840,469, filed on Apr. 6, 2020, now Pat. No. 10,711,951, which is a continuation of application No. 16/505,732, filed on Aug. 28, 2019, now Pat. No. 10,677,396, which is a continuation of application No. 15/858,036, filed on Dec. 29, 2017, now Pat. No. 10,544,905, which is a continuation-in-part of application No. 15/168,541, filed on May 31, 2016, now Pat. No. 9,995,474, said application No. 15/858,036 is a continuation-in-part of application No. 29/627, 379, filed on Nov. 27, 2017, now Pat. No. Des. 879,330, and a continuation-in-part of application No. 29/619,287, filed on Sep. 28, 2017, now Pat. No. Des. 862,740.

(30) Foreign Application Priority Data

| | | |
|---|---|---|
| Apr. 27, 2016 | (CN) | 201611041667.5 |
| Apr. 29, 2016 | (CN) | 201610281600.9 |
| Jun. 3, 2016 | (CN) | 201610394610.3 |
| Jul. 7, 2016 | (CN) | 201610544049.2 |
| Jul. 22, 2016 | (CN) | 201610586388.7 |
| Nov. 1, 2016 | (CN) | 201610936171.4 |
| Dec. 6, 2016 | (CN) | 201611108722.4 |
| Jan. 13, 2017 | (CN) | 201710024877.8 |
| Feb. 14, 2017 | (CN) | 201710079423.0 |
| Mar. 9, 2017 | (CN) | 201710138009.2 |
| Mar. 23, 2017 | (CN) | 201710180574.5 |
| Apr. 11, 2017 | (CN) | 201710234618.8 |
| May 8, 2017 | (CN) | 201710316641.1 |
| Sep. 18, 2017 | (CN) | 201710839083.7 |
| Sep. 21, 2017 | (CN) | 201730450712.8 |
| Sep. 22, 2017 | (CN) | 201730453237.X |
| Sep. 22, 2017 | (CN) | 201730453239.9 |
| Sep. 26, 2017 | (CN) | 201710883625.0 |
| Oct. 16, 2017 | (CN) | 201730489929.X |
| Oct. 27, 2017 | (CN) | 201730517887.6 |
| Oct. 27, 2017 | (CN) | 201730518659.0 |
| Oct. 30, 2017 | (CN) | 201730520672.X |
| Nov. 3, 2017 | (CN) | 201730537542.7 |
| Nov. 3, 2017 | (CN) | 201730537544.6 |
| Dec. 26, 2017 | (CN) | 201711434993.3 |
| Dec. 29, 2017 | (CN) | 201711477767.3 |
| Jan. 23, 2018 | (CN) | 201810065369.9 |
| Apr. 17, 2018 | (CN) | 201810031786.1 |
| Apr. 17, 2018 | (CN) | 201810344630.9 |
| May 23, 2018 | (CN) | 201810498980.0 |
| May 23, 2018 | (CN) | 201810501350.4 |
| Jun. 6, 2018 | (CN) | 201810573314.9 |
| Jul. 26, 2018 | (CN) | 201810836433.9 |
| Aug. 17, 2018 | (CN) | 201810943054.X |
| Aug. 30, 2018 | (CN) | 201811005145.5 |
| Aug. 30, 2018 | (CN) | 201811005536.7 |
| Sep. 17, 2018 | (CN) | 201811079889.1 |
| Oct. 30, 2018 | (CN) | 201811277980.4 |
| Oct. 31, 2018 | (CN) | 201811285657.1 |
| Nov. 19, 2018 | (CN) | 201811378173.1 |
| Nov. 19, 2018 | (CN) | 201811378189.2 |
| Dec. 18, 2018 | (CN) | 201811549205.X |
| Jan. 22, 2019 | (CN) | 201910060475.2 |
| Jun. 10, 2019 | (CN) | 201910497661.2 |
| Nov. 1, 2019 | (CN) | 201911057715.X |
| Dec. 5, 2019 | (CN) | 201911234236.0 |
| Aug. 24, 2020 | (CN) | 202010856691.0 |
| Sep. 1, 2020 | (CN) | 202010904065.4 |
| Sep. 3, 2020 | (CN) | 202010912636.9 |
| Nov. 20, 2020 | (CN) | 202011313059.8 |
| Jan. 27, 2021 | (CN) | 202110108853.7 |
| Jul. 9, 2021 | (CN) | 202110779145.6 |
| Sep. 30, 2022 | (CN) | 202211212294.5 |
| Dec. 14, 2022 | (CN) | 202211605516.X |
| Apr. 25, 2023 | (CN) | 202310467409.3 |
| May 30, 2023 | (CN) | 202310623145.6 |
| Sep. 8, 2023 | (CN) | 202311181286.3 |
| Sep. 12, 2023 | (CN) | 202311182111.4 |
| Sep. 20, 2023 | (CN) | 202311222851.6 |
| Oct. 23, 2023 | (CN) | 202311381406.4 |
| Jan. 29, 2024 | (CN) | 202410121595.X |

(51) Int. Cl.

| | |
|---|---|
| ***F21K 9/238*** | (2016.01) |
| ***F21V 3/10*** | (2018.01) |
| ***F21Y 107/00*** | (2016.01) |
| ***H05B 45/00*** | (2022.01) |
| *F21Y 107/20* | (2016.01) |
| *F21Y 107/70* | (2016.01) |
| *F21Y 115/10* | (2016.01) |

(52) U.S. Cl.
CPC .......... *H05B 45/00* (2020.01); *F21Y 2107/00* (2016.08); *F21Y 2107/20* (2016.08); *F21Y 2107/70* (2016.08); *F21Y 2115/10* (2016.08)

(58) Field of Classification Search
CPC .............. F21Y 2107/70; F21Y 2115/10; F21Y 103/10; F21Y 107/00; H01L 2924/181; F21V 23/06
See application file for complete search history.

LED FILAMENT AND LIGHT BULB USING THE SAME

CROSS-REFERENCE TO RELATED APPLICATIONS

This application is a continuation-in-part of International application number PCT/CN2023/122455 filed on 2023 Sep. 28, which claims priority to the following Chinese Patent Applications Nos: CN202211212294.5 filed on 2022 Sep. 30; CN202211605516.X filed on 2022 Dec. 14; CN202310467409.3 filed on 2023 Apr. 25; CN202310623145.6 filed on 2023 May 30; CN202311181286.3 filed on 2023 Sep. 8; CN202311182111.4 filed on 2023 Sep. 12; CN202311222851.6 filed on 2023 Sep. 20, the disclosures of which are incorporated herein in their entirety by reference.

This application is also a continuation-in-part of prior U.S. application Ser. No. 18/813,874 filed on 2024 Aug. 23, which is a continuation-in-part of prior U.S. application Ser. No. 18/642,164 filed on 2024 Apr. 22, which is a continuation-in-part of prior U.S. application Ser. No. 18/126,000 filed on 2023 Mar. 24. The prior applications are herewith incorporated by reference in its entirety.

The Ser. No. 18/126,000 is a continuation-in-part of prior U.S. application Ser. No. 17/408,519 filed on 2021 Aug. 23; Ser. No. 17/900,897 filed on 2022 Sep. 1; Ser. No. 16/894,913 filed on 2020 Jun. 8, and Ser. No. 16/234,124 filed on 2018 Dec. 27. The prior applications are herewith incorporated by reference in its entirety.

The Ser. No. 17/900,897 is a continuation application of prior U.S. application Ser. No. 17/356,576 filed on 2021 Jun. 24, which is a continuation application of prior U.S. application Ser. No. 16/914,461 filed on 2020 Jun. 28, which is a continuation application of prior U.S. application Ser. No. 16/840,469 filed on 2020 Apr. 6, which is a continuation application of prior U.S. application Ser. No. 16/505,732 filed on 2019 Aug. 28, which is a continuation application of prior U.S. application Ser. No. 15/858,036 filed on 2017 Dec. 29. The prior applications are herewith incorporated by reference in its entirety.

The Ser. No. 17/408,519 is a continuation-in-part of prior U.S. application Ser. No. 16/894,913 filed on 2020 Jun. 8, which is a continuation-in-part of prior U.S. application Ser. No. 16/748,070 filed on 2020 Jan. 21, which is a continuation-in-part of prior U.S. application Ser. No. 16/234,124 filed on 2018 Dec. 27. The prior applications are herewith incorporated by reference in its entirety.

The Ser. No. 16/234,124 is a continuation-in-part of prior U.S. application Ser. No. 15/858,036 filed on 2017 Dec. 29; Ser. No. 29/619,287 filed on 2017 Sep. 28; Ser. No. 29/627,379 filed on 2017 Nov. 27, and Ser. No. 15/723,297 filed on 2017 Oct. 3. The prior applications are herewith incorporated by reference in its entirety.

The Ser. No. 15/858,036 is a continuation-in-part of prior U.S. application Ser. No. 15/723,297 filed on 2017 Oct. 3; Ser. No. 29/619,287 filed on 2017 Sep. 28, and Ser. No. 29/627,379 filed on 2017 Nov. 27. The prior applications are herewith incorporated by reference in its entirety.

The Ser. No. 15/723,297 is a continuation-in-part of prior U.S. application Ser. No. 15/168,541 filed on 2016 May 31, Ser. No. 15/308,995 filed on 2016 Nov. 4, which is a 371 application of International application number PCT/CN2015/090815 filed on 2015 Sep. 25, and Ser. No. 15/499,143 filed on 2017 Apr. 27. The prior applications are herewith incorporated by reference in its entirety.

The Ser. No. 15/499,143 is a continuation-in-part of prior U.S. application Ser. No. 15/384,311 filed on 2016 Dec. 19, which is a continuation-in-part of prior U.S. application Ser. No. 15/366,535 filed on 2016 Dec. 1, which is a continuation-in-part of prior U.S. application Ser. No. 15/237,983 filed on 2016 Aug. 16. The prior applications are herewith incorporated by reference in its entirety.

This application also claims Chinese Application Nos.: CN201410510593.6 filed on 2014 Sep. 28; CN201510053077.X filed on 2015 Feb. 2; CN201510316656.9 filed on 2015 Jun. 10; CN201510347410.8 filed on 2015 Jun. 19; CN201510489363.0 filed on 2015 Aug. 7; CN201510502630.3 filed on 2015 Aug. 17; CN201510555889.4 filed on 2015 Sep. 2; CN201510966906.3 filed on 2015 Dec. 19; CN201610041667.5 filed on 2016 Jan. 22; CN201610272153.0 filed on 2016 Apr. 27; CN201610281600.9 filed on 2016 Apr. 29; CN201610394610.3 filed on 2016 Jun. 3; CN201610544049.2 filed on 2016 Jul. 7; CN201610586388.7 filed on 2016 Jul. 22; CN201610936171.4 filed on 2016 Nov. 1; CN201611108722.4 filed on 2016 Dec. 6; CN201710024877.8 filed on 2017 Jan. 13; CN201710079423.0 filed on 2017 Feb. 14; CN201710138009.2 filed on 2017 Mar. 9; CN201710180574.5 filed on 2017 Mar. 23; CN201710234618.8 filed on 2017 Apr. 11; CN201710316641.1 filed on 2017 May 8; CN201710839083.7 filed on 2017 Sep. 18; CN201730450712.8 filed on 2017 Sep. 21; CN201730453237.X filed on 2017 Sep. 22; CN201730453239.9 filed on 2017 Sep. 22; CN201710883625.0 filed on 2017 Sep. 26; CN201730489929.X filed on 2017 Oct. 16; CN201730518659.0 filed on 2017 Oct. 27; CN201730517887.6 filed on 2017 Oct. 27; CN201730520672.X filed on 2017 Oct. 30; CN201730537544.6 filed on 2017 Nov. 3; CN201730537542.7 filed on 2017 Nov. 3; CN201711434993.3 filed on 2017 Dec. 26; CN201711477767.3 filed on 2017 Dec. 29; CN201810031786.1 filed on 2018 Jan. 12; CN201810065369.9 filed on 2018 Jan. 23; CN201810344630.9 filed on 2018 Apr. 17; CN201810343825.1 filed on 2018 Apr. 17; CN201810498980.0 filed on 2018 May 23; CN201810501350.4 filed on 2018 May 23; CN201810573314.9 filed on 2018 Jun. 6; CN201810836433.9 filed on 2018 Jul. 26; CN201810943054.X filed on 2018 Aug. 17; CN201811005145.5 filed on 2018 Aug. 30; CN201811005536.7 filed on 2018 Aug. 30; CN201811079889.1 filed on 2018 Sep. 17; CN201811277980.4 filed on 2018 Oct. 30; CN201811285657.1 filed on 2018 Oct. 31; CN201811378189.2 filed on 2018 Nov. 19; CN201811378173.1 filed on 2018 Nov. 19; CN201811549205.X filed on 2018 Dec. 18; CN201910060475.2 filed on 2019 Jan. 22; CN201910497661.2 filed on 2019 Jun. 10; CN201911057715.X filed on 2019 Nov. 1; CN201911234236.0 filed on 2019 Dec. 5; CN202010856691.0 filed on 2020 Aug. 24; CN202010904065.4 filed on 2020 Sep. 1; CN202010912636.9 filed on 2020 Sep. 3;

CN202011313059.8 filed on 2020 Nov. 20; CN202110108853.7 filed on 2021 Jan. 27; CN202110779145.6 filed on 2021 Jul. 9; CN202211212294.5 filed on 2022 Sep. 30; CN202211605516.X filed on 2022 Dec. 14; CN202310467409.3 filed on 2023 Apr. 25; CN202310623145.6 filed on 2023 May 30; CN202311181286.3 filed on 2023 Sep. 8; CN202311182111.4 filed on 2023 Sep. 12; CN202311222851.6 filed on 2023 Sep. 20; CN202311381406.4 filed on 2023 Oct. 23, and CN202410121595.X filed on 2024 Jan. 29. The prior applications are herewith incorporated by reference in its entirety.

BACKGROUND

Field of the Invention

The disclosure relates to lighting devices, particularly to an LED filament and a light bulb using the LED filament.

Background of the Invention

LEDs have advantages of environmental protection, energy saving, high efficiency and long life, so LEDs have been generally valued in recent years and have gradually replaced conventional lighting devices. However, the light of conventional LED light sources is directional unlike conventional lamps that can provide wide-angle illumination. Therefore, the applying LEDs to conventional lamps has corresponding challenges depending on lamp types.

In recent years, an LED filament that allows an LED light source to emit light like conventional tungsten filament light bulbs to achieve 360° full-angle illumination has gradually attracted the attention of the industry. This kind of LED filament is made by fixing connecting a plurality of LED chips in series on a narrow and slender glass substrate, and then wrapping the entire glass substrate with silicone containing fluorescent powder, and then performing electrical connection. In addition, there is one kind of LED soft filament, which is similar to the structure of the above-mentioned LED filament. A flexible printed circuit (hereinafter refer to FPC) substrate is used to replace the glass substrate to make the filament have a certain degree of bending. However, the soft filament made of the FPC has disadvantages, for example, the FPC has a coefficient of thermal expansion different from that of the silicone wrapping the filament, causing displacement or even degumming of the LED chips after long-term use, and the FPC may not beneficial to flexible adjustment of process conditions.

There currently is a soft filament structure without a loading substrate, which uses a fluorescent package with flexibility and a wavelength conversion function to replace the prior-art structure which must install chips on a substrate first, and then perform coating fluorescent powder and packaging. However, part of the filament structure meets a challenge of stability of metal wiring between chips when being bent. When chips in the filament are arranged densely and the adjacent chips are connected by metal wiring, the metal wiring connecting the chips will tend to be broken or even fractured because stress excessively concentrates at a specific part of the filament when the filament is bent. Thus, such a filament still needs to be improved.

In current flexible filament products, different types of bulb shells have different requirements to shapes of LED filaments, so that length of filaments have different specifications. For a single type of filament with a fixed amount of LED cAs a result, after the filament is lit, the light spots (or graininess) observed by eyes will become more obvious. This seriously affect users' visual comfort.

In the related art, most LED lamps use both blue LED chips and yellow fluorescent powder to jointly emit white light, but an emission spectrum of the LED lamps shows that light in the red light region is weak and has a low color rendering index, making it difficult to implement low color temperature. To increase the color rendering index, a certain amount of green fluorescent powder and red fluorescent powder are added, but the relative conversion rate of the red fluorescent powder is relatively low, usually causing a total luminous flux of the LED lamps to decrease, that is, the light efficiency decreases. In addition, the red, green, and blue cone cells in a human eye have different sensitivities. If there is lack of red light, green light and blue light will form a cyan image in a human eye, reducing the color gamut of color reproduction, which not only causes the lighting scene to be dull and uninteresting, but also affects the quality of the lighting environment. Moreover, the use of lighting with high color rendering can improve the spatial perception of people, while low color rendering may affect the ability to distinguish objects and accurately perceive the surrounding environment.

In the existing LED filaments, usually only the outer surface of the LED filament is coated with mixed fluorescent powder glue. Since fluorescent glues with different color temperatures will show different colors after curing, when multiple LED filaments with different color temperatures are installed, they will show pell-mell colors at a glance, so that the LED lamps are unattractive when used as decorative lamps. Some LED lamps are provided with graphene adhesive layers above and below the substrate, and the graphene is toned into different colors to resolve the visual problem caused by the different appearance colors of the fluorescent powder glue layer. However, graphene is expensive in costs and easily pollutes the environment.

An LED chip has a first light-emitting surface and a second light-emitting surface. The first light-emitting surface and the second light-emitting surface are opposite to each other. The light from the first light-emitting surface (front side) is directed toward a top layer, and the light from the second light-emitting surface (reverse side) is directed toward a loading layer. Generally, the reverse side of flip chips or back-plated wire-bonding LED chips is substantially opaque. The brightness of the front side and reverse side of the LED chip is quite different. If the above LED chips are used in an LED filament, after the LED filament is wound, the luminous flux in some directions will be less, and the light emission of the LED light bulb will be uneven.

In addition, LED filaments are generally disposed inside the LED light bulb. In order to present the aesthetic appearance and also to make the illumination of LED filaments more uniform and widespread, the LED filaments are bent to present various curves. However, LED chips are arranged in an LED filament, and the LED chips are relatively hard objects, so an LED filament is difficult to be bent into a desired shape. Moreover, LED filaments are also prone to cracks due to stress concentration during bending.

Besides, an LED filament is usually arranged in a line around a stem, and the LED filament emits less light at both ends. When ends of multiple LED filaments are mounted near the light emitting top of a bulb, a dark region will be formed in the light emission direction of the central axis of the bulb, causing uneven spatial distribution of light emission and uneven illuminance distribution, and resulting in the phenomenon of "dark under the lamp".

At present, LED filament lamps usually use a driving power supply to convert alternating current (AC) power into direct current (DC) power so as to drive to emit light. However, there are ripples in the process of converting AC power into DC power by the driving power supply, causing flicker when the LED filament is lit. To reduce or even eliminate the flicker generated in the lighting process of an LED filament, an electrolytic capacitor is usually added in the driving power supply for ripple removal. Heat generated by a heating element in the driving power supply seriously affects the service life of the electrolytic capacitor.

When multiple LED chip units are included in a lighting device, the multiple LED chip units need to be driven with different currents. In this case, if multiple drivers are used, circuit complexity and circuit costs will inevitably increase. Thus, a shunt circuit is required to distribute currents to the multiple LED chip units.

This disclosure optimizes the prior arts to further correspond to requirements of various processes and products.

SUMMARY OF THE INVENTION

It is particularly noted that the disclosure may actually include one or more technical solutions currently claimed or not claimed. In addition, in the process of writing the description, in order to avoid confusion caused by unnecessary distinctions between these technical solutions, a plurality of possible technical solutions herein may be jointly referred to as "the disclosure".

A plurality of embodiments with respect to "the disclosure" are briefly described herein. However, the term "the disclosure" is only used to describe certain an embodiments disclosed in this specification (whether or not claimed), rather than a complete description of all possible embodiments. Some embodiments described below as various features or aspects of "this disclosure" may be combined in various ways to form the LED light bulb or part thereof.

The invention discloses an LED filament including:

an LED chip unit;

a light conversion layer, an outer surface of the light conversion layer being disposed with a layer body, and the layer body being provided with a chromogenic or light conversion material; and two electrodes, electrically connected to the LED chip unit;

wherein the light conversion layer covers the LED chip unit and parts of the electrodes, and the layer body covers the light conversion layer and at least covers parts of the electrodes.

In an embodiment of the disclosure, the light conversion layer includes a top layer and a base layer, and the layer body completely covers the top layer and the base layer.

In an embodiment of the disclosure, the chromogenic or light conversion material is selected from one or a combination of aluminum oxide, silicon dioxide, magnesium oxide, titanium dioxide, graphene, fluorescent powder, sulfate, silicate, nitride, nitrogen oxide, oxysulfate and garnet.

In an embodiment of the disclosure, the layer body appears white in an unlit status.

In an embodiment of the disclosure, when the layer body is in an unlit status, under an RGB standard, a color value of the layer body is within a range of R(235-255), G(235-255) and B(235-255), and an absolute value of a difference between any two of R, G and B is less than or equal to a less one of the two or 10% of a greater one of the two.

In an embodiment of the disclosure, the layer body appears gray in an unlit status.

In an embodiment of the disclosure, when the layer body is in an unlit status, under an RGB standard, a color value of the layer body is within a range of R(100-234), G(100-234) and B(100-234), and an absolute value of a difference between any two of R, G and B is less than or equal to a less one of the two or 10% of a greater one of the two.

In an embodiment of the disclosure, the layer body is provided with titanium dioxide particles, and a weight of titanium dioxide accounts for 0.2%-10% of a total weight of the layer body.

In an embodiment of the disclosure, the layer body is less than or equal to the light conversion layer in thickness.

In an embodiment of the disclosure, the light conversion layer includes a top layer and a base layer, and the layer body is less than or equal to the top layer in thickness.

In an embodiment of the disclosure, the base layer includes titanium dioxide to make a color presented by the base layer and the layer body are in the same RGB value range.

In an embodiment of the disclosure, an adding amount of titanium dioxide in the base layer accounts for 1% to 20% of a total weight of solid particles in the base layer.

In an embodiment of the disclosure, the base layer is provided with at least one kind of fluorescent power, and the fluorescent powder accounts for 1% to 15% of a total weight of solid particles in the base layer.

In an embodiment of the disclosure, the LED filament includes two LED chips, and the two LED chips are electrically connected by a metal wire.

LED chips, including two types;

a light conversion layer, including a top layer and a base layer, and the top layer being disposed with at least two types of fluorescent powder; and two electrodes, electrically connected to the LED chip unit;

wherein the light conversion layer covers the LED chip and parts of the electrodes, and the LED filament appears to be a different color from a lighting color in an unlit status.

In an embodiment of the disclosure, the LED chips include a blue chip, a red chip and a green chip.

In an embodiment of the disclosure, a light intensity ratio of the blue chip, the red chip and the green chip is 1:3:6.

In an embodiment of the disclosure, the base layer is disposed with a BT substrate, a color value of the BT substrate is within a range of R(235-155), G(235-255) and B(235-255) under an RGB standard.

In an embodiment of the disclosure, the BT substrate is located on an outermost side of the LED filament.

In an embodiment of the disclosure, the LED filament is disposed with a three-row LED chip array which is parallelly arranged along a length direction of the LED filament, and the LED chip array is formed by LED chips, and the LED chips includes a blue chip, a red chip and a green chip.

By way of the above technical solutions, the disclosure has the following technical effects:

(1) By filling a combination of nitrogen and oxygen into a bulb shell, the service life of the base layer can be prolonged by the action of oxygen and the groups in the base layer;

(2) By designing the relationship between a diameter of the lamp base, a maximum diameter of the bulb shell and a maximum width of an LED filament in the Y-axis direction on YZ-plane or a maximum width of an LED filament in the X-axis direction on XZ-plane, the cooling effect can be effectively improved;

(3) The base layer is less than the top layer in thickness, the top layer is greater than the base layer in thermal conductivity, and the path of the heat generated by the LED chips being conducted to the outer surface of the base layer is relatively short, so heat is not prone to accumulation;

(4) The loading layer includes a transparent layer and a base layer, the transparent layer forms support to part of the base layer so as to enhance strength of the base layer and to be beneficial to die bonding and wiring, and a part of the base layer, which is not covered by the transparent layer, makes part of heat generated by the LED chip directly dissipated by the base layer;

(5) The transparent layer includes a first transparent layer and a second transparent layer, the area near the electrodes is easy to separate from the light conversion layer or the contact portion between the light conversion layer and the electrodes is prone to cracks when the LED filament is bent, the first transparent layer and the second transparent layer can reinforce the contact portion between the light conversion layer and the electrodes to prevent the contact portion between the light conversion layer and the electrodes from cracking;

(6) The conductor includes a covered portion and an exposed portion, the exposed portion will be bent by force to cause slight deformation when the LED filament is bent, the bending region is small and the degree of deformation is small, so that it is beneficial to keeping the bending shape of the LED filament; and (7) By a mixture of different materials, the filament can present different colors, or the filament can present different colors when in lit and unlit statuses, so that the appearance and light emitting effect of a lamp using the filament can be improved.

DETAILED DESCRIPTION OF PREFERRED EMBODIMENTS

To make the above-mentioned objectives, features, and advantages of this disclosure understandable, specific embodiments of this disclosure are described in detail below with reference to the accompanying drawings.

Figure 1:
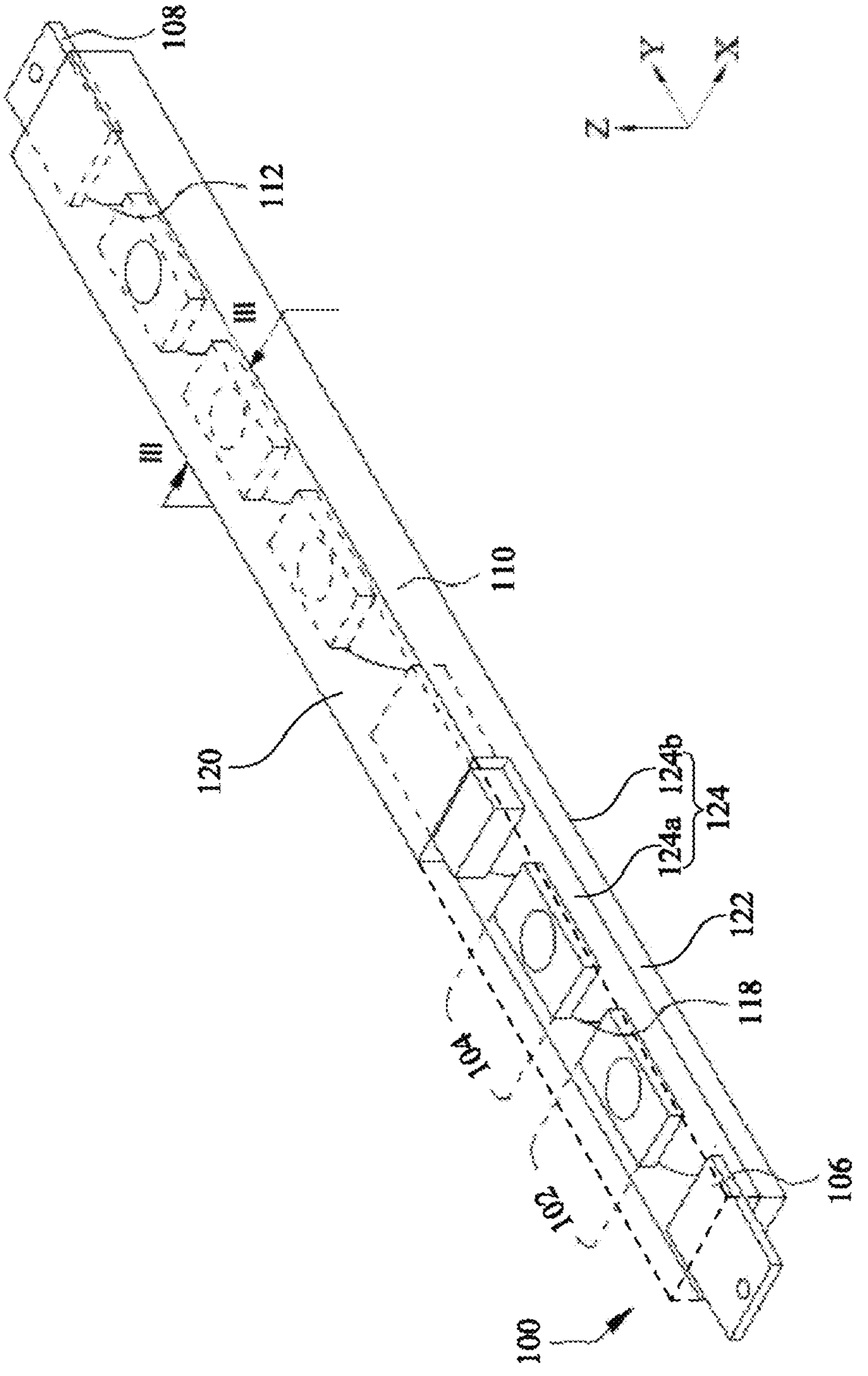
FIG. 1 is a structural schematic view (1) of the LED filament according to some embodiments of the disclosure.
Figure 2:
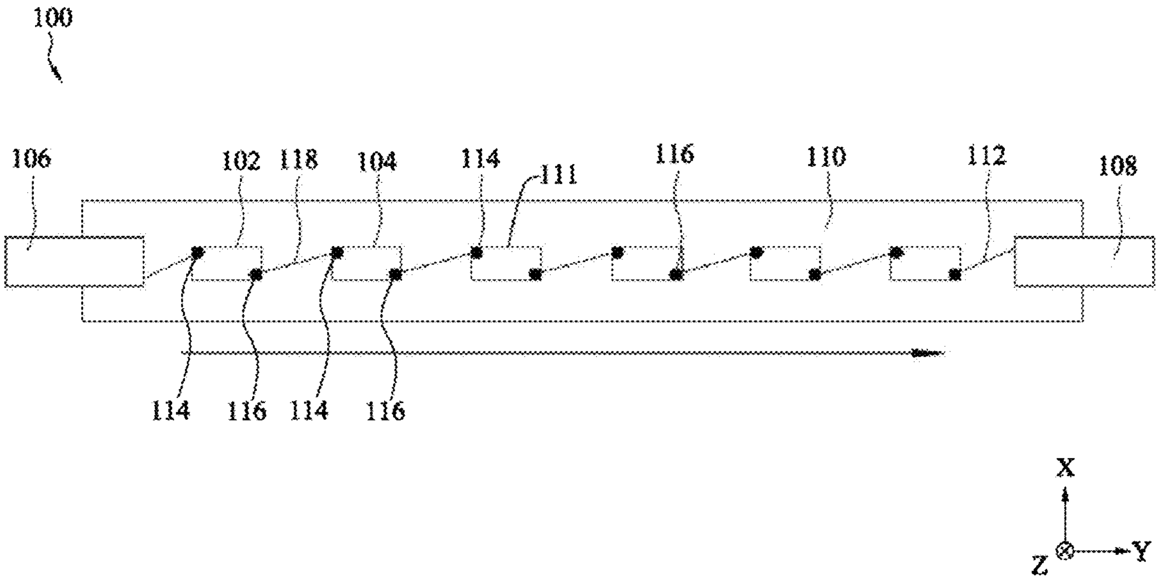
FIG. 2 is a bottom view according to FIG. 1.
Figure 3:
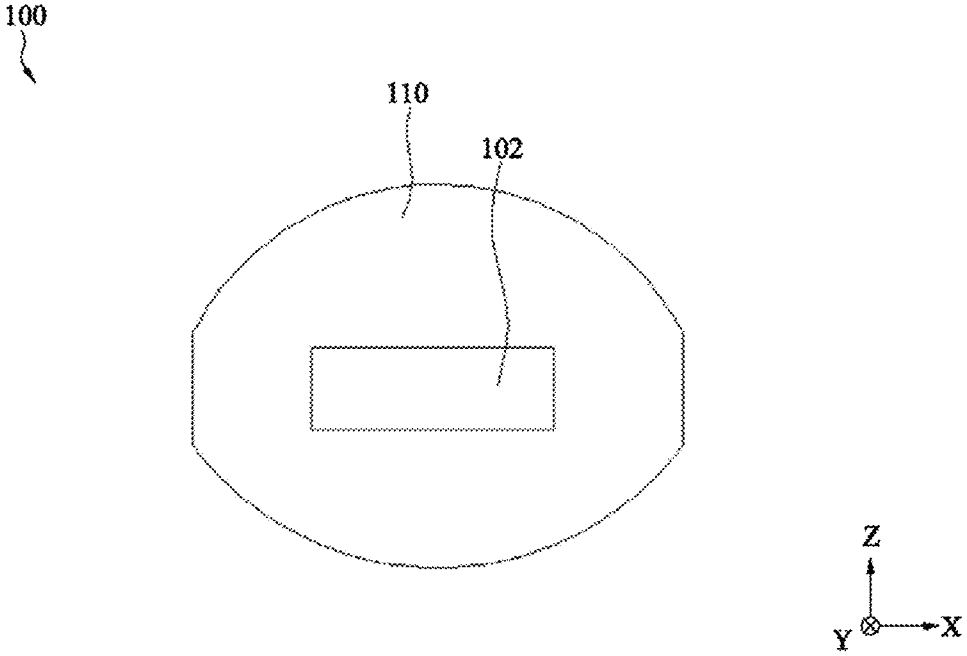
FIG. 3 is a partially schematic cross-sectional view along line A-A in FIG. 1.

Please refer to FIGS. 1-3. FIG. 1 is a structural schematic view (1) of the LED (light emitting diode) filament according to some embodiments of the disclosure. FIG. 2 is a bottom view according to FIG. 1. FIG. 3 is a partially schematic cross-sectional view along line A-A in FIG. 1. As shown in FIGS. 1-3, the LED filament 100 includes a plurality of LED chip units 102, 104, electrodes 106, 108, and a light conversion layer 110. The LED chip units 102, 104 are electrically connected to each other. The electrodes 106, 108 are arranged to correspond to the LED chip units 102, 104 and are electrically connected to the LED chip units 102, 104 by first conductive portions 112. The light conversion layer 110 wraps the LED chip units 102, 104 and the electrodes 106, 108 with at least exposing parts of the two electrodes 106, 108. The light conversion layer 110 includes silicone, fluorescent powder, and cooling particles. In some embodiments, each of the LED chip units 102, 104 includes at least one LED chip (it will be explained later). The concentration of the fluorescent powder corresponding to each side of the LED chip is the same, so that the light conversion rate of each side is the same to make the LED filament 100 have great optical uniformity. Of course, in other embodiments of the disclosure, the concentration of the fluorescent powder corresponding to each side of the LED chip has two types so as to implement the directional adjustment of the light conversion rate of each side to make the LED filament 100 able to control the light emitting difference of each side according to design requirements.

As shown in FIG. 2, each LED chip unit 102, 104 includes at least one LED chip 111 and has a first electrical connecting portion 114 and a second electrical connecting portion 116. At least parts of the first electrical connecting portion 114 and the second electrical connecting portion 116 are in contact with the light conversion layer 110.

In some embodiments, as shown in FIG. 1, the light conversion layer 110 includes a top layer 120 and a loading layer 122. The top layer 120 wraps the LED chip units 102, 104 and the electrodes 106, 108 with at least exposing parts of the two electrodes 106, 108. The loading layer 122 includes a base layer 124. The base layer 124 includes an upper surface 124*a* and a lower surface 124*b* opposite to the upper surface 124*a*. The upper surface 124*a* of the base layer 124 is close to the top layer 120 in comparison with the lower surface 124*b* of the base layer 124. One of the first conductive portion 112 and the second conductive portion 118 is in contact (direct contact or indirect contact) with the upper surface 124*a* of the base layer 124. When the LED filament 100 is bent, the curvature radius of the base layer 124 after being bent under force is relatively small, and the first conductive portion 112 and the second conductive portion 118 are not prone to be broken. In some embodiments, the first electrical connecting portion 114 and the second electrical connecting portion 116 are in contact (direct contact or indirect contact) with the upper surface 124*a* of the base layer 124. In some embodiments, the LED chip units 102, 104 may be flip chip or wire bonding. In some embodiments, the LED chip units 102, 104 may be micro light emitting diodes (micro LEDs) or sub-millimeter light emitting diodes (mini LEDs). The mini LED refers to an LED within a package size of 0.1-0.2 mm.

In some embodiments, the first conductive portion 112 and the second conductive portion 118 may be wires, films, glue, etched circuits or sintered circuits, such as copper wires, gold wires, circuit films, copper foil or conductive silver glue.

Figure 14:
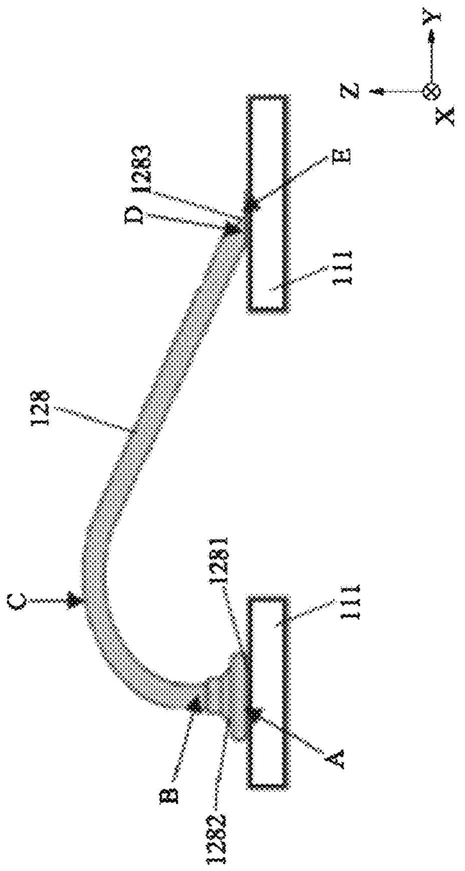
FIG. 14 is a structural schematic view of the soldering wire of the LED chip according to some embodiments of the disclosure.
Figure 15:
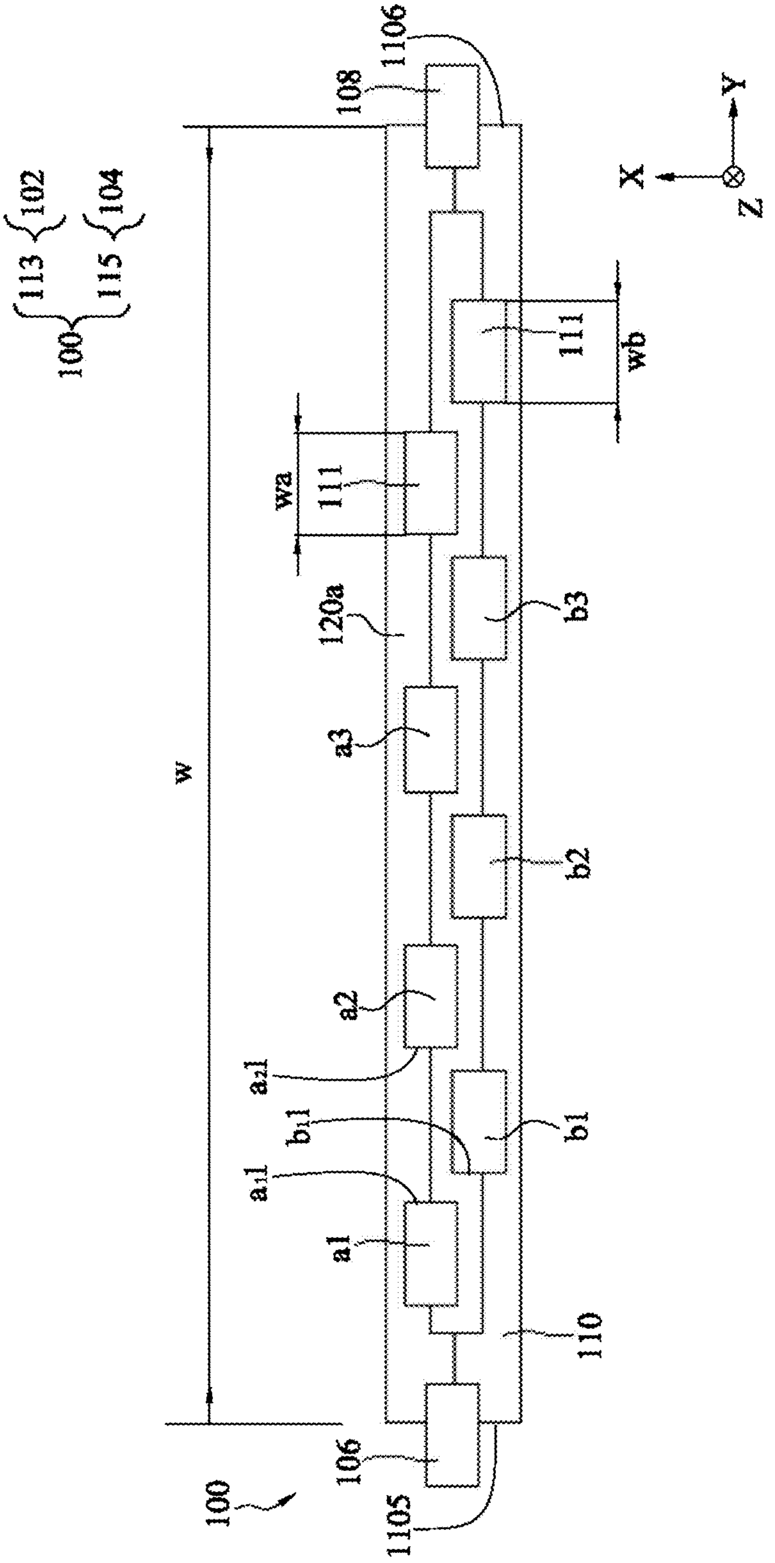
FIG. 15 is a top view (1) of the LED filament without the top layer in an unbent state according to some embodiments of the disclosure.
Figure 16:
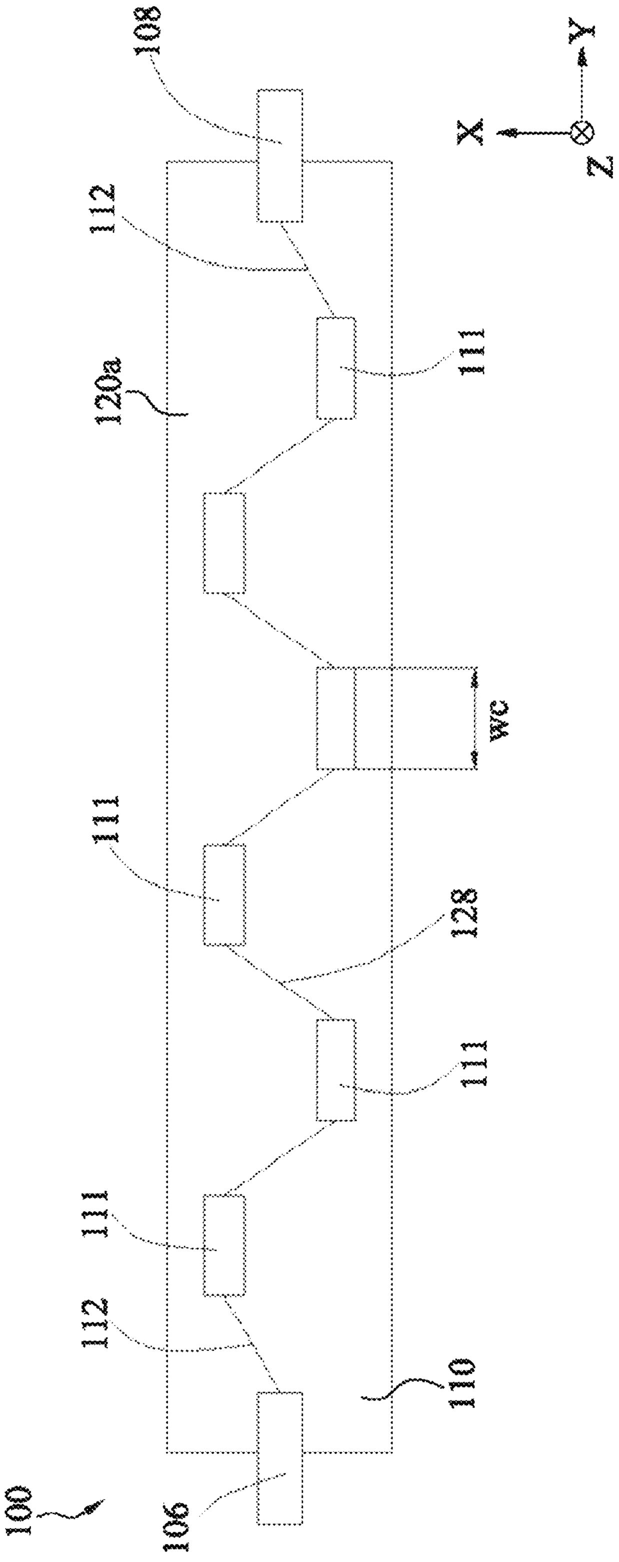
FIG. 16 is a top view (2) of the LED filament without the top layer in an unbent state according to some embodiments of the disclosure.

Please refer to FIGS. 4-16. FIGS. 4-10 and 12-13 are structural schematic views (2-10) of the LED filament according to some embodiments of the disclosure. FIG. 11 is a top view of an embodiment of the LED filament without the top layer according to some embodiments of the disclosure. FIG. 14 is a structural schematic view of the soldering wire of the LED chip according to some embodiments of the disclosure. FIG. 15 is a top view (1) of the LED filament without the top layer in an unbent state according to some embodiments of the disclosure. FIG. 16 is a top view (2) of the LED filament without the top layer in an unbent state according to some embodiments of the disclosure. In some embodiments, as shown in FIGS. 4-16, the LED filament 100 has multiple LED chip units 102, 104, two electrodes 106, 108 and a light conversion layer 110. The light conversion layer 110 wraps the LED chip units 102, 104 and parts of the electrodes 106, 108 with exposing parts of the electrodes 106, 108 out of the light conversion layer 110. Adjacent two of the LED chip units 102, 104 are electrically connected and the LED chip units 102, 104 and the electrodes 106, 108 are electrically connected.

The LED filament 100 includes at least two LED chips 111. Adjacent two of the LED chips 111 are electrically connected to each other. Each LED chip unit 102, 104 includes at least one LED chip 111. In some embodiments, multiple LED chip units 102 may constitute an LED section 115 (it will be described in FIGS. 5-16). The LED chip units 102, 104 may omit the marking of the LED section 113, 115.

The light conversion layer 110 includes a top layer 120 and a loading layer 122, and each of the top layer 120 and the loading layer 122 may be a layered structure having at least one layer. Preferably, the layered structure is one of fluorescent powder glue with high plasticity (relative to a fluorescent powder film), a fluorescent powder film with low plasticity and a transparent layer or any combination of the three. The fluorescent powder glue or film contains the following components: organosilicon-modified polyimide and/or glue. The fluorescent powder glue or film may also include fluorescent powder and inorganic oxide nanoparticles (or cooling particles). The transparent layer 420*c* may be composed of light-transmitting resin (such as silicone or polyimide or a combination thereof). The glue may be, but is not limited to, silicone. In one embodiment, materials of the top layer 120 and the loading layer 122 are the same.

In one embodiment, the loading layer 122 includes a base layer 124. In the height direction of the LED filament 100 (the Z-axis direction in FIG. 4), the top layer 120 is greater than the base layer 124 in height. The base layer 124 includes an upper surface 124*a* and a lower surface 124*b*, which are opposite. The top layer 120 includes an upper surface 120*a* and a lower surface 120*b*, which are opposite. The upper surface 124*a* of the base layer 124 is in contact with part of the lower surface 120*b* of the top layer 120. The LED chip 111 includes an upper surface 111*a* and a lower surface 111*b*, which are opposite. The upper surface 111*a* of the LED 111 is close to the upper surface 120*a* of the top layer 120 relative to the lower surface 111*b* of the LED chip 111. The distance between the lower surface 111*b* of the LED chip 111 and the lower surface 124*b* of the base layer 124 is less than the distance between the lower surface 111*b* of the LED chip 111 and the upper surface 120*a* of the top layer 120. Because the top layer 120 is greater than the base layer 124 in thermal conductivity and the path of the heat generated by the LED chip 111 being transferred to an outer surface of the base layer 124 is relatively short, heat is hard to gather and the LED filament 100 obtains a better cooling effect.

In most application scenarios, filament lamp products are not only for lighting purposes, but also a part of environmental decoration. That is, when a filament lamp is not lit, the shape and the appearance color (including the appearance color of filament (or the color of filament body) and the appearance color of bulb) are consumers' concern. When a filament lamp is lit, the focus is on whether the performance of color temperature and the illumination meet the environmental requirements. In some embodiments, the main body of the LED filament 100 may not include the parts of the electrodes, which are exposed out of the light conversion layer 110. In one embodiment, when the LED filament 100 is not lit, the surface of the LED filament 100 appears white, gray, black, blue, green or purple. In some embodiments, the surface of the LED filament 100 may be the surface of the light conversion layer 110. After the LED filament 100 is lit, it can emit light with a different color from when the LED filament 100 is not lit, so that a light bulb with the LED filament 100 can be applied in different scenarios to achieve different decorative effects (it will be explained later). In some embodiments, the LED filament 100 includes a coating (not shown), and the color of the coating is white, gray, black, blue, green or purple. The coating at least covers a part of the surface of the light conversion layer 110. Preferably, the coating covers the entire surface of the light conversion layer 110. For example, a red coating is used to cover the surface of the light conversion layer 110. When the LED filament 100 is not lit, the surface of the LED filament 100 appears red, but when the LED filament 100 is lit, the LED filament 100 emits white light. Of course, after the LED filament 100 is lit, it can emit light with the same color as when the LED filament 100 is not lit. For example, a white coating is used to cover the surface of the light conversion layer 110, when the LED filament 100 is not lit, the surface of the LED filament 100 appears white, and when the LED filament 100 is lit, and the LED filament 100 also emits white light. The white coating may be aluminum oxide. In some embodiments, the surface of the top layer 120 and/or the loading layer 122 is covered with a film, and the color of the film is black, gray or red. Generally, substances have certain light absorption, a preferable film with high light transmittance, for example, the light transmittance of the film is at least greater than 80, which can prevent the luminous flux from decreasing after the LED filament 100 is lit. In some embodiments, the thickness of the film is less than the thickness of the top layer 120, and the heat from the LED chip 111 is hard to be gathered in the film, so as to meet the requirements of the appearance and heat dissipation of the LED filament 100. The film may or may not contain fluorescent powder. When the film contains fluorescent powder, the fluorescent powder content of the film is less than the fluorescent powder concentration of the top layer 120 or the loading layer 122. If the top layer 120 or the loading layer 122 is a multi-layer structure, the fluorescent powder content of the film is at least less than the fluorescent powder content of one of the layers. Due to the film, the thickness of the LED filament 100 increases, and the heat transfer path of the LED filament 100 becomes longer. When the fluorescent powder content in the film is increased to improve the cooling performance of the LED filament, the hardness of the film will increase due to the increase of the fluorescent powder content in the film, so that the flexibility of the LED filament 100 becomes worse, and the probability of occurrence of cracks increases when the LED filament 100 is bent. In some embodiments, adding a certain amount of fluorescent powder to the film can change the color of the LED filament 100 when it is not lit under the condition of achieving both cooling performance and flexibility of the LED filament. In some embodiments, after the surface of the top layer 120 and/or the base layer 124 is/are covered with a film, when the filament is not lit, the color of the body of the LED filament 100 appears gray-black (close to the original color of tungsten filament), and when the LED filament 100 is lit, the light emitted by the LED filament 100 is white. In some embodiments, the colors of the light conversion layer 110 and the body of the LED filament 100 when the LED filament 100 is not lit, or the colors of the light emitted after the LED filament 100 is lit include primary colors and colors that are mixed by at least two primary colors, for example, the primary colors are the three primary colors (RGB) of light.

Figure 25:
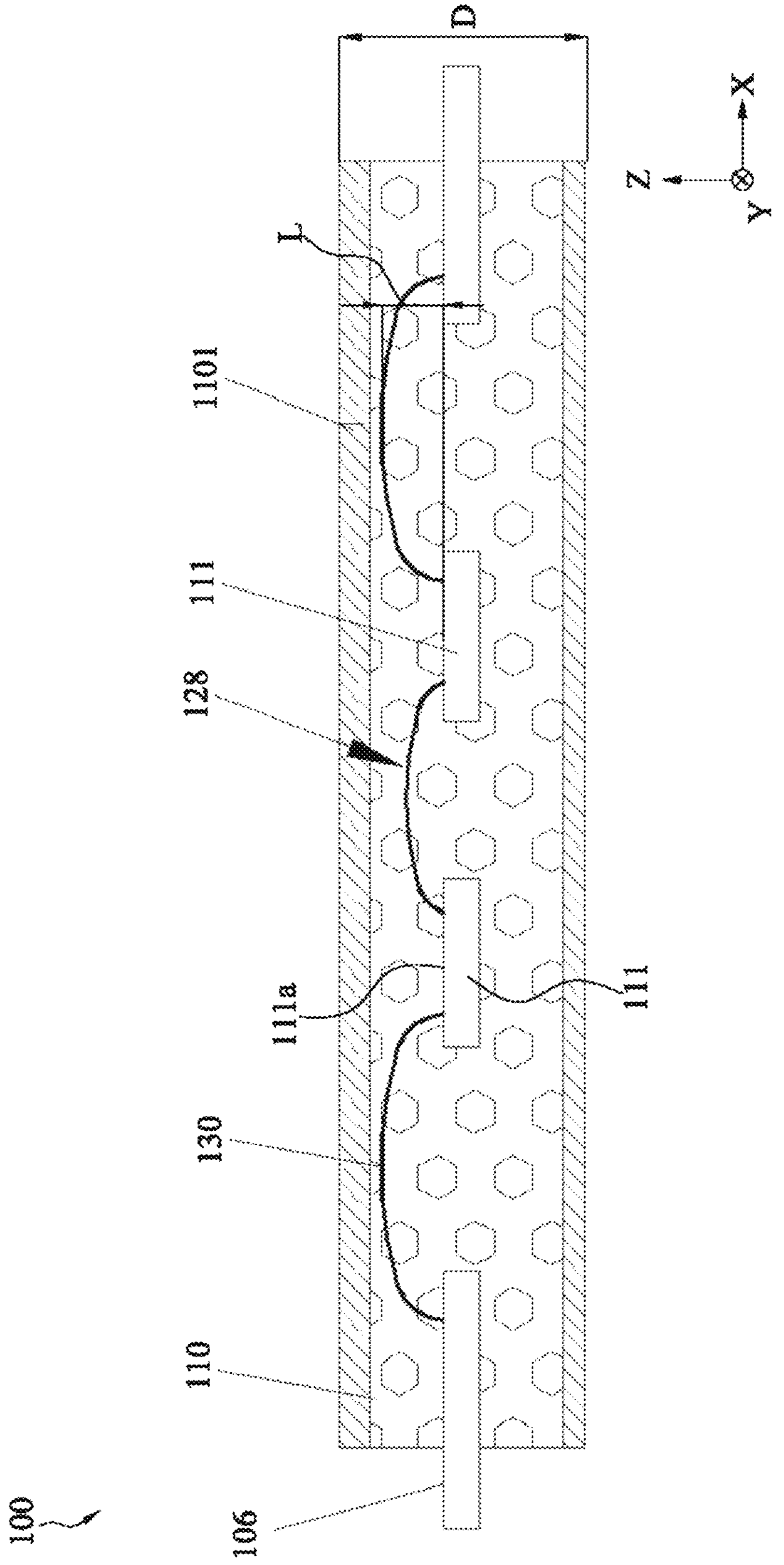
FIG. 25 is a structural schematic view (13) of the LED filament according to some embodiments of the disclosure.

Please refer to FIG. 25, which is a structural schematic view (13) of the LED filament according to some embodiments of the disclosure. As shown in FIG. 25, the coating or film is a layer body 1101 disposed on an outer surface of the light conversion layer 110. In some embodiments, the hardness of the layer body 1101 is less than that of the light conversion layer 110 so as to prevent the hardness of the layer body 1101 from being too high to affect the normal bending of the LED filament 100. In some embodiments, the hardness of the layer body 1101 may be greater than that of the light conversion layer 110 to further support the entire LED filament 100. Regardless of the hardness of the layer body 1101, the support ability of the entire LED filament 100 can still be improved by the arrangement of the layer body 1101.

The bulb shell of the LED filament bulb is filled with gas (it will be described later), and the refractive indices of the light conversion layer 110, the layer body 1101, and the gas filled in the bulb shell decrease in order. In comparison with no layer body 1101, since the refractive index difference between the light conversion layer 110 and the filled gas is large, a large optical loss can be caused. In this embodiment, however, by way of the above arrangement of the layer body 1101, the LED chip 111 has a less optical loss on the light emission path.

The layer body 1101 may be made of silicone or a material based on silicone. When silicone is directly adopted, the layer body 1101 can appear white by the color of silicone itself so as to make the LED filament 100 appear white. After adding dye in the silicone, the layer body 1101 can appear a different color as described above. In addition, a photoreactive substance may also be added in the layer body 1101 so that after the LED chip 111 emits light, the light passes through the light conversion layer 110 to implement the first light conversion, and then passes through the photoreactive substance in the layer body 1101 to implement the second light conversion. Therefore, when the LED filament 100 is not lit, it has a first color, and after it is lit, it has a second color different from the first color, and the first color and the second color have a difference in primary colors.

Figure 4:
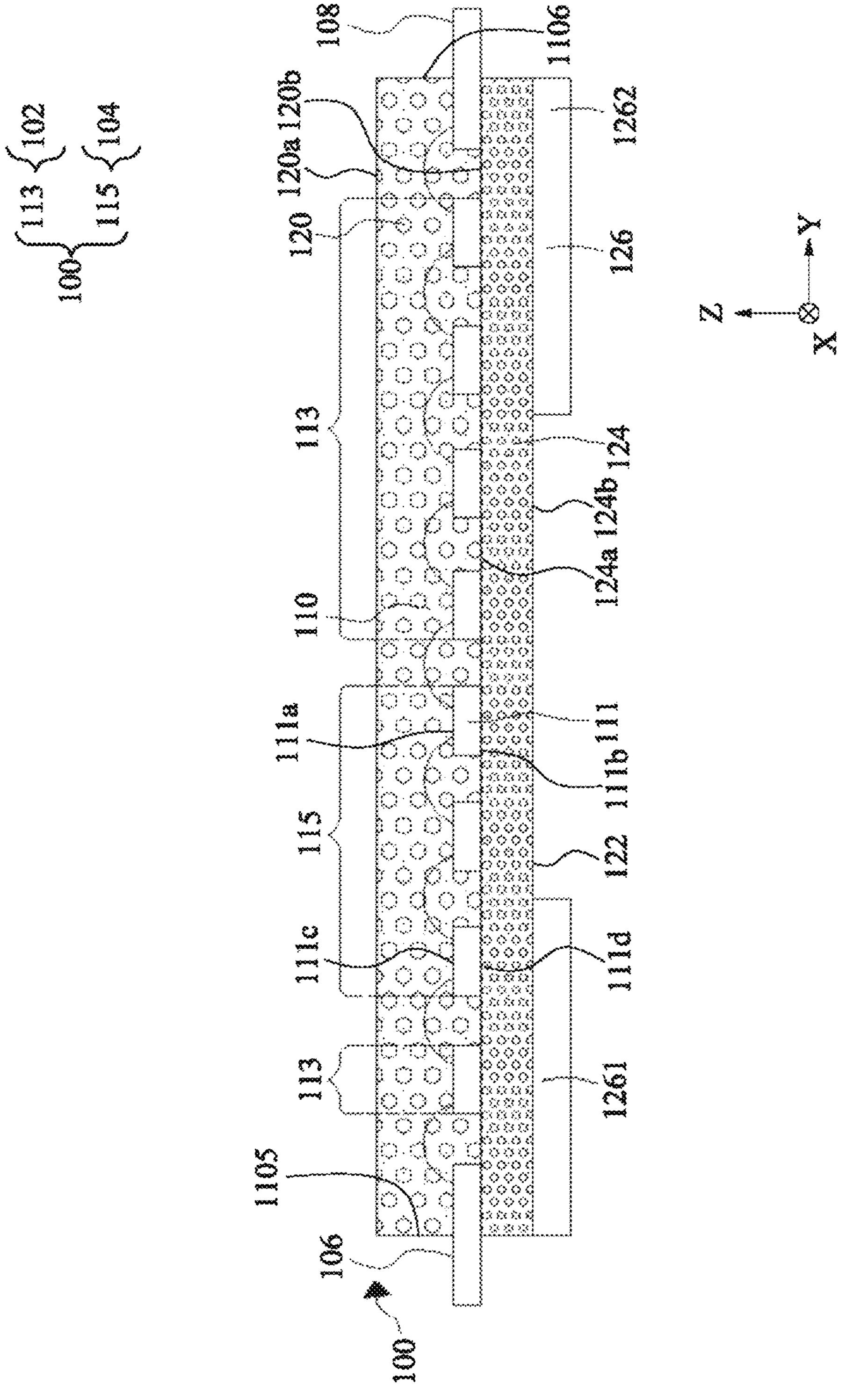
FIG. 4 is a structural schematic view (2) of the LED filament according to some embodiments of the disclosure.

In one embodiment, as shown in FIG. 4, the light conversion layer 110 includes a top layer 120 and a base layer 122. Each of the top layer 120 and the base layer 122 may be a layered structure having at least one layer. The upper surface **120*a* of the top layer 120 and the lower surface 124*b* of the base layer 122** are different in color. Since the LED filament presents two different colors when it is not lit, it can be applied to multi-color usage scenarios.

In some embodiments, the layer body 1101 may adopt material other than silicone and materials based on silicone, for example, resin, plastic, polyimide (PI), polyvinyl alcohol (PVA), polyester (PET), polyethylene naphthalene glycol ester (PEN) and polydimethylsiloxane (PDMS).

In some embodiments, the layer body 1101 may be based on silicone and mixed with other solid powder (particles). The solid powder particles may be insulative white powder such as, but not limited to, titanium dioxide powder or a mixture of inorganic oxide nanoparticles. The solid powder particles account for a certain percentage of a total weight of the layer body 1101 to satisfy the performance requirements of the entire filament. In some embodiments, the layer body 1101 is mixed with a certain amount of titanium dioxide powder (particles). Titanium dioxide powder (particles) is (are) evenly distributed in the layer body 1101. The layer body 1101 is made of silicone and titanium dioxide powder (particles). When silicone is under specific conditions and appears liquid, a certain amount of titanium dioxide is added into silicone, by well-known mixture processes such as stirring, high-speed shaking, planetary mixer processing, etc., titanium dioxide powder (particles) can be evenly distributed in silicone. When the mixture of silicone and titanium dioxide is in a liquid status, the layer body 1101 is disposed on the surface of the light conversion layer 110 by spin coating, spray coating, blade coating, wetting (immersing the entire material in liquid and then taking it out, the liquid covers the surface of the material), etc., and then the layer body 1101 is solidified on the surface of the light conversion layer 110 by exposure, baking, natural curing, etc. The layer body 1101 is less than or equal to the light conversion layer 110 in thickness (the thickness means the length in the Z-axis direction in FIG. 4) to prevent an excessive thickness of the layer body 1101 from affecting lighting softness of the LED filament 100. A weight of titanium dioxide powder (particles) accounts for 0.2%-10% of the total weight of the layer body 1101, furthermore, 0.7%-5%. Titanium dioxide powder (particles) appears to be white in color. Among commonly used white pigments, it has the smallest density than others. Among white pigments with the same quality, titanium dioxide has the largest surface area and the highest pigment volume. In comparison with other materials, titanium dioxide makes the ability of the mixed material approaching the color of titanium dioxide material stronger. For example, when needing the mixed material to approach white, in comparison with other materials, only less titanium dioxide material can meet the requirement. Titanium dioxide possesses higher reflectivity (e.g. above 80%) and refractive index (e.g. 2.5-2.8). Titanium dioxide is evenly distributed in the layer body 1101, the light emitted by the LED chip 111 reaches into the layer body 1101 after being converted by the light conversion layer 110, and then after multiple refractions and reflections by the titanium dioxide powder (particles) distributed therein, it finally emits from the layer body 1101. As a result, the specific directionality of the light emitted will be effectively reduced and the light will become evener and softer.

Figure 27:
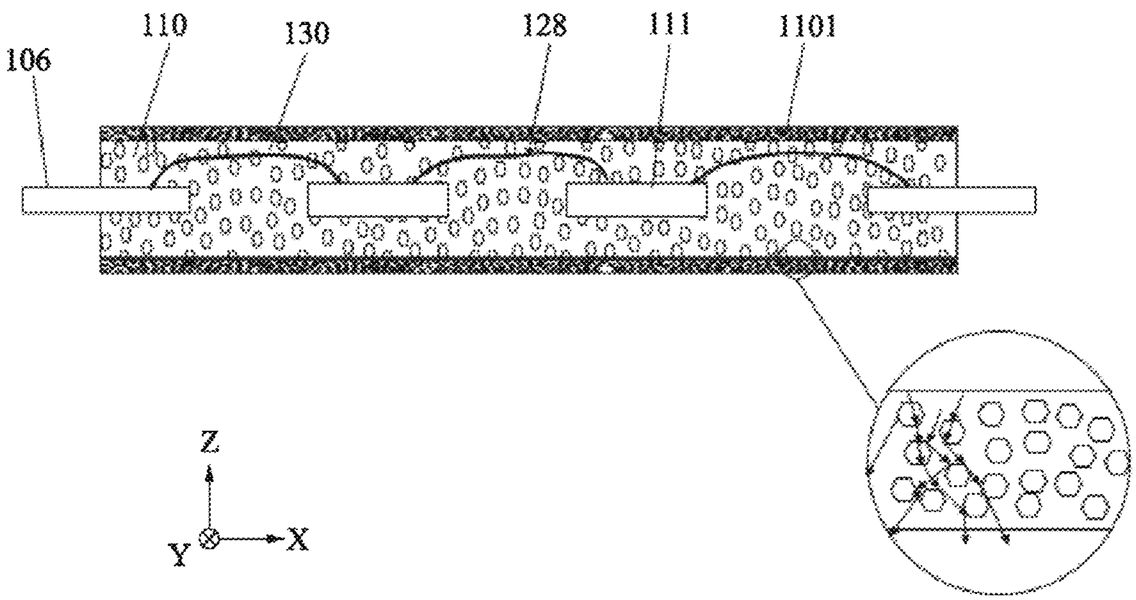
FIG. 27 is a structural schematic view (15) of the LED filament according to some embodiments of the disclosure.

Please refer to FIG. 27, which is a structural schematic view (15) of the LED filament according to some embodiments of the disclosure. As shown in FIG. 27, the layer body 1101 is disposed with a certain amount of titanium dioxide. Please the partially enlarged portion (in the circle), the light processed by the light conversion layer 110 is further treated with disordering in the layer body 1101 to make the specific directionality of the light finally emitted greatly reduced to form an effect similar to the defuse reflection. The light finally emitted from the layer body 1101 will become evener and softer. Of course, the adding amount of titanium dioxide should not be too much. An excessive amount will lead to a greater light loss. For example, when the total weight of titanium dioxide is greater than 10% of the layer body 1101, continuously increasing the amount of titanium dioxide cannot continuously improve the softening effect, but will cause a greater light loss to result in being unable to meet the demand of the amount of the light emitted. The adding amount of titanium dioxide should not be too little. An insufficient amount cannot implement the light softening function and cannot obtain an ideal color effect, for example, when the total weight of titanium dioxide is less than 0.2% of the layer body 1101. Titanium dioxide can make the LED filament 100 (or the layer body 1101) appear white or almost white with a less amount while titanium dioxide is softening light. More precisely speaking, titanium dioxide makes the color value of the LED filament 100 (or the layer body 1101) within a range of R(235-255), G(235-255) and B(235-255) in RGB standard in an unlit status, wherein an absolute value of a difference between any two of R, G and B is less than or equal to a less one of the two or 10% of a greater one of the two. Furthermore, an absolute value of a difference between any two of R, G and B is less than or equal to a less one of the two or 5% of a greater one of the two. Of course, the material added to the layer body 1101 may also be other chromogenic or light conversion materials such as one or a combination of aluminum oxide, silicon dioxide, magnesium oxide, titanium dioxide, graphene, phosphor, sulfate, silicate, nitride, nitrogen oxide, oxysulfate and garnet. For example, it can be a combination of one of aluminum oxide and silicon dioxide and titanium dioxide, wherein a weight of titanium dioxide accounts for 5%-15% of all solid particulate matters, preferably, 8%. It can also be, but not limited to, a combination of one of aluminum oxide and silicon dioxide and magnesium oxide or sulfate (such as barium sulfate). One or a combination of multiple materials is available. In some embodiments, the color arrangement of the filament in an unlit status can be implemented by different fluorescent powders, for example, different fluorescent powders can implement that the filament appears white, gray, white or others in an unlit status.

In some embodiments, the layer body 1101 may further be provided with light conversion particles such as fluorescent powder. A weight of the light conversion particles accounts for 2%-10% of the total amount of solid particles in the layer body 1101, preferably, 4%. This makes the layer body 1101 have an effect of light conversion, so that part of the light emitted by the LED chip 111, which is not converted by the light conversion layer 110 will be converted by the layer body 1101 and then emitted out so as to increase the light conversion rate of the LED filament 100.

In some embodiments, the thickness of the layer body 1101 is evenly disposed and the layer body 1101 is disposed on two surfaces of the light conversion layer 110, which are substantially parallel to the light emitting surface of the LED chip 111. Please refer to the upper surface 111*a* and the lower surface 111*b* of the LED chip 111 in FIG. 4, which are parallel to each other.

In some embodiments, the thickness of the layer body 1101 is evenly disposed and the layer body 1101 is disposed on two surfaces of the light conversion layer 110, which are substantially parallel to the light emitting surface of the LED chip 111, and on a long side of the light conversion layer 110, which is perpendicular to the light emitting face of the LED chip 111 (instead of the surface through which the electrodes 106, 108 penetrate). Please refer to the upper and lower surfaces 111*a*, 111*b* of the LED chip 111 and the long side perpendicular to the light emitting face of the LED chip 111 in FIG. 4.

Figure 28:
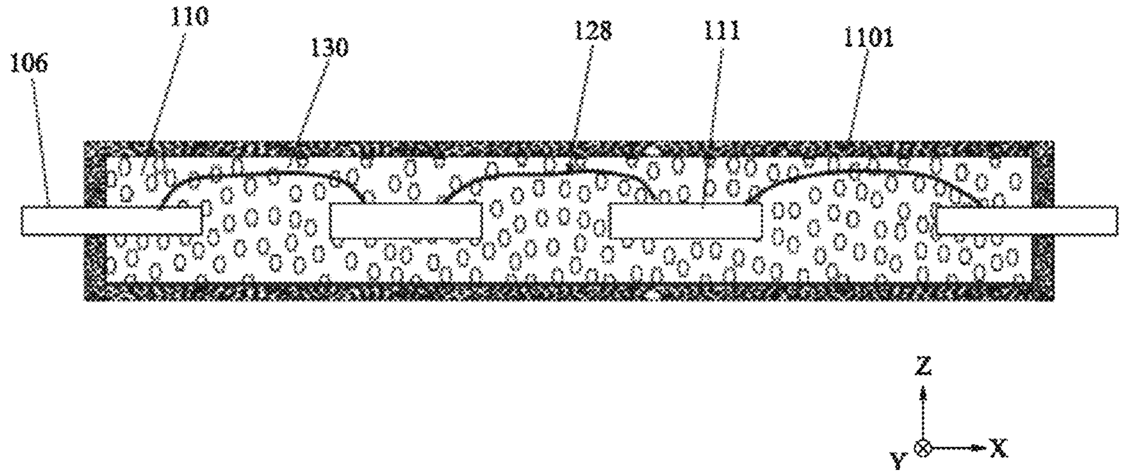
FIG. 28 is a structural schematic view (16) of the LED filament according to some embodiments of the disclosure.

Please refer to FIG. 28, which is a structural schematic view of the LED filament according to some embodiments of the disclosure. In some embodiments, the layer body 1101 completely covers the light conversion layer 110 and at least covers parts of the electrodes 106, 108. As shown in FIG. 28, the layer body 1101 possesses certain strength and flexibility to reinforce the overall strength of the LED filament 100.

In some embodiments, the layer body 1101 may cover a surface of the light conversion layer 110, which is parallel to the LED chip 111 and at least part of corresponding surfaces of the electrodes 106, 108.

In some embodiments, the filler in the layer body 1101 may be selected from one of aluminum oxide and silicon dioxide, in combination with titanium dioxide and graphene. Titanium dioxide accounts for 0.5%-5% of the total amount of solid particles in the layer body 1101, preferably, 12.5%. Titanium dioxide accounts for 0.1%-3% of the total amount of solid particles in the layer body 1101, furthermore, 0.4%-2.5%. Graphene accounts for 0.1%-1% of the total weight of the layer body 1101, preferably, 0.5%. In some embodiments, graphene may be graphene fluoride, which has great insulation performance, great thermal conduction performance and thermal stability, and also has great dispersion stability to keep a relatively stable position in some materials. In the selection of the particle size, aluminum oxide (or silicon dioxide) is greater than titanium dioxide in particle size and titanium dioxide is greater than graphene in particle size. That is, there are particles with three particle sizes in the layer body 1101. Three types of particles are evenly mixed and distributed in the layer body 1101, gaps or thermal break areas therebetween are hard to occur titanium dioxide, so a better heat dissipating effect can be obtained.

Figure 29:
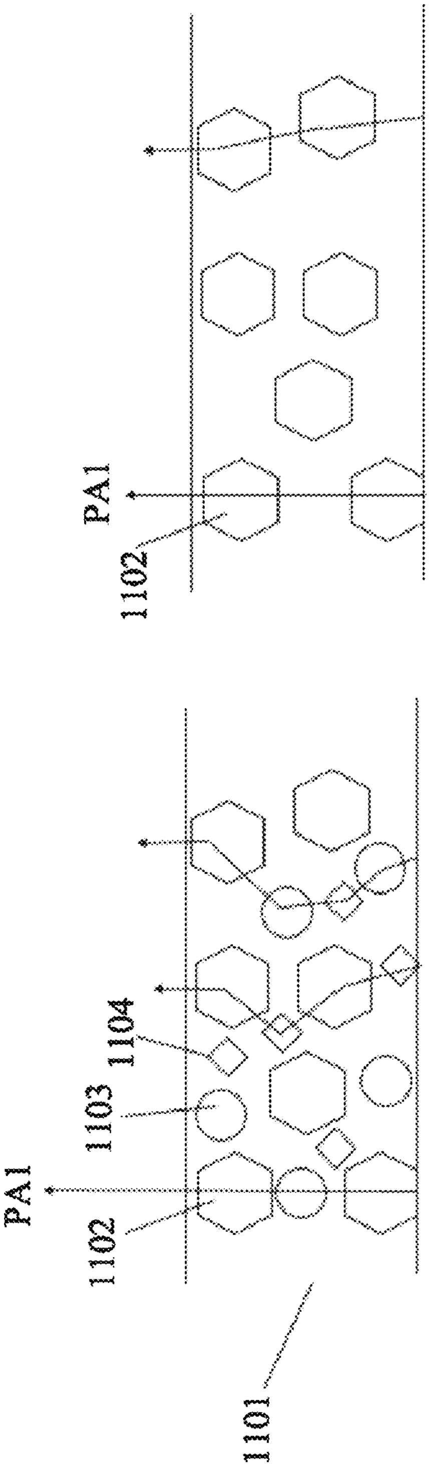
FIG. 29 is a schematic view of the cooling path of the LED filament according to some embodiments of the disclosure, wherein the left in the figure shows an example of the layer body having additional particles with different sizes, and the right in the figure shows an example of the layer body having additional particles with a single size.

Please refer to FIG. 29, which is a schematic view of the cooling path of the LED filament according to some embodiments of the disclosure, wherein the left in the figure shows an example of the layer body having additional particles with different sizes, and the right in the figure shows an example of the layer body having additional particles with a single size. As shown in FIG. 29, particle 1102 stands for a particle with a maximum size (such as aluminum oxide or silicon dioxide), particle 1103 stands for a particle with a middle size (such as titanium dioxide), and particle 1104 stands for a particle with a minimum size (such as graphene). Under the condition of disposing different particle sizes, small-size particles will fill gaps between large-size particles. The heat dissipating paths may be bent and extended between the small-size particles (particle 1104), middle-size particles (particles 1103) and large-size particles (particles 1102) to form complete heat dissipating paths. Among them, the middle-size particles (particles 1103) has the best heat dissipating effect, and silicone's heat dissipating effect is relatively worse. In heat dissipating paths, a path length through heat dissipating particles is far greater than a path length through silicone (or other materials replace silicone as a base material), i.e., high heat dissipating paths account for a high percentage of the total heat dissipating paths, which leads to a great heat dissipating effect. On the other side, in the process of heat transfer, a region which has large temperature difference and a great thermal conduction effect dissipates heat fast, and heat is dissipated from this region first. In the layer body 1101 with different particle sizes, if the thermal conduction effect of particles is great, heat on the particles can be dissipated faster, a certain temperature difference exists between those particles which have different distances from the heat source. Heat is transferred between temperature difference particles first. Silicone's heat dissipating ability is poor, heat is easy to be accumulated, so its temperature difference is small. Thus, heat dissipating paths will select paths composed of particles first and reduce paths composed of silicone. Comparing the heat dissipating paths on the left and right sides in FIG. 29, preferably, heat dissipating paths are paths formed by particles connected in series. Under the condition of the same path length, as shown by path PA1, there is the layer body 1101 having particles with different sizes on the left, the length of the particle path in its heat dissipating path accounts for a high percentage to perform a better cooling effect. On the right of the figure, s single particle, no other smaller particles can be filled into the particle gap, its heat dissipating paths can select silicone only. Under the condition of the same heat dissipating path length, silicone accounts for a high percentage of heat dissipating paths, so its heat dissipating effect is poorer than the left. A proportion of particles with direct contact on the outermost side of the heat dissipating surface can be increased by way of mixing different particles (at least two particle sizes, e.g. some embodiments select aluminum oxide or magnesium oxide with particle sizes between 2.5 mm and 25 mm, titanium dioxide with particle sizes between 0.3 mm and 1 mm, and graphene with particle sizes between 5 nm and 300 nm) and silicone. Meanwhile, gaps between large-size particles can be filled by small-size particles, the microcosmic cooling paths can be optimized to improve the entire heat dissipating effect. Graphene (or graphene fluoride) has great thermo-conductivity, insulation and thermal stability, so it is usually adopted to be one of adding materials. In some embodiments, it can make the layer body 1101 present gray or almost gray (i.e., the filament presents gray or almost gray). More precisely speaking, it makes a color value of the LED filament 100 (or the layer body 1101) in an unlit status, under an RGB standard, within a range of R(100-234), G(100-234) and B(100-234), and an absolute value of a difference between any two of R value, G value and B value is less than or equal to the less one of the two or 5% of the greater one of the two.

Figure 30:
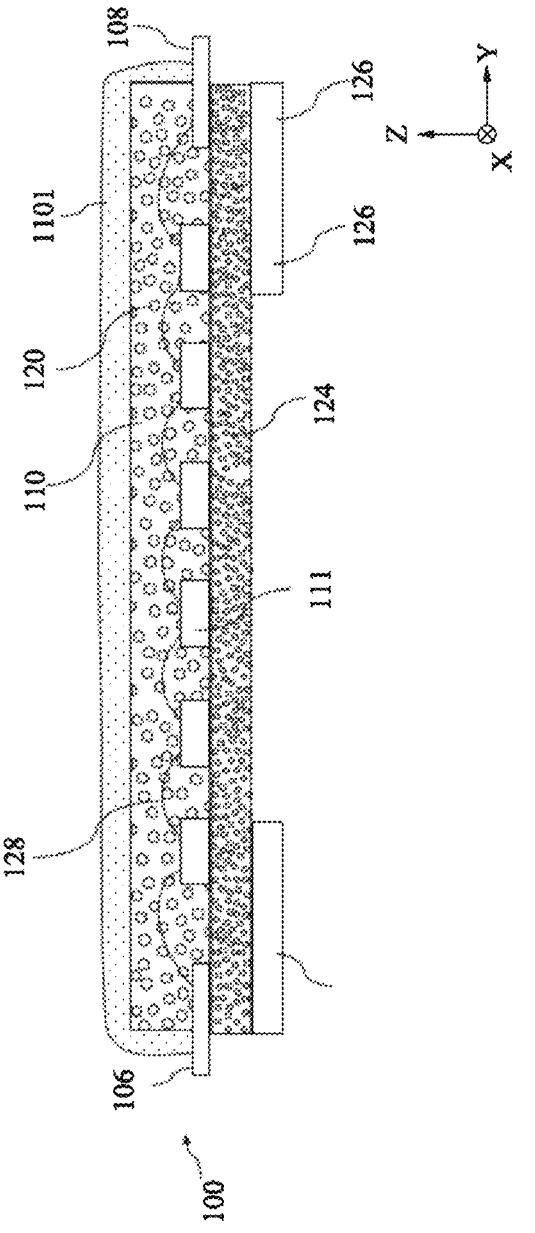
FIG. 30 is a structural schematic view (17) of the LED filament according to some embodiments of the disclosure.

In some embodiments, the light conversion layer 110 has a top layer 120 and a base layer 124. The layer body 1101 may be disposed on the top layer 120. In some embodiments, please refer to FIG. 30, which is a structural schematic view of the LED filament according to some embodiments of the disclosure, layer body 1101 may completely cover the top layer 120 and at least cover parts of surfaces of the electrodes 106, 108, which face the top layer 120.

In some embodiments, the layer body 1101 may only cover the top layer 120 without touching at least parts of the electrodes 106, 108, which face a surface of the top layer 120.

Figure 31:
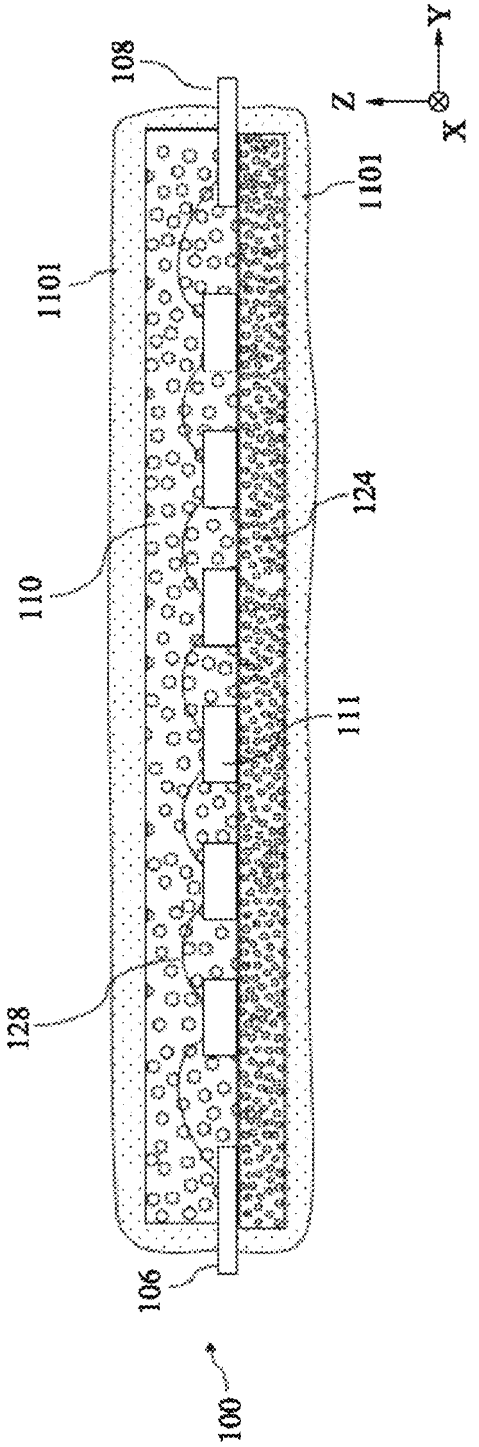
FIG. 31 is a structural schematic view (18) of the LED filament according to some embodiments of the disclosure.

In some embodiments, please refer to FIG. 31, which is a structural schematic view of the LED filament according to some embodiments of the disclosure, the layer body 1101 may completely cover the top layer 120 and the base layer 124 and at least cover at least parts of the electrodes 106, 108, which face surfaces of the base layer 124 and the top layer 120.

Figure 32A:
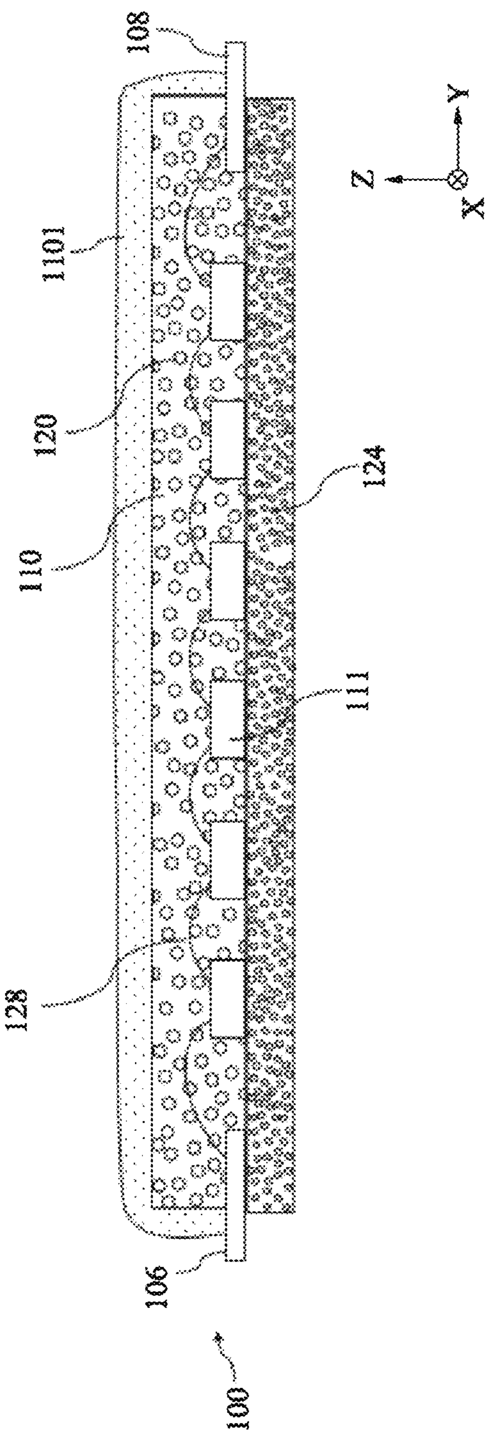
FIG. 32A is a structural schematic view (19) of the LED filament according to some embodiments of the disclosure.

In some embodiments, please refer to FIG. 32A, which is a structural schematic view of the LED filament according to some embodiments of the disclosure, the light conversion layer 110 includes a top layer 120 and a base layer 124. The layer body 1101 may completely cover the top layer 120 and at least cover at least parts of the electrodes 106, 108, which face a surface of the top layer 120, and the base layer 124 is not covered. The thickness of the layer body 1101 along a radial direction of the LED filament 100 is less than or equal to the thickness of the top layer 120 along a radial direction of the LED filament 100. Further, the thickness of the layer body 1101 along a radial direction of the LED filament 100 is less than or equal to one second of the thickness of the top layer 120 along a radial direction of the LED filament 100, furthermore, less than or equal to one third.

In some embodiments, the thickness of the top layer 120 may be configured to 0.2 mm-0.7 mm, furthermore, 0.35 mm-0.5 mm. The thickness of the base layer 124 may be configured to 0.05 mm-0.15 mm, furthermore, 0.08 mm-0.15 mm, to guarantee that the LED filament 100 has sufficient softness.

In some embodiments, because there is a difference between the adding materials in the base layer 124 and the top layer 120, there is a difference of the unit volume of the base layer 124 and the top layer 120 in flexibility and strength. When the base layer 124 is close to the top layer in thickness, the difference between the overall flexibility or strength of the base layer 124 and the top layer 120 will be excessively large because of differences accumulation, so that separation or fracture tends to occur when bending. For example, a ration of the thickness of the base layer 124 to the thickness of the top layer 120 is greater than one second, the overall softness and reliability of the LED filament 100 are insufficient, so that it is possible that softness is insufficient and that separation or fracture of LED filament 100 occurs. Therefore, in the embodiments, a ratio of the thickness of the base layer 124 to the thickness of the top layer 120 is less than or equal to one second, furthermore, less than or equal to three eighths. Accordingly, in the embodiment, controlling a ratio of the thickness of the base layer 124 to the thickness of the top layer 120 to be within the abovementioned ratio range can generate better softness. In other words, physical properties such as flexibility and strength of the base layer 124 and the top layer 120 can be adjusted by thickness control with a difference of the adding materials. Thus the base layer 124 and the top layer 120 have similar physical properties to prevent the LED filament 100 from separating or fracturing.

In some embodiments, a ratio of the thickness of the base layer 124 to the thickness of the top layer 120 is less than or equal to one second, furthermore, less than or equal to three fourths. When the thickness ratio is greater than one second, the layer body 1101 may affect the overall light emission of the filament (the layer body 1101 is added with solid particles).

In some embodiments, the thickness of the layer body 1101 may be configured to 0.05 mm-0.4 mm, furthermore, 0.1 mm-0.2 mm. In some embodiments, when the thickness of the base layer 124 is excessively large, for example, the thickness of the base layer 124 is greater than one fourth of the sum of thicknesses of the layer body 1101, the top layer 120 and the base layer 124, the heat dissipation of the base layer 124 will be affected, i.e., a heat dissipation path of the LED filament 100 is long to be prone to heat accumulation. Therefore, in the embodiment, the thickness of the base layer 124 is less than or equal to one fourth of the thickness of the LED filament 100. In detail, as shown in FIG. 32A, the thickness of the base layer 124 is less than one fourth of the sum of thicknesses of the layer body 1101, the top layer 120 and the base layer 124. As a result, the heat dissipation effect of the base layer 124 can be kept and a heat dissipation path of the LED filament 100 can be shortened to avoid heat accumulation.

In some embodiments, as still shown by FIG. 32A, the light conversion layer 110 includes a top layer 120 and a base layer 124. The layer body 1101 may completely cover the top layer 120 and at least cover at least parts of the electrodes 106, 108, which face a surface of the top layer 120, and the base layer 124 is not covered. The base layer 124 is added with adding materials the same as or similar to those in the layer body 1101 to make the base layer 124 and the layer body 1101 finally appear within the same RGB value range. For example, under the conditions of the original materials, further adding titanium dioxide to make both the layer body 1101 and the base layer 124 present white or almost white, and the color value is within a range of R(235-255), G(235-255) and B(235-255), or continuously adding graphene to make both the layer body 1101 and the base layer 124 present gray or almost gray, and the color value is within a range of R(100-234), G(100-234) and B(100-234). For example, white powder particles are added in both the layer body 1101 and the base layer 124, e.g. titanium dioxide is added in both the layer body 1101 and the base layer 124, and the adding amount of titanium dioxide is 1%-20% of the total weight of the solid particles (powder) in the base layer 124, furthermore, 3%-15%.

In some embodiments, the base layer 124 is further provided with at least one kind of fluorescent powder. The fluorescent powder accounts for 1%-15% of the total weight of the solid particles (powder) in the base layer 124, furthermore, 2%-8%. An average size of particles of fluorescent powder is controlled to be approximately less than 20 μm. In some embodiments, the base layer 124 may be further provided with a certain amount of thermal conductive particles, which include, but not limited to, aluminum dioxide and silicon dioxide, for improving the thermal conductive function. The total weight of the thermal conductive particles in the base layer 124 accounts for 80%-95% of the total weight of solid particles. Sizes of the thermal conductive particles may combine multiple different particle sizes. Particle sizes may be selected between 1 μm and 30 μm, furthermore, 2 μm-25 μm. An average particle sizes are between 1 μm and 20 μm, furthermore, 5 μm-15 μm.

In some embodiments, the total weight of thermal conductive particles in the base layer 124 accounts for 80-95% of the total weight of solid particles in the base layer 124.

In some embodiments, the adding materials in the base layer 124 and the layer body 1101 are the same to make the base layer 124 and the layer body 1101 present the same color. For example, the base layer 124 presents white, after the light conversion layer 110 is disposed on the base layer 124, the layer body 1101 is further disposed on the light conversion layer 110, and the layer body 1101 completely covers the light conversion layer 110 so as to make the filament formed present white under an unlit status. Of course, the layer body 1101 may also at least cover part of the light conversion layer 110.

In some embodiments of the disclosure, the base layer 124 is added with silver-gray or silver-white thermal conductive particles. The thermal conductive particles includes, but not limited to, aluminum powder, oxide of aluminum powder, silver powder or mixed powder of aluminum and silver. The silver-gray or silver-white thermal conductive particles may be disposed in the base layer 124 or the layer body 1101 to at least one side of the soft filament appear silver-gray or silver-white.

When the silver-gray or silver-white thermal conductive particles are disposed in the base layer 124, the thermal conductive particles account for 0.15%-10% of the total amount of solid particles in the base layer 124, furthermore, 0.3%-5%. The total weight of the thermal conductive particles (including but not limited to aluminum oxide or silicon dioxide) and fluorescent powder particles in the base layer 124 accounts for 95%-99% of the total weight of solid particles in the base layer 124. A thermal conductivity of the base layer 124 can be increased by controlling the proportion of solid particles in the base layer 124 to enhance conducting the heat from the LED chip 111 lit.

To distinguish the sliver-gray or silver-white thermal conductive particles from the thermal conductive particles, the sliver-gray or silver-white thermal conductive particles may be called chromogenic particles. The chromogenic particles account for 0.15%-10% of the total amount of solid particles in the base layer 124, furthermore, 0.3%-5%. Of course, the sliver-gray or silver-white thermal conductive particles, the thermal conductive particles and the fluorescent powder particles may also be added into the base layer 124 with different percentages.

In some embodiments of the disclosure, the layer body 1101 is disposed with the sliver-gray or silver-white thermal conductive particles, which account for 0.05%-10% of the total weight of the layer body 1101, furthermore, 0.15%-5%. The thickness of the top layer 120 disposed on the surface of the base layer 124, which faces the LED chip 111 is 0.2 mm-0.6 mm, furthermore, 0.35 mm-0.5 mm. The thickness of the base layer 124 is 0.05 mm-0.3 mm, furthermore, 0.1 mm-0.2 mm. The thickness of the base layer 124 is 0.04 mm-0.3 mm, furthermore, 0.08 mm-0.15 mm. The thickness of the base layer 124 is less than or equal to one third of the total thickness of the base layer 124, the top layer 120 and the layer body 1101, furthermore, one fourth. As a result, not only can the appearance demands be satisfied, but also the lighting and heat dissipating demands can be satisfied.

In some embodiments of the disclosure, the base layer 124 may include a multi-layer structure such as an at least two-layer structure. One layer which nears the LED chip 111 is added with thermal conductive particles and fluorescent powder particles, and the outermost layer is added with sliver-gray/silver-white thermal conductive particles. That is, in the finished product of filament, a surface which is located on the outermost side and is visible by the naked eye appears sliver-gray/silver-white.

In some embodiments, the LED chips 111 can be electrically connected by conductive metal wires such as gold wires, silver wires, copper wires or aluminum wires. The LED chips 111 are electrically connected through wiring. Of course, the LED chips 111 and the electrodes 106, 108 can also be electrically connected through wiring conductive metal wires.

In some embodiments of the disclosure, the base layer 124 is disposed with a cooper foil circuit which extends along the length direction of the base layer 124. The LED chips 111 are disposed on the copper foil circuit by way of flip chip and electrically connected with the copper foil circuit. The LED chips 111 extend along the copper foil circuit or along the length direction of the base layer 124, and two ends of the copper foil circuit are electrically connected with the electrodes 106, 108 so as to implement electric connection and lighting of the whole filament.

In some other embodiments of the disclosure, the base layer 124 is added with golden thermal conductive particles including, but not limited to, bronze powder, brass powder, gold powder or combinations thereof. The golden thermal conductive particles may be disposed in the base layer 124 or the layer body 1101 to make at least side of the soft filament golden.

When the base layer 124 is provided with the golden thermal conductive particles, the thermal conductive particles account for 0.5%-15% of the total amount of solid particles in the base layer 124, furthermore, 1%-10%. The total weight of thermal conductive particles in the base layer 124 (including, but not limited to, aluminum oxide or silicon dioxide) and fluorescent powder particles is 90%-99% of the total weight of solid particles in the base layer 124. To distinguish the golden thermal conductive particles from the thermal conductive particles, the golden cooling particles may be called chromogenic particles. The chromogenic particles account for 0.5%-15% of the total amount of solid particles in the base layer 124, furthermore, 1%-10%. Of course, the golden thermal conductive g particles, the thermal conductive particles and the fluorescent powder particles may also be added into the base layer 124 with different percentages.

In one embodiment of the disclosure, the layer body 1101 is added with golden thermal conductive particles, which account for 0.05%-10% of the total weight of the layer body 1101, furthermore, 0.1%-5%. The thickness of the top layer 120 disposed on the surface of the base layer 124, which faces the LED chip 111 is 0.1 mm-1 mm, furthermore, 0.35 mm-0.5 mm. The thickness of the base layer 124 is 0.05 mm-0.3 mm, furthermore, 0.1 mm-0.2 mm. The thickness of the base layer 124 is 0.04 mm-0.3 mm, furthermore, 0.08 mm-0.15 mm. The thickness of the base layer 124 is less than or equal to one third of the total thickness of the base layer 124, the top layer 120 and the layer body 1101, furthermore, one fourth. As a result, not only can the appearance demands be satisfied, but also the lighting and heat dissipating demands can be satisfied.

In one embodiment of the disclosure, the base layer 124 may include a multi-layer structure such as an at least two-layer structure. One layer which nears the LED chip 111 is added with thermal conductive particles and fluorescent powder particles, and the outermost layer is added with golden thermal conductive particles. That is, in the finished product of filament, a surface which is located on the outermost side and is visible by the naked eye appears golden.

In the embodiment of the disclosure, the LED chips 111 can be electrically connected by conductive metal wires such as gold wires, silver wires, copper wires or aluminum wires. The LED chips 111 are electrically connected through wiring. Of course, the LED chips 111 and the electrodes 106, 108 can also be electrically connected through wiring conductive metal wires.

In another embodiment of the disclosure, the base layer 124 is disposed with a cooper foil circuit which extends along the length direction of the base layer 124. The LED chips 111 are disposed on the copper foil circuit by way of flip chip and electrically connected with the copper foil circuit. The LED chips 111 extend along the copper foil circuit or along the length direction of the base layer 124, and two ends of the copper foil circuit are electrically connected with the electrodes 106, 108 so as to implement electric connection and lighting of the whole filament.

In some other embodiments of the disclosure, the base layer 124 is implemented by a BT resin substrate material (hereinafter "BT substrate") as a primary material. The BT (bismaleimide triazine) substrate is synthesized from bismaleimide (BMI) and cyanate ester (CE) resin.

In some other embodiments of the disclosure, the base layer 124 includes a BT substrate located on the lowermost place of the base layer 124. A cooper foil circuit is disposed on the BT substrate. The copper foil circuit extends along the length direction of the BT substrate and at least 70% of the length direction of the BT substrate is disposed with the copper foil circuit. The copper foil circuit is also disposed with electrodes 106, 108 at two ends of the BT substrate. The copper foil circuit is electrically connected to the electrodes through wiring or soldering. The copper foil circuit may be disposed with anti-oxidation layer on its surface depending on demands. The anti-oxidation layer may be formed by electroplating silver or silver or by passivation. Of course, in the process forming the anti-oxidation layer, the copper foil circuit is still reserved with contacts for electrically connecting with the LED chip 111. The LED chip 111 is disposed on the copper foil circuit by flip chip, i.e., solder paste is disposed on the reserved contacts of the copper foil circuit. The pin side of the LED chip 111 faces the copper foil circuit and is in contact with the solder paste on the contacts. The solder paste can be sufficiently melted and connected with pins of the LED chip 111 by reflow soldering, laser soldering or other methods, and then the LED chip 111 is cooled and fixed with the copper foil circuit and implement electric connection. Finally, the electric connection and lighting of the LED filament can be implemented. A packaging glue material is disposed on the LED chip 111 and the copper foil circuit. The packaging glue material may be a glue material such as silicone, resin or polyimide. The glue material is mixed with fluorescent powder particles, thermal conductive particles or at least one kind of the abovementioned solid particles. The glue material completely covers the LED chip 111 and at least covers parts of the electrodes 106, 108 so as to form the top layer 120 covering the base layer 124. The top layer 120 at least possesses highly efficient heat dissipation and light conversion functions by way of various kinds of particles mixed in association with its own material properties. On the top layer 120, which is a surface away from the chip 111, is disposed with the layer body 1101. The layer body 1101 completely or at least covers part of the top layer. The layer body 1101 is added with white solid powder including, but not limited to, titanium dioxide, aluminum oxide, magnesium oxide or silicon dioxide, to make the layer body 1101 present white in an unlit status. That is, under the RGB standard, its color value is within a range of R(235-255), G(235-255) and B(235-255). A weight of the white solid powder particles may account for 0.7%-3% of the total weight of the layer body 1101. Of course, the layer body 1101 may also be disposed with solid powder particles with other colors to make the layer body 1101 present other colors such as red, orange, yellow, green, blue, indigotic, purple, gray, black, golden or silver.

In some embodiments, the BT substrate has light transmittance and light conversion functions and its color is white, too. Under the RGB standard, its color value is within a range of R(235-255), G(235-255) and B(235-255). And the BT substrate is located on the outermost side, so the base layer 124, i.e., a side of the BT substrate, which is away from the LED chip 111, is not needed to be disposed with an additional white coating (e.g. the above layer body 1101), the LED filament can still present white in association with the layer body 1101 under an lit status. That is, under the RGB standard, its color value is within a range of R(235-255), G(235-255) and B(235-255).

In one embodiment of the disclosure, the light transmittance of the BT substrate is greater than or equal to 30%.

In another embodiment of the disclosure, the light transmittance of the BT substrate is greater than or equal to 35%.

In another embodiment of the disclosure, the light transmittance of the BT substrate is greater than or equal to 80%.

Of course, in some other embodiments of the disclosure, the filament can present different colors in an unlit status by a BT substrate with different colors, for example, a yellow BT substrate, a blue BT substrate, a gray BT substrate, a black BT substrate, a red BT substrate, a green BT substrate, a purple BT substrate, a golden BT substrate, a silver BT substrate, etc., so that the filament can present a required color in an unlit status.

In some embodiments of the disclosure, the BT substrate and the layer body 1101 may be the same color, i.e., the filament presents a consistent color.

In some embodiments of the disclosure, the BT substrate and the layer body 1101 may be different colors, i.e., the filament presents different colors or at least two colors.

In one embodiment of the disclosure, the thickness of the base layer 124 is less than or equal to 0.20 mm, furthermore, it can be controlled to be less than or equal to 0.15 mm. Under this thickness condition, the base layer 124 may have better light transmittance and heat dissipation performance, its light transmittance is greater than or equal to 50%, and its thermal conductivity is greater than or equal to 1 W/(m·K). An outer side of the base layer 124 is further disposed with a color layer, which can implement a thinner thickness and better heat dissipation performance. Also, a thinner thickness can satisfy the flexibility demand of the soft filament.

In another embodiment of the disclosure, in the process of forming the BT substrate, a side of the BT substrate, which faces the LED chip 111, is added with fluorescent powder particles, thermal conductive particles or other solid particles as abovementioned to make the BT substrate have light conversion ability. A side of the BT substrate, which is opposite to the LED chip 111, may be disposed with titanium dioxide (or other powder particles with a specific color), thermal conductive particles, fluorescent powder particles or solid particles as abovementioned to make the BT substrate present a required color to implement a specific function. For example, a side of the BT substrate, which is opposite to the LED chip 111, is disposed with titanium dioxide particles to make it present white.

In one embodiment of the disclosure, in the process of forming the BT substrate, a side of the BT substrate, which faces the LED chip 111, and the other side of the BT substrate, which is opposite to the LED chip 111, present the same color.

In another embodiment of the disclosure, in the process of forming the BT substrate, a side of the BT substrate, which faces the LED chip 111, and the other side of the BT substrate, which is opposite to the LED chip 111, present different colors. For example, the opposite side presents white and the facing side presents yellow to make the opposite side unnecessary to be additionally disposed with a white coating when the filament presents white. The solid particles added therein may be controlled to be distributed at different positions by density, magnetic field or electric field control.

Of course, in the process of forming the BT substrate, solid particles are not necessarily disposed.

In one embodiment of the disclosure, the color the filament presents in an unlit status is the same as the color the filament presents in a lit status or the color of the emitted light therefrom.

In one embodiment of the disclosure, the color the filament presents in an unlit status is different from the color the filament presents in a lit status or the color of the emitted light therefrom.

Figure 32B:
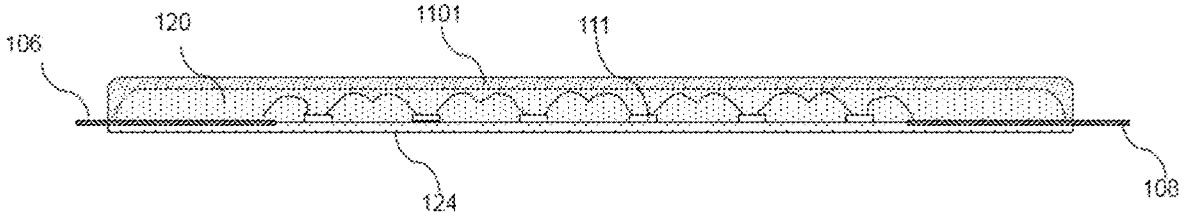
FIG. 32B is a schematic cross-sectional view of the LED filament along the length direction according to some embodiments of the disclosure.
Figure 32C:
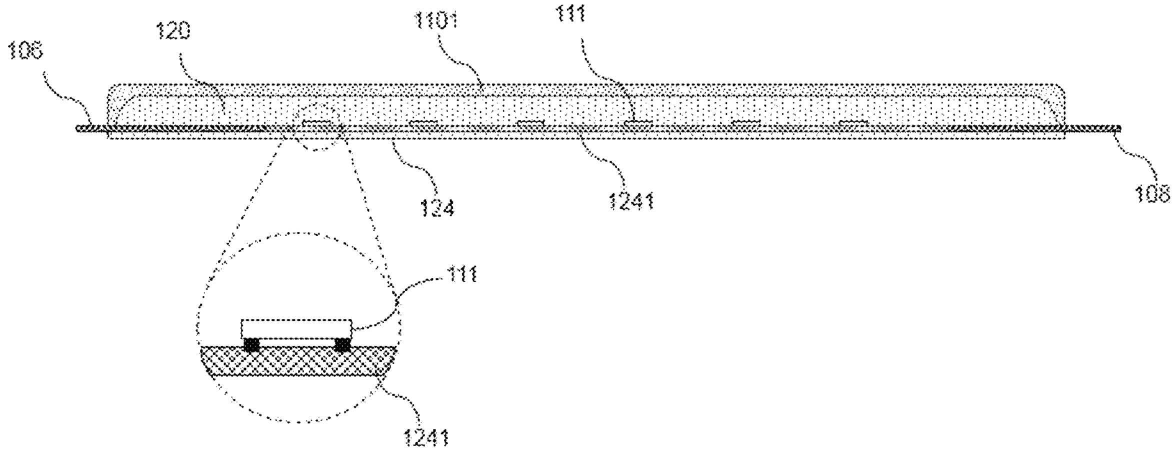
FIG. 32C is a schematic cross-sectional view of the LED filament along the length direction according to some embodiments of the disclosure.

Please refer to FIGS. 32B and 32C, which are schematic cross-sectional views of the filament adopting the BT substrate as a primary material along the length direction according to some embodiments of the disclosure. As shown in FIG. 32B, in the embodiments of the disclosure, a BT plate serves as a primary material of the base layer 124 of the filament. The BT substrate is disposed on a lower side of the base layer 124, i.e., on a side away from the LED chip 111, more precisely speaking, on the outermost side. That is, at least one side of the BT substrate serves as an outer surface of the LED filament. A copper foil circuit 1241 is disposed on an upper surface of the base layer 124 (a side facing the LED chip 111). The copper foil circuit 1241 extends along the length direction of the LED filament and is formed with electrodes 106, 108 at two ends of the LED filament. The base layer 124 has already had positive and negative electrodes at two ends when forming. The base layer 124 at least sheathes parts of the electrodes 106, 108. It is unnecessary to additionally dispose positive and negative electrodes in the packaging process of the LED filament. And the electrodes 106, 108 are integratedly formed in the base layer 124 when forming the base layer 124, so they have great connective strength. Damage such as fracture or peeling off is not easy to occur when bending the LED filament.

In one embodiment of the disclosure, the LED chip 111 and the copper foil circuit 1241 are fixed and electrically connected by solder paste. Please refer to FIG. 32C. An upper layer of the base layer, i.e., a side near the LED chip 111 is a surface formed by the copper foil circuit 1241, the LED chip 111 is fixed on the copper foil circuit 1241 by solder paste. As shown by the enlarged portion in the figure, the LED chip 111 is fixed and electrically connected to the copper foil circuit 1241 by two pieces of solder paste, or at least two pins of the LED chip 111 are fixed and electrically connected to the copper foil circuit 1241. The top player 120 is disposed on the copper foil circuit 1241 and the LED chip 111, i.e., a side of the LED chip 111, which is away from the base layer 124. The top layer 120 completely covers the LED chip 111 on the base layer 124 and covers at least parts of the electrodes 106, 108. In another embodiment of the disclosure, the top layer 120 covers at least part of the copper foil circuit.

A side of the top layer 120, which is away from the LED chip 111 or the base layer 1, is disposed with a layer body 1101. The layer body 1101 completely covers or at least covers a surface of the top layer 120, which is away from the base layer 124. The layer body 1101 at least covers parts of the electrodes 106, 108 or part of the copper foil circuit 1241.

In another embodiment of the disclosure, there is no contact between the layer body 1101 and the electrodes 106, 108 or the copper foil circuit 1241. That is, a contact area of the layer body 1101 and the base layer 124 is zero.

The LED chips 111 are arranged to extend along the axial direction of the LED filament at regular intervals, i.e., along the length direction of the LED filament, until two ends of the LED filament, i.e., positions of the electrodes 106, 108. The LED chips 111 and the electrodes 106, 108 are fixed and electrically connected by flip chip and solder paste so as to electrically connect and light up the entire LED filament or all LED chips 111 on the LED filament. In a direction perpendicular to the maximum surface of the LED chip 111 or the maximum surface of the electrodes 106, 108, the projections of the LED chip 111 and the electrodes 106, 108 at least overlap.

In some embodiments, the solder paste may also be replaced with other materials which are conductive and has a fixing function, such as conductive glue.

In another embodiment of the disclosure, the LED chips 111 are arranged to extend along the axial direction of the LED filament at irregular intervals, i.e., along the length direction of the LED filament. That is, the distances between adjacent two of the LED chips 111 are at least two in number.

In another embodiment of the disclosure, the LED chips 111 and the electrodes 106, 108 may also be electrically connected by metal wires or wiring. In a direction perpendicular to the maximum surface of the LED chip 111 or the maximum surface of the electrodes 106, 108, the projections of the LED chip 111 and the electrodes 106, 108 do not overlap or the overlapping area is zero.

In another embodiment of the disclosure, the base layer 124 is not necessarily disposed with a copper foil circuit 1241. The LED chips 111 are in direct contact with the BT substrate when the LED chips 111 are fixed on the base layer 124. When fixing the LED chips 111, a die-bond adhesive is disposed on a surface of the base layer 124 or the BT substrate. After the die-bond adhesive has be applied on a surface of the base layer 124, the LED chips 111 are disposed on the die-bond adhesive in a specific arrangement and are exerted with proper pressure to make the LED chips 111 sink into the die-bond adhesive, i.e., at least some areas are covered by the die-bond adhesive. The LED chips 111 are at least partially received in or sunk into the die-bond adhesive in a direction perpendicular to the base layer 124. The LED chips 111 can be fixed on the base layer 124 after the die-bond adhesive has solidified. The LED chips 111 sinks into or is embedded into the die-bond adhesive, which has high fixing strength, so falling off or separation of the chips and the base layer 124 is not easy to occur. Of course, in other embodiments, a specific solvent can be used to remove excess die-bond adhesive.

When disposing the LED chips 111 or before or after disposing the LED chips 111, two ends of the LED filament are disposed with electrodes.

After the LED chips 111 and the electrodes have been disposed, electric connection and signal transmission between the LED chips 111 can be implemented by metal wires wiring. The LED chips 111 and the electrodes 106, 108 are electrically connected also by wiring to electrically connect and light up the LED filament. The metal wire may be a single metal wire such as a gold wire, a silver wire, an aluminum wire, a copper wire, etc., and may also be an alloy wire made of two metals in a specific proportion, such as a gold-silver alloy wire.

After wiring, a side of the base layer 124, which is mounted by the LED chips 111, is applied with glue to form the top layer 120. The top layer 120 completely packages the LED chips 111 and the metal wires on the base layer 124. That is, the top layer 120 covers the LED chips 111 and the metal wires and connects with the base layer 124 to isolate the LED chips 111 and the metal wires from the outer environment, and at least covers parts of the electrodes 106, 108.

In another embodiment of the disclosure, the base layer 124 further includes a copper foil circuit 1241. The copper foil circuit 1241 forms electrodes 106, 108 at two ends of the filament. When disposing the LED chips 111, the LED chips 111 are fixed on the copper foil circuit 1241 by a die-bond adhesive, but electric connection and signal transmission between the LED chips 111 and between the LED chips 111 and the electrodes 106, 108 are implemented by metal wires wiring.

Figure 33:
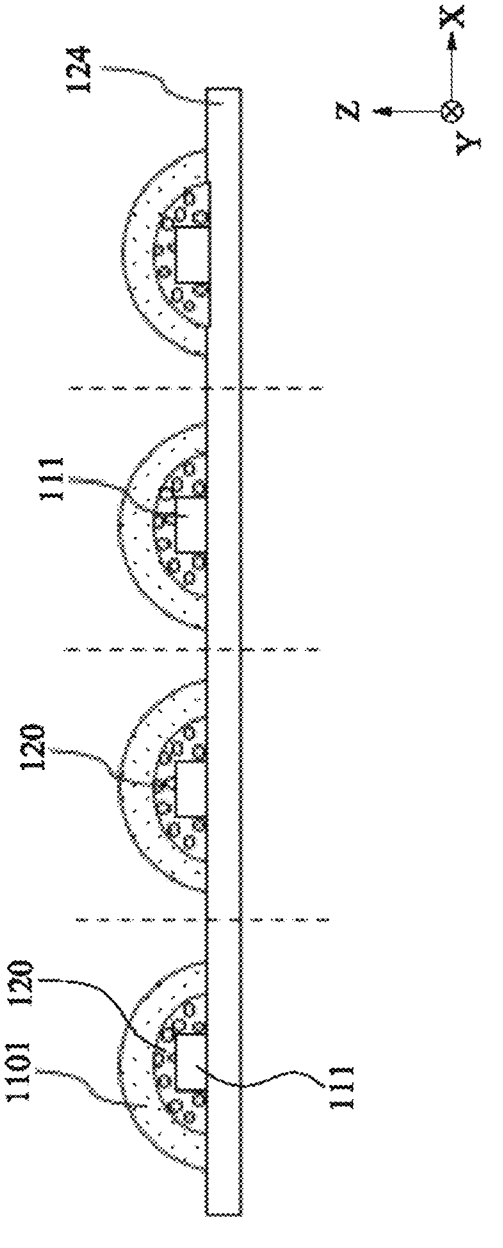
FIG. 33 is a schematic cross-sectional structural view (1) of the LED filament according to some embodiments of the disclosure.

In one embodiment of the disclosure, a top layer 120 is disposed on the LED chips 111 and the base layer 124. An outer surface of the top layer 120 is covered with the layer body 1101. In a cross-section along the radial direction of the LED filament, the top layer 120 appears arcuate or arcuately protrudes, and the layer body 1101 is an arcuate shape closely attached thereon (as shown in FIG. 33). In this way, the least amount of raw materials is required, and the surface has no edges and corners, which avoids stress concentration and reduces costs. On the other hand, the arcuate shapes of the top layer 120 and the layer body 1101 preferably meet the arcuate shape of the spreading angle of beam of the LED chip 111 so as to make the passing paths (the paths the light runs through the top layer 120 and the layer body 1101) of the light emitted from the LED chips 111 through the top layer 120 and the layer body 1101 and finally emitted out approximately identical. The light conversion effect and the light loss are substantially identical, too. The light emission at each position is basically uniform. Thus, evenness of the light emission can be guaranteed. On the other hand, an arcuate surface, particularly a convex surface, has a light-diffusible effect, which diffuses light instead of concentration, so that the range of light emission becomes wider and light diffusion without concentration makes the light emission softer. Of course, the cross-section of the top layer 120 and the layer body 1101 may also be rectangular, conic or other shapes.

As shown in FIG. 32B, in one embodiment of the disclosure, the thickness of the base layer 124 is 0.04 mm-0.12 mm, the thickness of the top layer 120 is 0.35 mm-0.5 mm, and the thickness of the layer body 1101 is 0.1 mm-0.2 mm. In the embodiment as shown in FIG. 32B, the thickness of the base layer 124 is less than or equal to one fourth of the sum of the thicknesses of the base layer 124, the top layer 120 and the layer body 1101. This guarantees the bendability performance and anti-separation of the LED filament.

In other embodiments of the disclosure, multiple kinds of solid powder particles are disposed in the layer body 1101, such as thermal conductive particles, photoluminescent particles, etc.

Figure 32D:
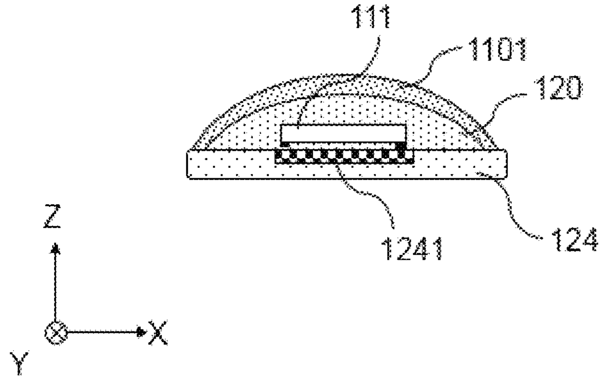
FIG. 32D is a schematic cross-sectional view of the LED filament along the radial direction according to some embodiments of the disclosure.

Please refer to FIG. 32D, which is a schematic cross-sectional view of the LED filament along the radial direction according to some embodiments of the disclosure. In association with FIG. 32C, along the Z-axis direction or the direction directed to the LED chip 111 from the base layer 124, the lowermost layer is the base layer 124, the copper foil circuit 1241 is embedded on the base layer 124 (or embedded with electrodes 106 or 108). At least part of the copper foil circuit 1241 is exposed from the base layer 124. The LED chip 111 is fixed on the copper foil circuit 1241 by at least two pieces of solder paste. The top layer completely covers the LED chip 111 and covers at least part of the base layer 124. The layer body 1101 is disposed on a side of the top layer 120, which is away from the base layer 124 and at least covers part of the top layer 120.

In some embodiments of the disclosure, in the cross-section along the LED filament, the LED filament appears arcuate or rectangular. As shown, the layer body 1101 covers two sides of the top layer 120 and appears arcuate. In some embodiments, the layer body 1101 only covers a side of the top layer 120, which is away from the LED chip 111, and without covering a lateral side of the top layer 120. Of course, it can be said that the layer body 1101 covers at least part of the top layer 120 (chips and wires are not shown in the figure).

In one embodiment of the disclosure, the LED filament may present a combination of regions with different colors in a regular arrangement in an unlit status. In detail, a single LED filament presents a combination of regions with different colors. However, the LED filament has a uniform color of light emitted or the light emitted is the same color in a lit status. For example, the LED filament presents at least two color regions in an unlit status, such as a yellow region and a white region, but in a lit status, the light emitted is white.

In another embodiment of the disclosure, the LED filament presents a combination of regions with different colors in a regular arrangement in an unlit status, and when the filament is in a lit status, its light emitted is multiple colors, too.

In one embodiment of the disclosure, the LED filament presents at least two color regions in an unlit status, and when the LED filament is in a lit status, it emits light with two colors. And the color of the light emitted of each light emission region is the same as the color the corresponding light emission region presents in an unlit status.

In another embodiment of the disclosure, the LED filament has at least two color regions in an unlit status, and the LED filament emits light with at least colors in a lit status, but the color of the light emitted of each light emission region is at least partially different from the color the corresponding light emission region presents in an unlit status.

Figure 32E:
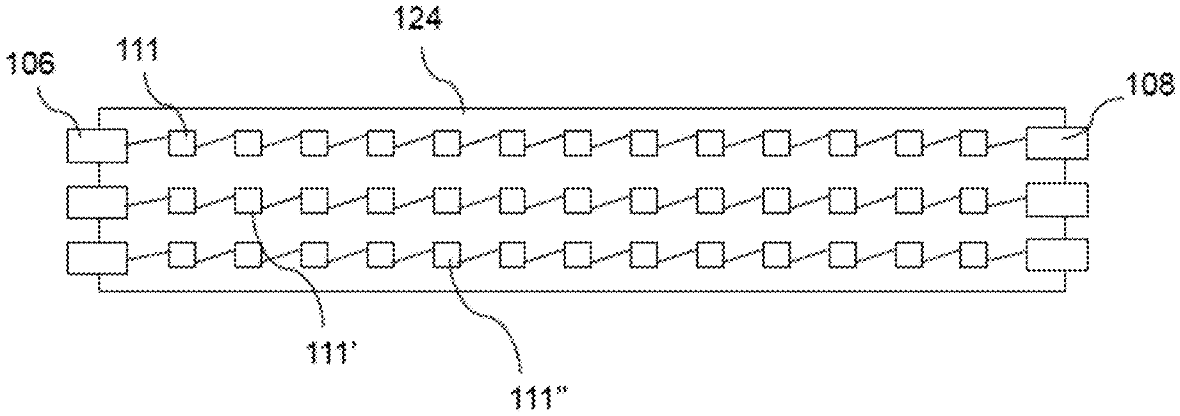
FIG. 32E is a schematic cross-sectional view of the maximum surface of the LED filament along the length direction and with being parallel to the maximum surface of the LED chip according to some embodiments of the disclosure.

Please refer to FIGS. 32B and 32E. FIG. 32B is a schematic cross-sectional view of the LED filament along the length direction and with being perpendicular to the maximum surface of the LED chip according to some embodiments of the disclosure. FIG. 32E is a schematic cross-sectional view of the maximum surface of the LED filament along the length direction and with being parallel to the LED chip according to some embodiments of the disclosure. As shown in FIG. 32B, the top layer 124 is at least disposed with a row of LED chips 111 arranged along the length direction. In the embodiment of the disclosure, the base layer 124 is disposed with three rows of LED chips 111 arranged along the length direction. The three rows of LED chips 111 arranged along the length direction can be configured to the same type or different types of chips, as shown in FIG. 32E.

As abovementioned, a white BT substrate as a base material forms the base layer 124, and two ends of the base layer 124 are formed with electrodes 106, 108. The LED chips 111 are disposed on the basis. Finally, the top layer 120 is disposed to form the LED filament. Metal wire wiring is disposed between the LED chips 111 and between the LED chips 111 and the electrodes 106, 108 to perform electric connection. Please refer to FIG. 32E. A single strip of LED filament may be disposed with multiple rows of LED chips 111 extending along the length direction of the LED filament. The LED chips 111 have at least two types or multiple type. Please refer to FIG. 32E. A single strip of LED filament may be disposed with a three-row LED chip array. The LED chips 111 form the first row LED array, the LED chips 111' form the second row LED array, and the LED chips 111" form the third row LED array. The electric connection between the three rows of LED arrays is independent. The distance between the LED chips has at least one kind. The connecting lines of the three rows of LED arrays do not cross. The LED chips 111 are blue chips, the LED chips 111' are red chips, and the LED chips 111" are green chips. A glue layer is disposed on the LED chips. The glue layer includes, but not limited to, silicone, resin, polyimide, etc., to form the abovementioned top layer 120. The top layer 120 is a transparent glue layer to make the light emission color greater than or equal to 3 when the LED filament is lit.

In another embodiment of the disclosure, the light emission color is also greater than or equal to 3 when the LED chips are lit, but the final emitted light after the LED filament is lit still has only one kind.

In another embodiment of the disclosure, the final emitted light or the mixed light can be implemented to be white by means of the proportion of light emitted, the relative position relationship, the proportion of light intensity between the blue chips, the red chips and the green chips, or the proportion of the amount of chips. For example, when controlling the light intensity, blue light intensity:red light intensity: green light intensity is 1:3:6.

Figure 32F:
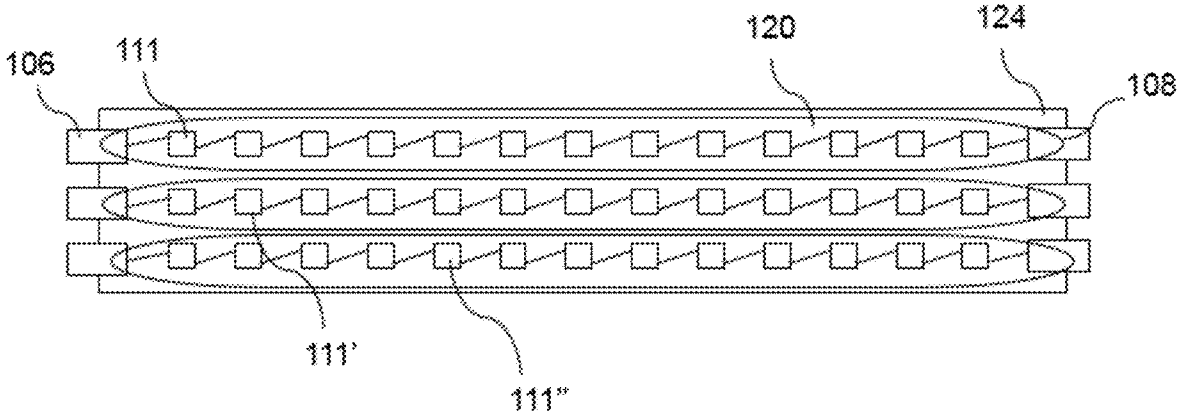
FIG. 32F is a schematic cross-sectional view of the maximum surface of the LED filament along the length direction and with being parallel to the LED chip according to some embodiments of the disclosure.
Figure 32G:
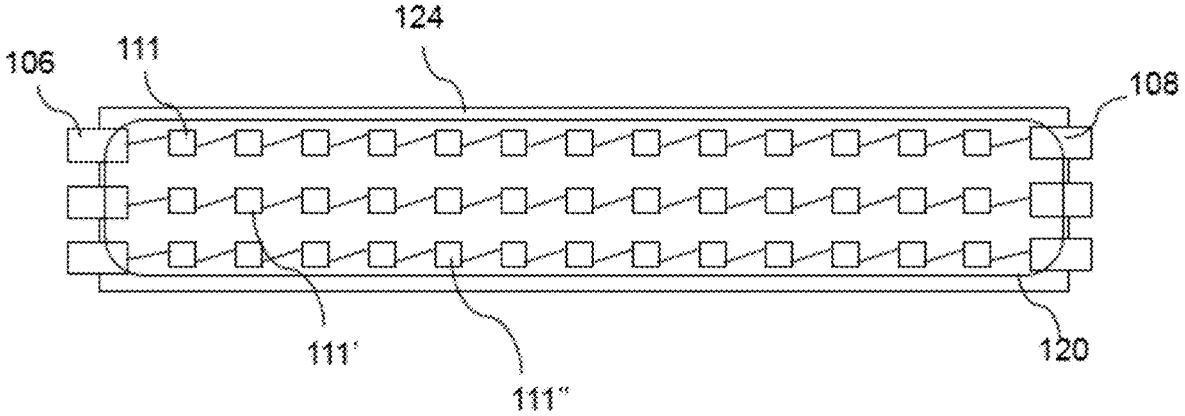
FIG. 32G is a schematic cross-sectional view of the maximum surface of the LED filament along the length direction and with being parallel to the LED chip according to some embodiments of the disclosure.

Please refer to FIGS. 32F and 32G, which are schematic cross-sectional views of the maximum surface of the LED filament along the length (axial) direction and with being parallel to the LED chip according to some embodiments of the disclosure. In an embodiment, as shown in FIG. 32F, the top player 120 may be independently disposed to correspond to each row of LED chips. Parts of the top layer 120, which are between each row of LED chips, are apart from each other without contact. In another embodiment, as shown in FIG. 32G, the entire top layer 120 is disposed on the multi-row LED chip array, i.e., the top layer 120 at least covers one row of LED chips.

Please refer to FIG. 32E. In one embodiment of the disclosure, two ends of the LED filament, i.e., each end of the LED filament is disposed with multiple electrodes, or each end is disposed with electrodes whose amount is greater than or equal to the amount of rows of the LED chip array. The LED chip array is connected to corresponding electrodes. The circuit of each row of LED chips is independent. Along the length direction of the filament, the direction of current of each row of LED chips is unidirectional. Each row of LED chips can be independently or synchronously controlled. The light emission and color temperature of the LED filament can be controlled by controlling different rows of the LED chip arrays in the LED filament.

Figure 32H:
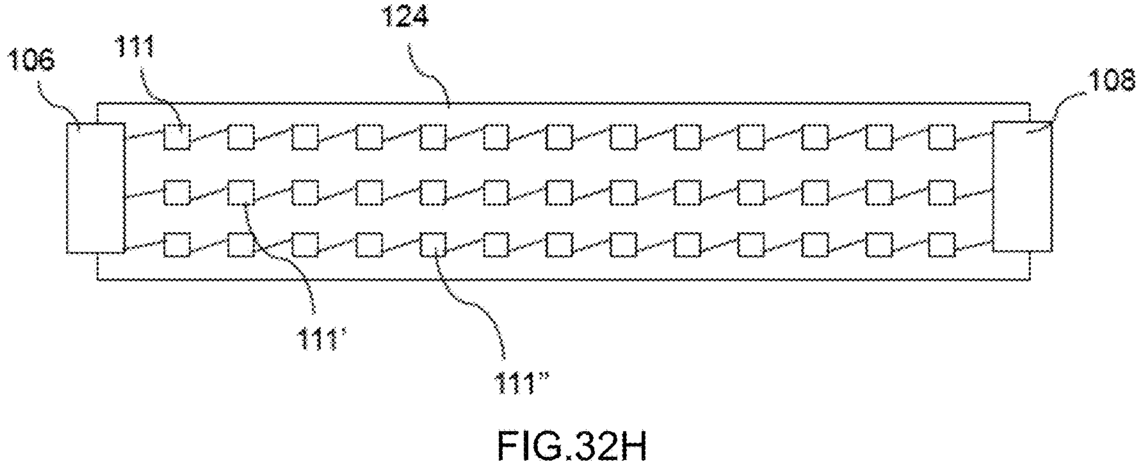
FIG. 32H is a schematic cross-sectional view of the maximum surface of the LED filament along the length direction and with being parallel to the LED chip according to some embodiments of the disclosure.

In another embodiment of the disclosure, two ends of the LED filament are separately disposed with one electrode (i.e., one positive electrode and one negative electrode). Multiple rows of LED chips share a positive electrode and a negative electrode. As shown in FIG. 32H, multiple rows of LED chips are connected in parallel. That is, there are multiple current channels on each LED filament, and the multiple current channels are apart from each other. Failure of one current channel does not affect other current channels. Along the length direction of the LED filament, there is only one current direction. All rows of LED chips are synchronously controlled.

Figure 32I:
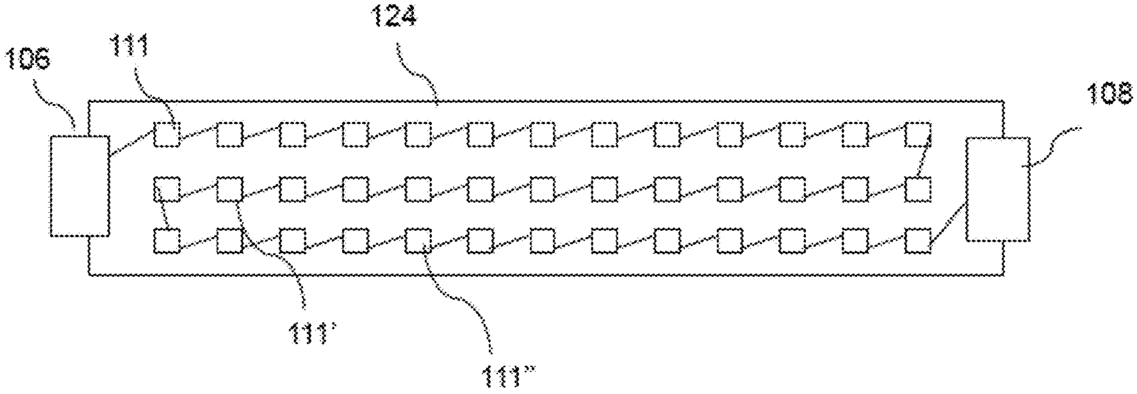
FIG. 32I is a schematic cross-sectional view of the maximum surface of the LED filament along the length direction and with being parallel to the LED chip according to some embodiments of the disclosure.

In another embodiment of the disclosure, two ends of the LED filament are separately disposed with one electrode (i.e., one positive electrode and one negative electrode). Multiple rows of LED chips share a positive electrode and a negative electrode. As shown in FIG. 32I, multiple rows of LED chips are connected in series. That is, there is one current channel on each LED filament, but along the length (axial) direction of the LED filament, there are multiple current directions or at least one current direction.

In other embodiments of the disclosure, the LED filament may be a multi-color-light chip array formed by at least one blue chip, at least one red chip and at least one green chip connected in series or parallel, and then the multi-color-light chip array is further connected in series or parallel.

In other embodiments of the disclosure, the top layer 120 (or the light conversion layer 110) is mixed with fluorescent powder to make the top layer have a light conversion function. Please refer to FIG. 32F. In an embodiment of the disclosure, the top layer 120 disposed on the first row of LED chips formed by the LED chips 111 is mixed with fluorescent powder particles, and only corresponding to the first row of LED chips, i.e., corresponding to blue chips. The fluorescent powder particles added can make the light emitted by the first row of blue chips finally appear white after light conversion. For example, the fluorescent powder added is yellow fluorescent powder, the glue layer on the first row of LED chips, i.e., the top layer 120 (or the light conversion layer 110), is yellow, this region emits white light when the LED filament is lit, and the light in a lit status is different from the region in an unlit status. The corresponding glue layer of the second row of LED chips 111', i.e., the light conversion layer 110, is added with corresponding red fluorescent powder to make the light emitted by the red chips finally appear white after light conversion of the top layer 120. The corresponding glue layer of the third row of LED chips 111", i.e., the top layer 120 (or the light conversion layer 110), is added with corresponding green fluorescent powder to make the light emitted by the green chips finally appear white after light conversion of the top layer 120. Finally, the overall light emitted by the LED filament is white.

In one embodiment of the disclosure, the LED filament can present white light in a lit status and present different colors in an unlit status by way of multi-light-color LED chips 111 (at least two kinds of LED chips 111) in association with different fluorescent powder (at least two kinds of fluorescent powders).

In one embodiment of the disclosure, the overall emitted light of the filament can be white by way of one-light-color LED chips 111 in association with at least one kind of fluorescent powder. For example, blue LED chips are used to associate with different fluorescent powder to make the light of the LED filament be white in a lit status. For example, three rows of blue LED chips separately correspondingly use red fluorescent powder, green fluorescent and yellow fluorescent powder to make the mixed light of the filament be white in a lit status.

In another embodiment of the disclosure, the overall emitted light of the filament can be white by way of one-light-color LED chips 111 in association with at least one kind of fluorescent powder. For example, blue LED chips are used to associate with different fluorescent powder to make the light of the LED filament be white in a lit status. For example, three rows of blue LED chips separately correspondingly use red fluorescent powder, green fluorescent and yellow fluorescent powder to make the light of the filament be blue, red, green, blue and red, blue and green, red and green, three-color light of blue, green and red or white in a lit status.

Figure 32J:
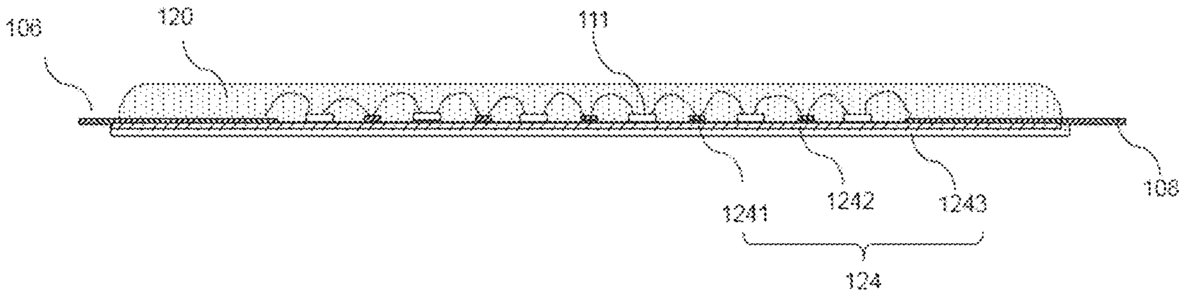
FIG. 32J is a schematic cross-sectional view of the LED filament along the length direction according to some embodiments of the disclosure.
Figure 32K:
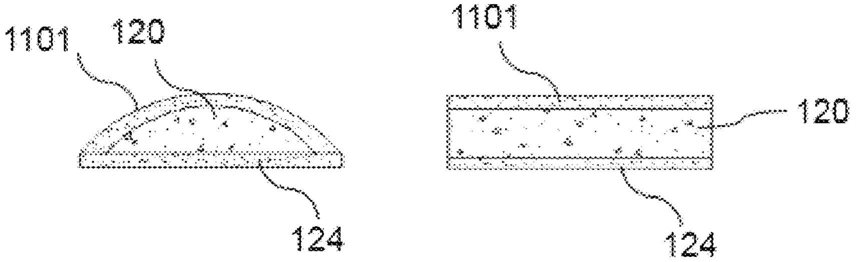
FIG. 32K is a schematic cross-sectional view of the LED filament along the radial direction according to some embodiments of the disclosure.

Please refer to FIG. 32J. In an embodiment of the disclosure, the base layer 124 includes a BT substrate 1242 as a base material, a copper foil circuit 1241 disposed on a surface of a side of the BT substrate 1242, which faces the LED chip, and a bottom layer 1243 located on a side of the BT substrate 1242, which is opposite to the LED chip. The copper foil circuit 1241 is formed with electrodes 106, 108 at two ends of the LED filament. The LED chip 111 is disposed on the copper foil circuit 1241. The LED chip 111 is connected to the copper foil circuit 1241 by metal wires first, and then the copper foil circuit 1241 is connected to a next LED chip 111 by metal wires. That is, the LED chips 111 are electrically connected by both metal wires and the copper foil circuit 1241. A transfer through the copper foil circuit 1241 can improve stability to prevent the performance influence due to excessively long wires. The LED chip 111 and the electrodes 106, 108 are connected also by metal wires.

Figure 32L:
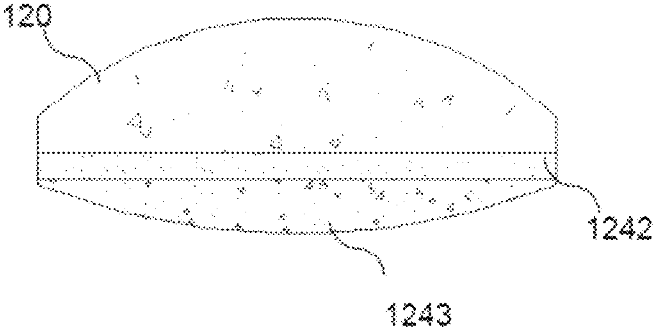
FIG. 32L is a schematic cross-sectional view of the LED filament along the radial direction according to some embodiments of the disclosure.

Please refer FIG. 32L, which is a schematic cross-sectional view of the LED filament along the radial direction according to some embodiments of the disclosure. The embodiment includes a top layer 120 and a bottom layer 1243, both of which are arcuate glue layers extending radially outward with tapered thickness.

In some embodiments of the disclosure, a BT substrate is used to serve as a base material to form the base layer 124. The BT substrate may be a white substrate with high thermal conduction, whose thermal conductivity is greater than or equal to 0.8 W/(m·K) of a filament and whose thickness is less than or equal to 0.12 mm. And a range of wavelength of the light emitted by the LED filament formed is between 360 mm and 830 mm.

Figure 32M:
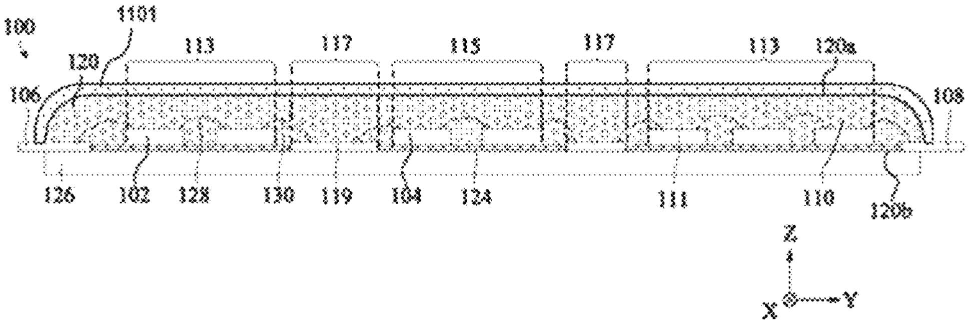
FIG. 32M is a schematic cross-sectional view of the LED filament along the axial direction according to some embodiments of the disclosure.

Please refer to FIG. 32M, which is a schematic cross-sectional view of the LED filament along the axial direction in an embodiments of the disclosure, showing the relationship between the layer body 1101 and other structures of the filament. A basic structure of the LED filament is the same to the above description of the structure of the LED filament. As shown in FIG. 32M, the layer body 1101 may be directly covered on an upper surface of the top layer 120 or on an upper surface of the top layer 120 or a relative upper surface 120*a* of the top layer 120, which completely covers the relative upper surface of the top layer 120 and the conductor section 117.

Figure 32N:
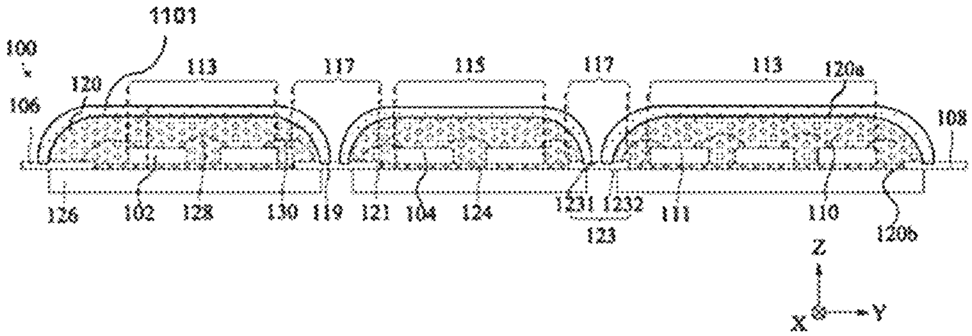
FIG. 32N is a schematic cross-sectional view of the LED filament along the axial direction according to some embodiments of the disclosure.
Figure 32O:
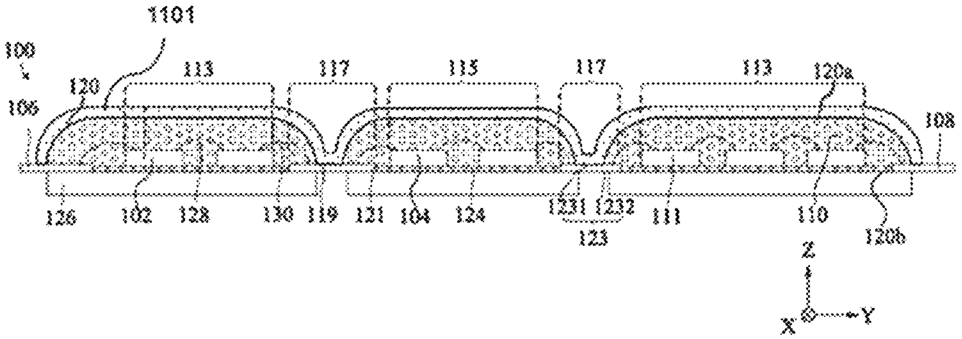
FIG. 32O is a schematic cross-sectional view of the LED filament along the axial direction according to some embodiments of the disclosure.

Please further refer to FIGS. 32N and 32O. In some embodiments, which are schematic cross-sectional views of the LED filament along the axial direction in an embodiments of the disclosure. The structure of the LED filament is basically similar to the above description, so it will not be repeated. As shown in FIG. 32N, the top layer 120 at least covers part of the conductor 119. The conductor section 117 is not completely covered by the top layer 120. At least part of the conductor 119 is exposed from the top layer 120 or the light conversion layer 110. The top layer 120 is divided into multiple sections. The layer body 1101 independently covers each section of top layer 120 and at least covers part of the exposed portion 123 of part of the conductor 119, and at least covers parts of the electrodes 106, 108.

Please refer to FIG. 32O. The top layer 120 includes multiple sections at intervals. The layer body 1101 completely covers the top layer 120 and completely covers a side of the exposed portion 123 of the conductor 119, which faces the top layer 120, but the layer body 1101 does not completely fill the gaps between the discrete sections of the top layer 120. The LED filament has recesses along the top layer 120 outward, i.e., on the outermost surface along the top layer 120 outward. The recesses correspond to the conductors 119.

Figure 32P:
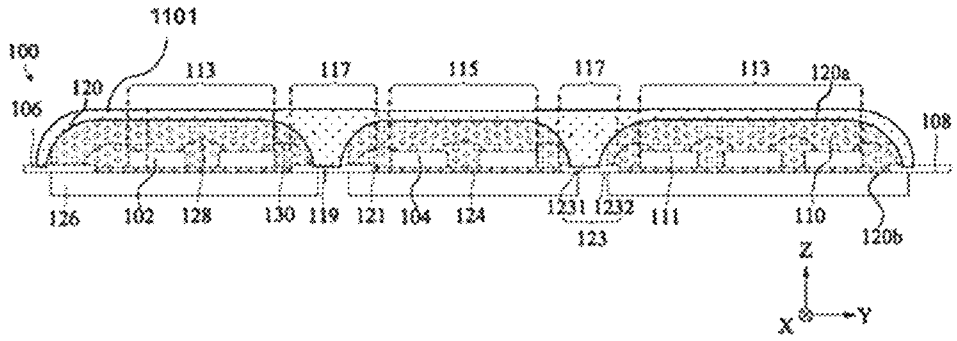
FIG. 32P is a schematic cross-sectional view of the LED filament along the axial direction according to some embodiments of the disclosure.

Please refer to FIG. 32P. The layer body 1101 may also completely fill the gaps between the sections of the top layer 120. The layer body 1101 completely fills the gaps between the sections of the top layer 120. The LED filament has a flat or relatively flat surface along the top layer 120 outward, i.e., on the outermost surface along the top layer 120 outward.

In the embodiments shown in FIGS. 32N, 32O and 32P, each of the top layer 120 and the transparent layer 126 has multiple sections at intervals.

Figure 32Q:
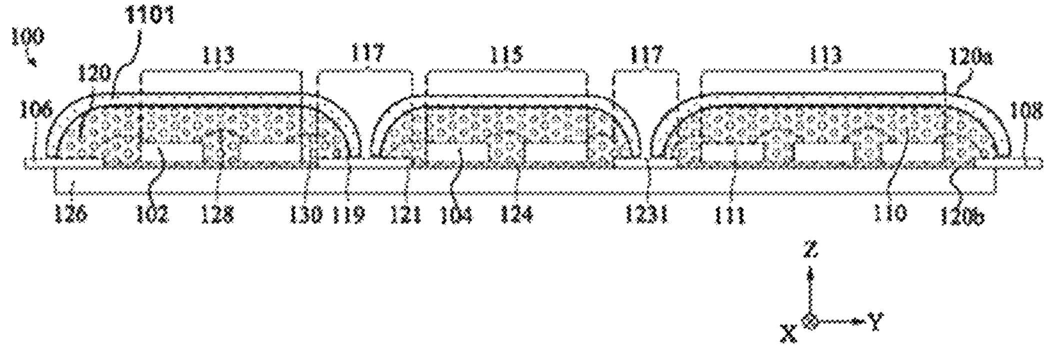
FIG. 32Q is a schematic cross-sectional view of the LED filament along the axial direction according to some embodiments of the disclosure.
Figure 32R:
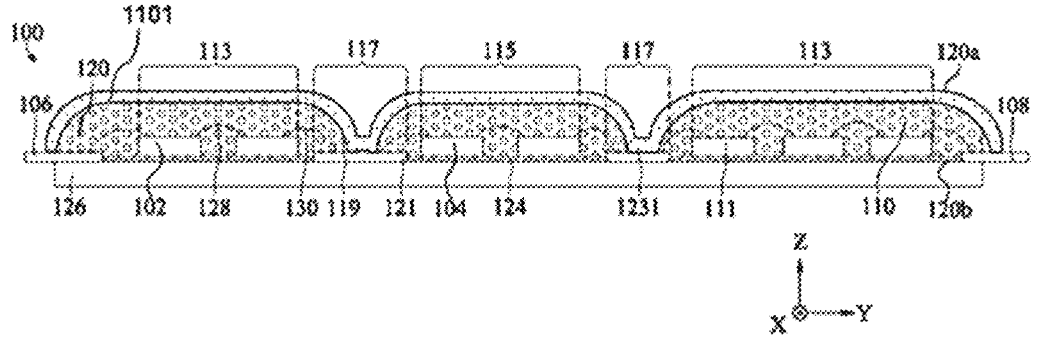
FIG. 32R is a schematic cross-sectional view of the LED filament along the axial direction according to some embodiments of the disclosure.
Figure 32S:
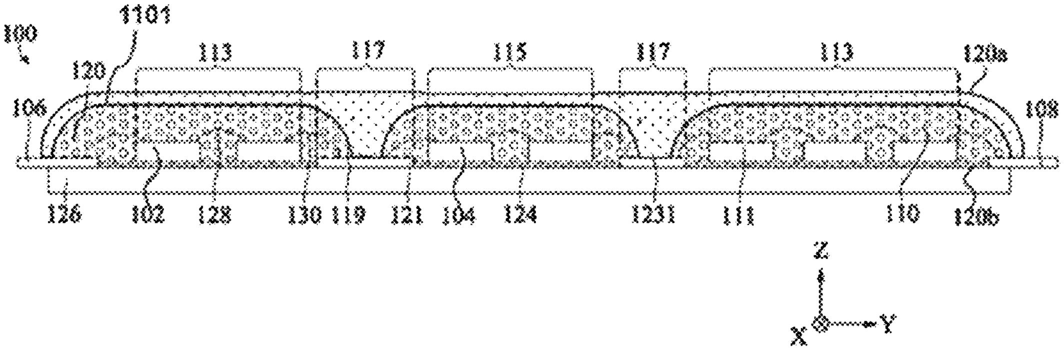
FIG. 32S is a schematic cross-sectional view of the LED filament along the axial direction according to some embodiments of the disclosure.

Please refer to FIGS. 32Q, 32R and 32S, which are schematic cross-sectional views of the LED filament along the axial direction according to some embodiments of the disclosure. In comparison with FIGS. 32N, 32O and 32P, the differences are the top layer 120 in 32Q, 32R and 32S including multiple sections at intervals but the transparent layer 126 being one piece. The layer body 1101 is implemented as FIGS. 32N, 32O and 32P. That is, the description of FIGS. 32N, 32O and 32P can be used with distinguishing the transparent layer 126.

Figure 32T:
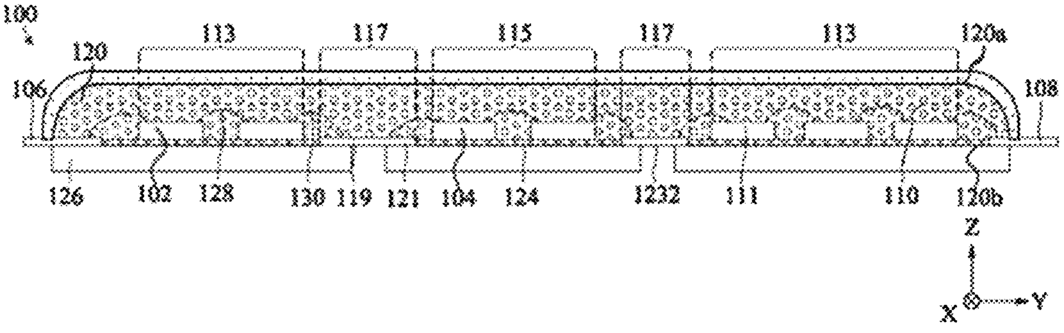
FIG. 32T is a schematic cross-sectional view of the LED filament along the axial direction according to some embodiments of the disclosure.

Please refer to FIG. 32T, which is a schematic cross-sectional view of the LED filament along the axial direction according to some embodiments of the disclosure. In comparison with the embodiment of FIG. 32M, the structure is basically the same, the difference is the transparent layer 126 in FIG. 32T including multiple sections at intervals, while the transparent layer 126 in FIG. 32M being one piece.

In some embodiments, please refer to FIG. 33, which is a schematic cross-sectional structural view of the LED filament according to some embodiments of the disclosure. As shown in FIG. 33, when having the base layer 124, the base layer 124 is formed by coating, scraping, spraying, self-leveling, etc. first, then chip bonding is performed on a surface of the base layer 124 to fix the LED chip 111, the top layer 120 with an arcuate surface is formed by spraying, gluing or other ways after the LED chips 111 are wired and connected, and the top layer 120 completely covers the chips 111 and their wiring. Next, the layer body 1101 is disposed on a surface of the top layer 120 along its arcuate shape with touching the base layer 124. After solidification, it is cut to form a single strip of filament. As shown in FIG. 33, which is a schematic cross-sectional structural view of the operation, the figure is a schematic cross-sectional structural view of full-plate production, wherein the arc is a protrudent structure.

Figure 34:
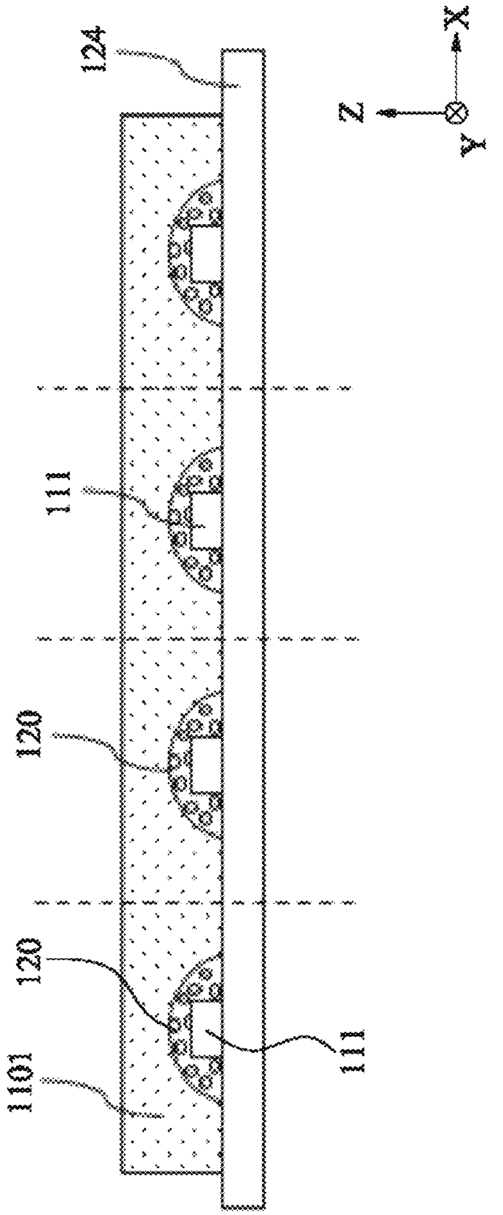
FIG. 34 is a schematic cross-sectional structural view (2) of the LED filament according to some embodiments of the disclosure.

In one embodiment, please refer to FIG. 34, which is a schematic cross-sectional structural view of the LED filament according to some embodiments of the disclosure. As shown in FIG. 34, a cross-section of the top layer 120 may be of an arcuate shape, and a cross-section of the layer body 1101 is rectangular.

In one embodiment, a cross-section of the top layer 120 may be of a rectangular shape, and a cross-section of the layer body 1101 is arcuate.

In one embodiment, a cross-section of the top layer 120 may be of a rectangular shape, and a cross-section of the layer body 1101 is rectangular.

Preferably, an arcuate top layer 120 and an arcuate layer body 1101 which is closely attached thereon is adopted as shown in FIG. 33. In this way, the least amount of raw materials is used, and the surface has no edges and corners, which avoids stress concentration and reduces costs. On the other hand, the arcuate shapes of the top layer 120 and the layer body 1101 preferably fit to the arcuate shape of the beam angle of the LED chip 111, so that the light emitted from the LED chip 111 reaches the top layer 120 and the layer body 1101, the paths the light that finally emits passes through (the paths the light travels in the top layer 120 and the layer body 1101) are roughly the same, and the light conversion effect and light loss are also basically the same. The light emission at each position can be basically equal, ensuring the uniformity of the light emission. On the other hand, an arcuate surface, especially a convex surface, has a light diffusion effect. The light beam is diffused rather than concentrated, making the light emission range wider, and the optical diffusion without concentration makes the light emission softer.

Please refer to FIGS. 35*a*, 35*b*, 35*c* and 35*d*, which are schematic cross-sectional structural views of the LED filaments according to some embodiments of the disclosure.

Figure 35A:
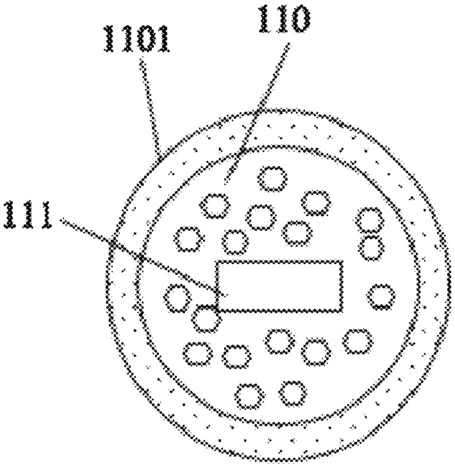
FIGS. 35A to 35D are schematic cross-sectional structural views (3-6) of the LED filaments according to some embodiments of the disclosure.
Figure 35B:
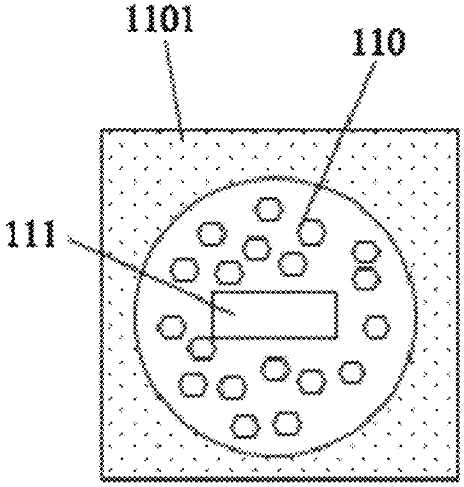
Figure 35C:
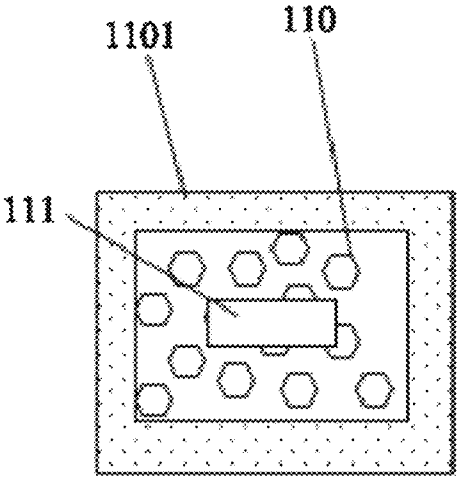
Figure 35D:
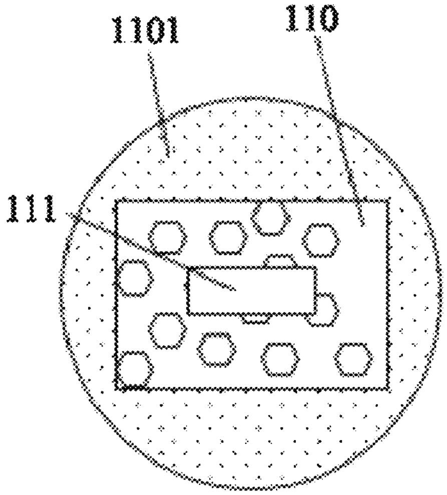

In some embodiments, the light conversion layer 110 has no distinction between the top layer 120 and the base layer 124. The LED chip 111 is completely covered in the light conversion layer 110 and formed by molding or injection molding. As shown in FIG. 35*a*, a cross-section of the light conversion layer 110 is circular or almost circular, and a cross-section of the layer body 1101 is annular (almost annular) sheathing the light conversion layer 110. As shown in FIG. 35*b*, a cross-section of the light conversion layer 110 is circular or almost circular, and a cross-section of the layer body 1101 is rectangular (annular) or almost rectangular (annular) sheathing the light conversion layer 110. As shown in FIG. 35*c*, a cross-section of the light conversion layer 110 is a rectangular (annular) or almost rectangular (annular), and a cross-section of the layer body 1101 is rectangular (annular) or almost rectangular (annular) sheathing the light conversion layer 110. As shown in FIG. 35*d*, a cross-section of the light conversion layer 110 is rectangular (annular) or almost rectangular (annular), and a cross-section of the layer body 1101 is circular or almost circular sheathing the light conversion layer 110. Of course, the light conversion layer 110 and the layer body 1101 may also be of other shapes. When a cross-section of the light conversion layer 110 is circular or almost circular, it is preferable that a cross-section of the layer body 1101 is annular (almost annular), so that the light emitted can have effects of diffusion and softening, and materials and cost can be saved. Also, the thickness of the layer body 1101 is uniform in the radial direction, the length of the light path or the particles encountered (probability or number) are roughly the same, the light processing, light loss, and light divergence effects are basically the same, so that the light emission is uniform and soft. In a rectangular structure, the light effect at a certain angle (for example, at a right angle of a cross-section) may be significantly different from that at other positions.

In some embodiments, the light conversion layer 110 and the layer body 1101 may be combined to be one piece. That is, the light conversion layer 110 may be added with, but not limited to, one of aluminum oxide, silicon dioxide, magnesium oxide, titanium dioxide, graphene, phosphor, sulfate, silicate, nitride, nitrogen oxide, oxysulfate and garnet or a combination thereof.

Figure 5:
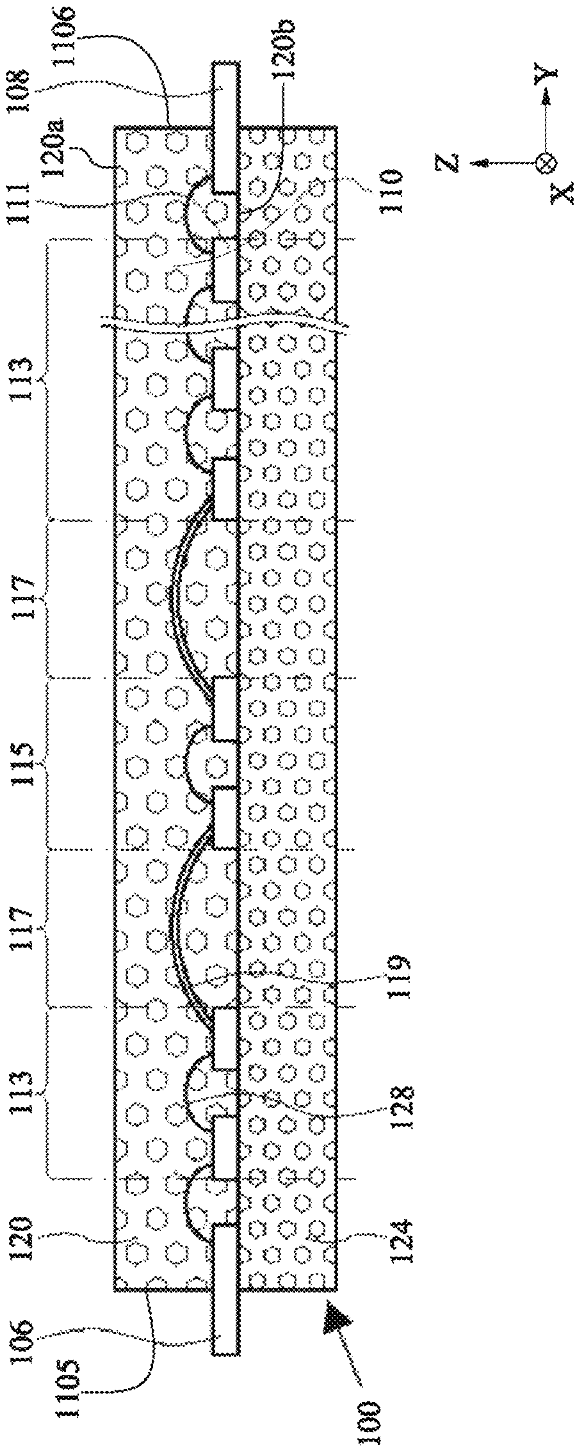
FIG. 5 is a structural schematic view (3) of the LED filament according to some embodiments of the disclosure.

In some embodiments, please refer to FIG. 5, which is a structural schematic view of the LED filament according to some embodiments of the disclosure. When there is only one row of LED chips 111 in the width direction of the LED filament 100 (as shown in FIG. 5, the LED chips 111 are arranged in the same direction), there are bendable sections 117 and unbendable sections 115 in the length direction of the LED filament 100. The total length of the bendable sections is less than the total length of the unbendable sections, so that the entire LED filament has better support ability.

In some embodiments, in the length direction of the LED filament 100, the total length of the bendable sections at least accounts for more than 30% of the total length of the LED filament 100, so as to ensure the bendability of the LED filament 100.

In some embodiments, in the length direction of the LED filament 100, the total length of the bendable sections at least accounts for more than 30% and no more than 50% of the total length of the LED filament 100, so as to ensure the bendability and support ability of the LED filament 100.

Please refer to FIG. 15, which is a top view of the LED filament without the top layer in an unbent state according to some embodiments of the disclosure. When there are two rows of LED chips 111 in the width direction of the LED filament 100 and the two rows of LED chips 111 are connected in parallel (as shown in FIG. 15), there are also bendable sections and unbendable sections in the length direction of the LED filament 100 (as shown in the Y-axis direction in FIG. 15), and the total length of the bendable sections is less than the total length of the unbendable sections, so that the entire LED filament 100 has better support ability and bendability.

In some embodiments, the total length of the bendable sections at least accounts for more than 0.001% and no more than 20% of the total length of the LED filament 100. In some embodiments, the part of the LED filament 100 where the LED chips 111 are disposed in the length direction (that is, in FIG. 1L, the region between the leftmost LED chip 111 and the rightmost LED chip 111) may unnecessarily have bendable sections. Since the adjacent LED chips 111 are arranged alternately, it can still have certain bendability.

Please refer to FIG. 16, which is a top view of the LED filament without the top layer in an unbent state according to some embodiments of the disclosure. As shown in FIG. 16, when there are two rows of LED chips 111 in the width direction of the LED filament 100 and the two columns of LED chips 111 are connected in series (as shown in FIG. 16), there are bendable sections and unbendable sections in the length direction of the LED filament 100, and the total length of the bendable sections is less than the total length of the unbendable sections, so that the entire LED filament 100 has better support ability. In some embodiments, in the length direction of the LED filament 100, the total length of the bendable sections at least accounts for more than 0.001% and no more than 30% of the total length of the LED filament 100, so as to ensure the bendability and support ability of the LED filament 100.

In the embodiment shown in FIGS. 5, 15 and 16, the unbendable sections are the total length of the LED chips 111 and the electrodes 106, 108 in the length direction of the LED filament 100, and the bendable sections only include the light conversion layer 110 and/or wires (the wires herein indicate wires connecting adjacent LED chips 111 or wires connecting the LED chip 111 and the electrode 106, 108). That is, the parts in the length direction of the LED filament 100, which are not disposed with the LED chip 111 or the electrodes 106, 108, constitute the bendable sections. However, FIGS. 5, 15, and 16 are not limitations.

In some embodiments, no matter how many rows of LED chips 111 are arranged on the LED filament 100, more than 0.5 LED chip 111 are arranged per unit length (per millimeter of length), so that a proper spacing can be set between the LED chips 111 to meet the requirements of the uniformity of light emission and to prevent serious thermal influence between the LED chips 111.

In some embodiments, as shown in FIG. 4, the LED filament 100 includes a light conversion layer 110, multiple LED sections 113, 115 and two electrodes 106, 108. The LED section 113, 115 has at least one LED chip 111. Two adjacent LED chips 111 and two electrodes 106, 108 in the LED filament 100 are electrically connected to each other. For example, the electrical connection may be achieved by using a circuit film or a first conductive wire 128 shown in FIG. 5 described below. The light conversion layer 110 includes a top layer 120 and a loading layer 122. The loading layer 122 includes a base layer 124 and a transparent layer 126. The base layer 124 is located between the top layer 120 and the transparent layer 126 (at least located on a certain cross-section of the LED filament 100). Part of the lower surface 124*b* of the base layer 124 is in contact with the transparent layer 126, and the transparent layer 126 supports part of the base layer 124, thereby enhancing the strength of the base layer 124 and facilitating die bonding. The part of the base layer 124, which at is not covered by the transparent layer 126 can make heat generated by part of the LED chips 111 directly dissipated through the base layer 124. In some embodiments, the transparent layer 126 includes a first transparent layer 1261 and a second transparent layer 1262. Both the first transparent layer 1261 and the second transparent layer 1262*h* extend in the length direction of the LED filament 100. In some embodiments, the light conversion layer 110 has a first end 1105 and a second end 1106 opposite to the first end 1105. In some embodiments, the LED chips 111 are located between the first end 1105 and the second end 1106. If the LED chip 111 closest to the first end 1105 is denoted as LED chip n1, then LED chips 111 from the first end 1105 to the second end 1106 are sequentially LED chip n2, LED chip n3, . . . , and LED chip nm, where m is an integer and m≤800.

In some embodiments, as shown in FIG. 5, the LED filament 100 includes a light conversion layer 110, at least two LED sections 113, 115, electrodes 106, 108, and conductor sections 117 for electrically connecting adjacent two of the LED sections 113, 115. Each LED section 113, 115 includes at least two LED chips 111, and two adjacent LED chips 111 are electrically connected to each other by a first conductive wire 128. In this embodiment, the conductor section 117 includes a conductor 119 connecting the LED sections 113, 115. The shortest distance between two LED chips 111 separately located in two adjacent LED sections 113, 115 is greater than the distance between two adjacent LED chips 111 in a single LED section 113, 115, and the length of the first conductive wire 128 is less than a length of the conductor 119. Therefore, it is ensured that, when bending occurs between the two LED sections 113, 115, the conductor section 117 cannot be easily broken by the stress generated.

In some embodiments, the light conversion layer 110 is coated on at least two sides of the LED chips 111 or the electrodes 106, 108.

In some embodiments, parts of the electrodes 106, 108 are exposed from the light conversion layer 110.

Figure 6:
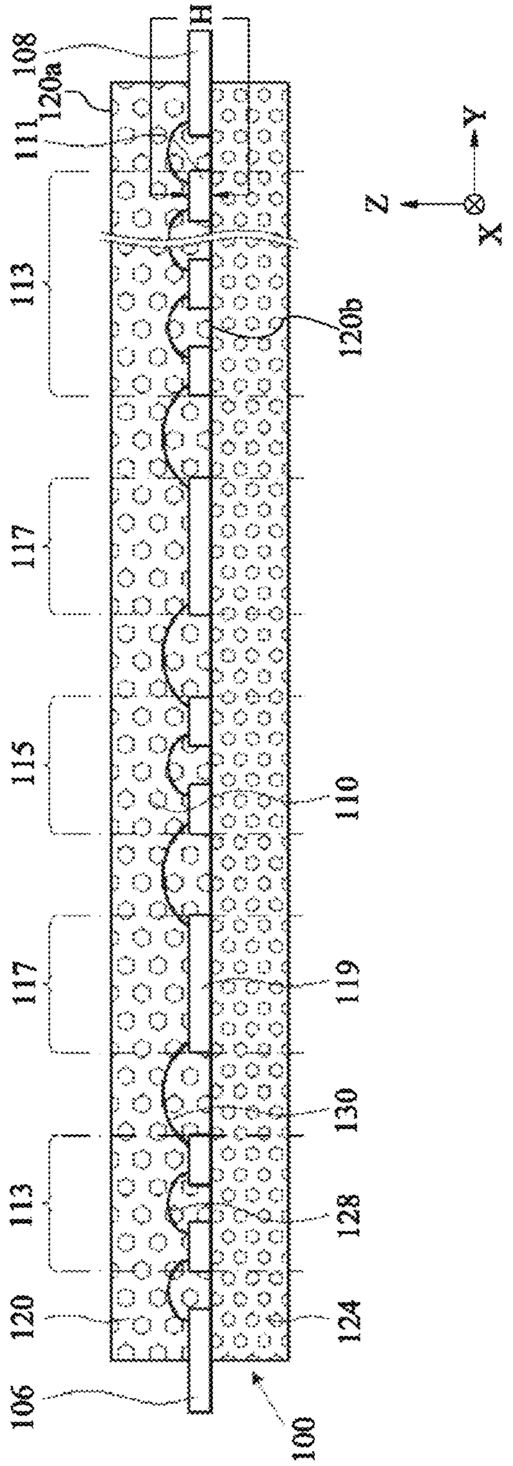
FIG. 6 is a structural schematic view (4) of the LED filament according to some embodiments of the disclosure.

Please refer to FIG. 6, which is a structural schematic view of the LED filament according to some embodiments of the disclosure. As shown in FIG. 6, in some embodiments, the conductor section 117 is also located between the two adjacent LED sections 113, 115, and a plurality of LED chips 111 in the LED sections 113, 115 are electrically connected to each other by the first conductive wires 128. However, the conductor 119 in the conductor section 117 in FIG. 6 is not of a form of a conductive wire but of a form a sheet or film. In some embodiments, the conductor 119 may be copper foil, gold foil or other conductive materials. In this embodiment, the conductor 119 is attached on a surface of the base layer 124 and is adjacent to the top layer 120, that is, located between the base layer 124 and the top layer 120. Moreover, the conductor section 117 and the LED sections 113, 115 are electrically connected by second conductive wires 130, that is, two LED chips 111 separately located in two adjacent LED sections 113, 115 and having the shortest distance from the conductor section 117 are electrically connected to the conductor 119 in the conductor section 117 by second conductive wires 130. The length of the conductor section 117 is greater than a distance between two adjacent LED chips 111 in a single LED section 113, 115, and the length of the first conductive wire 128 is less than the length of the conductor 119. This design ensures that the conductor section 117 has good bendability because the conductor section 117 has a relatively long length. Assuming that a maximum thickness of the LED chip 111 in the radial direction of the filament 100 (as shown in the Z-axis direction in FIG. 6) is H, the thickness of the electrodes 106, 108 and the conductor 119 in the radial direction of the LED filament is 0.5H-1.4H, preferably, 0.5H-0.7H. Due to the height difference between the LED chip 111 and both the electrodes 106, 108 and the conductor 119, it can ensure the wire bonding process can be carried out while ensures the quality of the wire bonding process (that is, having good strength), thereby improving the stability of products.

Figure 7:
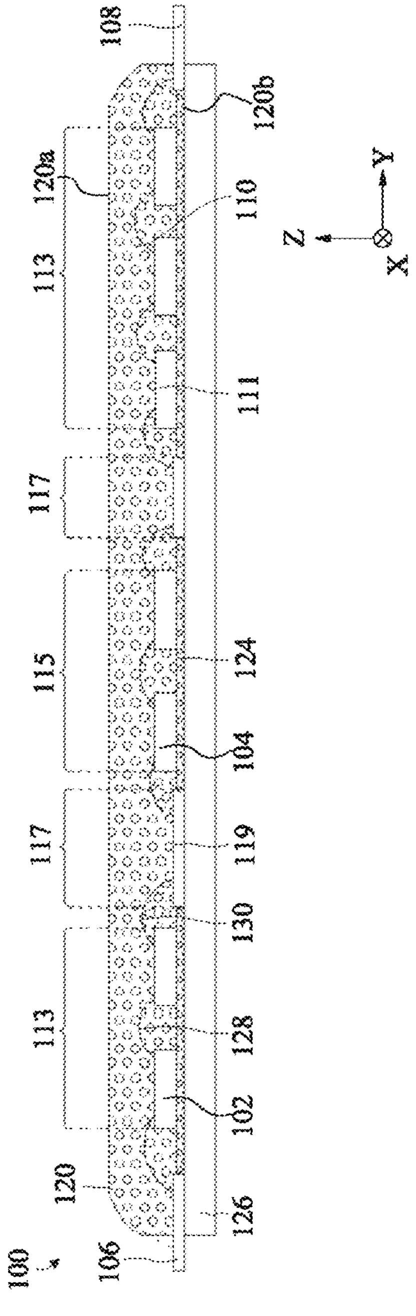
FIG. 7 is a structural schematic view (5) of the LED filament according to some embodiments of the disclosure.

Please refer to FIG. 7, which is a structural schematic view of the LED filament according to some embodiments of the disclosure. As shown in FIG. 7, the LED filament 100 includes a light conversion layer 110, LED sections 113, 115, electrodes 106, 108, and conductor sections 117 for electrically connecting two adjacent LED sections 113, 115. Each LED section 113, 115 includes LED chips 111. The conductor sections 117 and the LED sections 113, 115 are electrically connected by second conductive wires 130, that is, two LED chips 111 separately located in two adjacent LED sections 113, 115 and having the shortest distance from the conductor section 117 are electrically connected to the conductor 119 in the conductor section 117 by the second conductive wires 130. The LED chips 111 are electrically connected to each other by the first conductive wire 128. The conductor section 117 includes the conductor 119 connecting the LED sections 113, 115. For example, the conductor 119 is a conductive metal sheet or metal strip, such as a copper sheet or an iron sheet. The shortest distance between two LED chips 111 separately located in two adjacent LED sections 113, 115 is greater than the distance between two adjacent LED chips 111 in a single LED section 113, 115. The length of the first conductive wire 128 is less than the length of the conductor 119. Therefore, it is ensured that, when bending occurs between two LED sections 113, 115, the conductor section 117 cannot be easily broken by the stress generated because the conductor section 117 has a large forced area, and. The light conversion layer 110 covers at least two sides of the LED chips 111 or the electrodes 106, 108. Parts of the electrodes 106, 108 are exposed from the light conversion layer 110. The light conversion layer 100 includes a top layer 120 and a loading layer 122, the loading layer 122 includes a base layer 124 and a transparent layer 126. The base layer 124 is located between the top layer 120 and the transparent layer 126. The base layer 124 and the top layer 120 cover at least two sides of the LED chips 111. The thermal conductivity of the transparent layer 126 is greater than the thermal conductivity of the base layer 124. In some embodiments, the base layer 124 is at least in contact with one side of each LED chip 111 and one side of the conductor section 117. In this embodiment, the LED chips 111 and the conductor 119 are located on different sides of the base layer 124.

Figure 8:
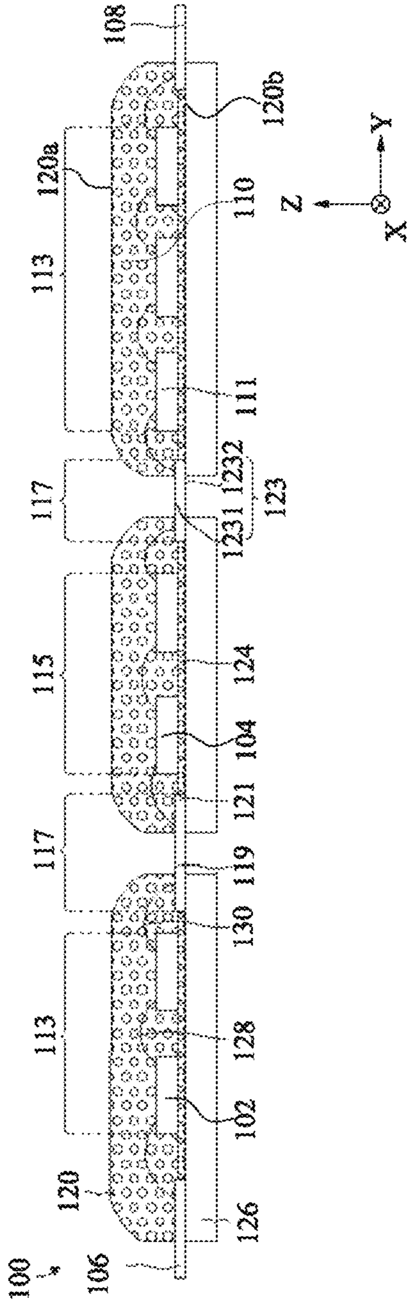
FIG. 8 is a structural schematic view (6) of the LED filament according to some embodiments of the disclosure.
Figure 9:
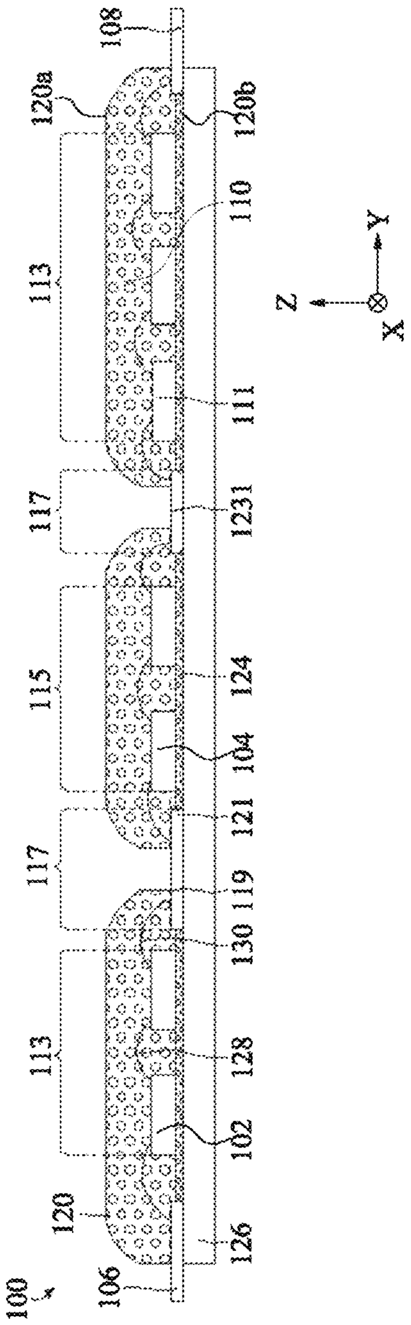
FIG. 9 is a structural schematic view (7) of the LED filament according to some embodiments of the disclosure.
Figure 10:
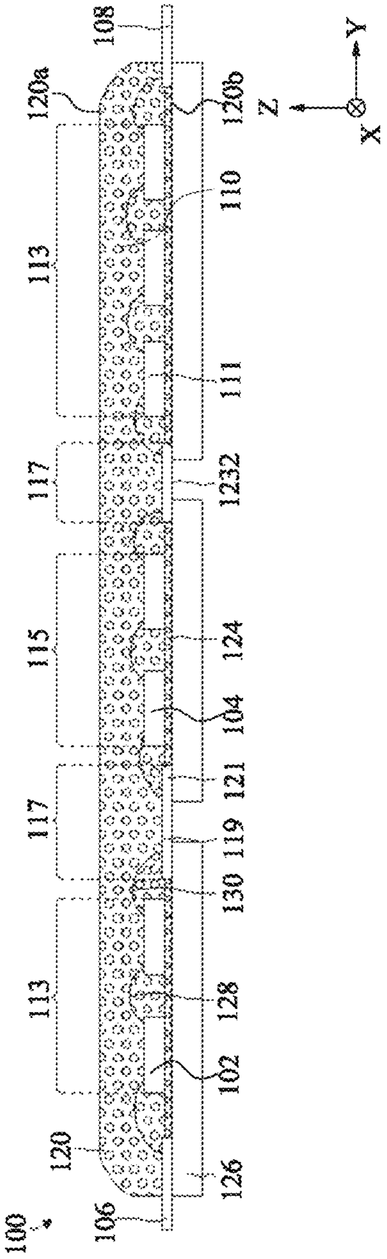
FIG. 10 is a structural schematic view (8) of the LED filament according to some embodiments of the disclosure.
Figure 11:
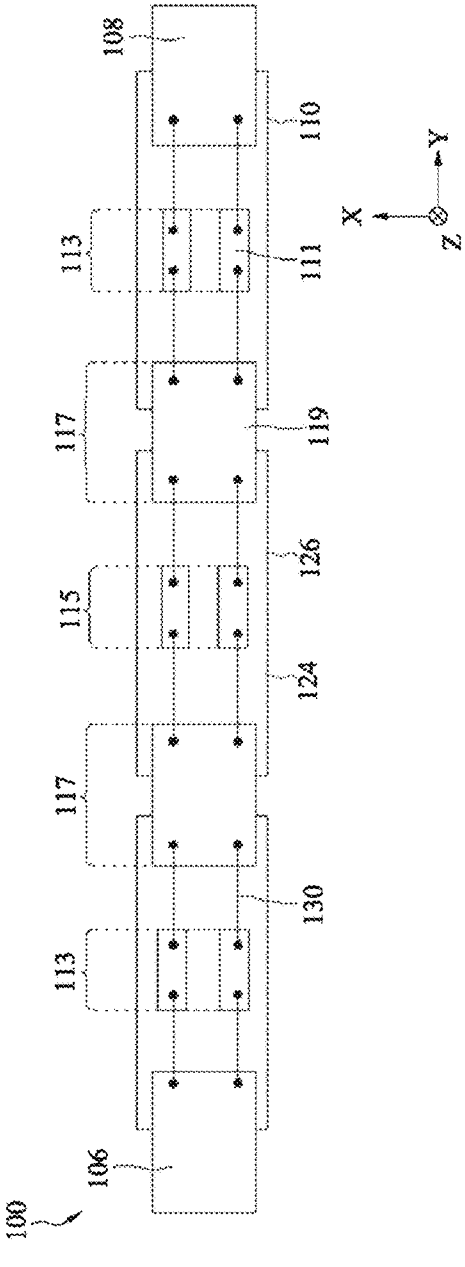
FIG. 11 is a top view of an embodiment of the LED filament without the top layer according to some embodiments of the disclosure.

Please refer to FIGS. 8-10, which are structural schematic views of the LED filament according to some embodiments of the disclosure. As shown in FIGS. 8 to 10, in some embodiments, the conductor 119 includes a covering portion 121 and an exposed portion 123. The exposed portion 123 includes a first exposed portion 1231 and a second exposed portion 1232. A portion of the top layer 120 from which the conductor 119 is exposed is the first exposed portion 1231, and a portion of the transparent layer 126 from which the conductor 119 is exposed is the second exposed portion 1232. In some embodiments, as shown in FIG. 9, the exposed portion 123 includes the first exposed portion 1231 only. In some embodiments, as shown in FIG. 10, the exposed portion 123 includes the second exposed portion 1232 only. This can relieve stress concentration of the conductor 119.

Please refer to FIG. 11, which is a top view of the LED filament without the top layer according to some embodiments of the disclosure. In some embodiments, the LED filament 100 has a light conversion layer 110, LED sections 113, 115, electrodes 106, 108, and conductor sections 117 for electrically connecting two adjacent LED sections 113, 115. Each LED section 113, 115 includes at least one LED chip 111. The conductor section 117 and the LED section 113, 115 are electrically connected by a second conductive wire 130, that is, two LED chips 111 separately located in two adjacent LED sections 113, 115 and having the shortest distance from the conductor section 117 are electrically connected to the conductor 119 in the conductor section 117 by the second conductive wires 130. The conductor section 117 includes the conductor 119 connecting the LED sections 113, 115. For example, the conductor 119 is a conductive metal sheet or metal strip, such as a copper sheet or an iron sheet. The shortest distance between two LED chips 111 separately located in two adjacent LED sections 113, 115 is greater than the distance between two adjacent LED chips 111 in a single LED section 113, 115, The LED chips 111 are electrically connected to each other by the first conductive wire 128, and the length of the first conductive wire 128 is less than the length of the conductor 119. When bending occurs between the two LED sections 113, 115, the conductor section 117 cannot be easily broken by the stress generated because the conductor section 117 has a large forced area. The light conversion layer 110 covers at least two sides of the LED chips 111 or the electrodes 106, 108. Parts of the electrodes 106, 108 are exposed from the light conversion layer 110. The light conversion layer 110 includes a top layer 120 (not shown in this figure) and a loading layer 122. The loading layer 122 includes a base layer 124 and a transparent layer 126. The LED chips 111 in the LED section 113, 115 are arranged along the radial direction of the LED filament (the X-axis direction in FIG. 11). Each LED chip 111 in the LED section 113, 115 is separately connected to the conductor 119 and/or the electrodes 106, 108.

Figure 12:
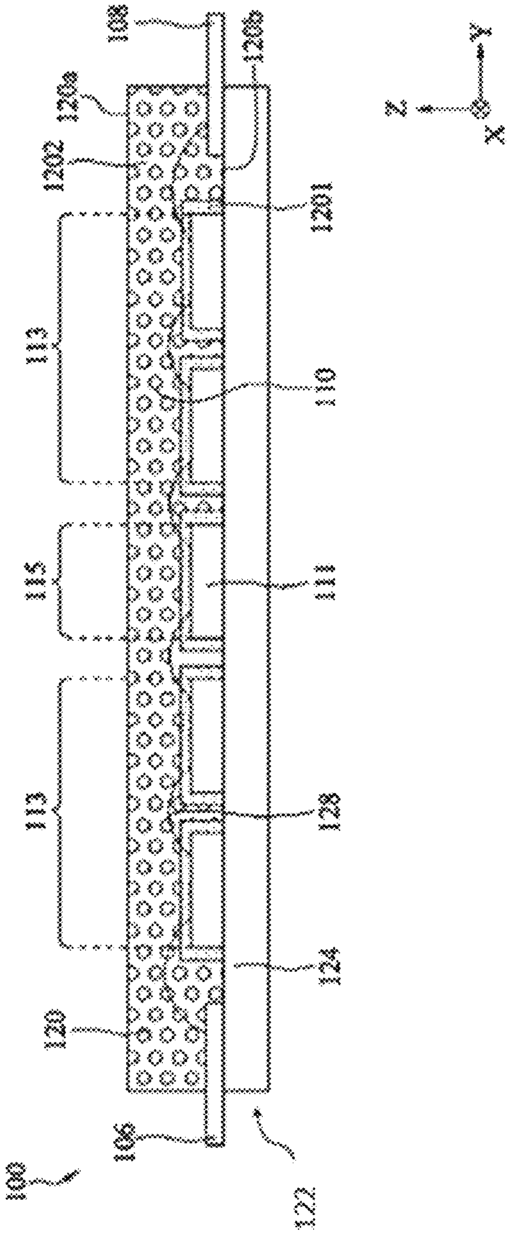
FIG. 12 is a structural schematic view (9) of the LED filament according to some embodiments of the disclosure.
Figure 13:
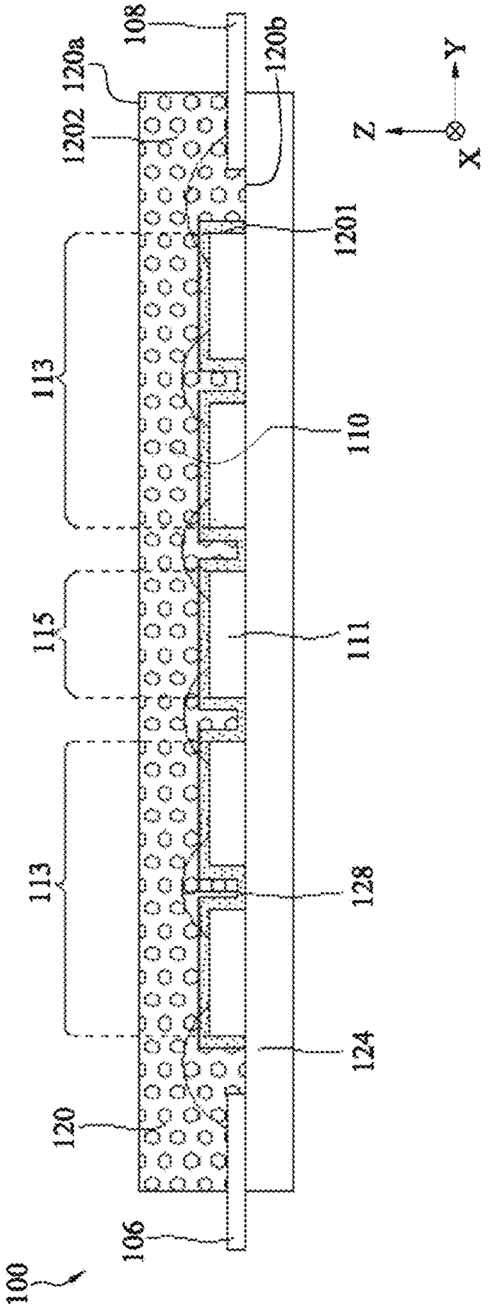
FIG. 13 is a structural schematic view (10) of the LED filament according to some embodiments of the disclosure.

Please refer to FIGS. 12 and 13, which are structural schematic view of the LED filament according to some embodiments of the disclosure. In some embodiments, the LED filament 100 has a light conversion layer 110, LED sections 113, 115, and electrodes 106, 108. Each LED section 113, 115 has at least one LED chip 111. In the LED filament 100, adjacent LED chips 111 are electrically connected to each other, and the LED chips 111 and the electrodes 106, 108 are electrically connected to each other. Adjacent LED chips 111 are connected by a first conductive wire 128. The light conversion layer 110 covers each side of the first conductive wire 128. That is, the first conductive wire 128 is located in the light conversion layer 110 so as to prevent the LED filament 100 from being broken because the exposed first conductive wire 128 is accidentally touched by an instrument or a worker when the LED filament 100 is wound. The light conversion layer 110 covers the LED sections 113, 115 and the electrodes 106, 108 with exposing at least parts of two electrodes 106, 108. The light conversion layer 110 includes a top layer 120 and a loading layer 122. The top layer 120 covers each side of the first conductive wire 128. The first conductive wire 128 has a certain distance from the loading layer 122. Each of the top layer 120 and the loading layer 122 may be a layer-like structure having at least one layer.

In some embodiments, the fluorescent powder layer 1201 covers a part of the first conductive wire 128, the fluorescent powder film 1202 covers the other part of the first conductive wire 128, and both the fluorescent powder layer 1201 and the fluorescent powder film 1202 jointly cover the first conductive wire 128.

Please refer to FIG. 14, which is a structural schematic view of the soldering wire of the LED chip according to some embodiments of the disclosure. As shown in FIG. 14, in some embodiments, the quality of the soldering wire mainly depends upon points A, B, C, D and E in FIG. 14. Point A is a junction of the chip pad 1281 and the golden ball 1282. Point B is a junction between the golden ball 1282 and the first conductive wire 128. Point C is between two sections of the first conductive wire 128. Point D is a junction of the first conductive wire 128 and the second soldering spot 1283. Point E is between the second soldering spot 1283 and a surface of the LED chip 111. Because point B is the first bending point at which the first conductive wire 128 is bent, and a diameter of the first conductive wire 128 at point D is thinner than others, the first conductive wire 128 tends to be broken at points B and D, thus, when implementing the structure shown in FIG. 14 to bend the LED filament 100, part of the first conductive wire 128, which is located under the fluorescent powder film 1202, is a primary forced portion, part of the first conductive wire 128, which is located under the fluorescent powder layer 1201, is a secondary forced portion, so that the fluorescent powder layer 1201 may be less than the fluorescent powder film 1202 in thickness. The fluorescent powder layer 1201 may cover points B and D of the first conductive wire 128 to prevent the first conductive wire 128 from fracturing at points B and D because of the material properties of the fluorescent powder layer 1201 (such as hardness, flexibility or bendability).

As shown in FIG. 12, in some embodiments, each LED chip 111 is separately covered with a fluorescent powder layer 1201, and part of the fluorescent powder film 1202 in the LED filament 100 is in direct contact with the loading layer 122. In some embodiments, this part is located between two adjacent LED chips 111, and the fluorescent powder layer 1201 only covers the LED chips 111, which can not only achieve the abovementioned light-emitting effect, but also reduce the production costs of the LED light bulb.

As shown in FIG. 13, the fluorescent powder layer 1201 extends along the length direction of the LED filament 100. The fluorescent powder layer 1201 may be coated on a single LED filament 100 or on a plurality of LED filaments 100 together. The coating process is simple and the production efficiency is high. In the LED filament 100, a local area of the fluorescent powder layer 1201 is in direct contact with the loading layer 122. In some embodiments, this area is located between two adjacent LED chips 111. Since the area of the fluorescent powder layer 1201 is increased (the cooling area is also increased) and the fluorescent powder layer 1201 is thin, the heat generated by the LED chips 111 is easily transferred from the fluorescent powder layer 1201 to the fluorescent powder film 1202.

Next, the chip bonding related to design of the LED filament is described. As shown in FIG. 15, in some embodiments, the LED filament 100 includes LED chip units 102, 104 and electrodes 106, 108. The LED chip units 102, 104 are separately electrically connected to the electrodes 106, 108. The extending direction of the LED chip unit 102 is parallel or substantially parallel to the extending direction of the LED chip unit 104 (as shown in the Y-axis direction in FIG. 15). The LED chip unit 102 and the LED chip unit 104 are connected in parallel. Each of the LED chip units 102, 104 includes a plurality of LED chips 111. The distance between two adjacent LED chips 111 in the LED chip unit 102 is equal to the distance between two adjacent LED chips 111 in the LED chip unit 104. In some embodiments, the distance between two adjacent LED chips 111 in the LED chip unit 102 may unnecessarily be equal to the distance between two adjacent LED chips 111 in the LED chip unit 104. The light conversion layer 110 has a first end 1105 and a second end 1106 opposite to the first end 1105. The LED chips 111 are located between the first end 1105 and the second end 1106. If the LED chip 111 closest to the first end 1105 in the LED chip unit 102 is denoted as LED chip a1, then LED chips 111 from the first end 1105 to the second end

1106 are sequentially LED chip a2, LED chip a3, . . . , and LED chip am, where m is an integer. If the LED chip 111 closest to the first end 1106 in the LED chip unit 104 is denoted as LED chip b1, then LED chips 111 from the first end 1105 to the second end 1106 are sequentially LED chip b2, LED chip b3, . . . , and LED chip bn, where n is an integer. In the length direction of the LED filament 100 (as shown in the Y-axis direction in FIG. 15), the LED chip bn is located between the LED chip am and the LED chip am+1 (for example, in FIG. 15, LED chip b1 is located between LED chip a1 and LED chip a2), and the projection of the LED chip am in the width direction of the LED filament and the projection of the LED chip bn in the width direction of the LED filament 100 (as shown in the Y-axis direction in FIG. 15) do not have an overlapping region (n=m). That is, the LED chips 111 of the LED chip unit 102 and the LED chips 111 of the LED chip unit 104 are arranged alternately in the length direction of the LED filament 100.

In another embodiment, the projections of the LED chips 111 in the LED chip unit 102 and the LED chips 111 in the LED chip unit 104 separately have an overlapping region in the length direction of the LED filament 100. The projections of the LED chip am and the LED chip bn have an overlapping region in the length direction of the LED filament. In the width direction of the LED filament 100, the distance between the LED chip am and the LED chip bn is reduced, so the width of the LED filament is narrowed. The LED filament 100 is close to a filament of a conventional tungsten lamp in width, so that the LED filament 100 is more beautiful when winding. Specifically, each of the LED chip am and the LED chip bn has a plurality of side surfaces. In the length direction of the LED filament, a side surface of the LED chip bn is located between the same sides of LED chip am and LED chip am+1 (for example, in FIG. 15, a side surface b11 of the LED chip b1 is located between a side surface a11 of the LED chip a1 and a side surface a21 of the LED chip a2). In some embodiments, the side surface a11 is opposite to the side surface a21. In some embodiment, in the width direction of the LED filament 100, the widths of the LED chip am and the LED chip bn are Wa and Wb, respectively, and the width W of the LED filament 100 is not less than the sum of Wa and Wb, that is, W≥Wa+Wb.

In some embodiments, as shown in FIG. 4, the LED chip 111 has a first light-emitting surface 111*c* and a second light-emitting surface 111*d*. The first light-emitting surface 111*c* and the second light-emitting surface 111*d* are opposite. The light emitted from the first light-emitting surface 111*c* (may be a face of the ELD chip 111, which faces the top layer 120) is directed to the top layer 120. The light emitted from the second light-emitting surface 111*d* (may be the other side of the LED chip 111, which faces the loading layer 122) is directed to the loading layer 122. The luminous flux of the light emitted from the first light-emitting surface 111*c* of the LED chip 111 is substantially equal to the luminous flux emitted from the second light-emitting surface 111*d* of the LED chip 111 (the absolute value of the difference of the luminous flux between the first light-emitting surface 111*c* and the second light-emitting surface 111*d* is less than or equal to 30 lm). The brightness difference between the light-emitting surface 111*c* and the second light-emitting surface 111*d* of the Led chip 111 is small. The abovementioned LED chip 111 is used in the LED filament 100. After the LED filament 100 is wound, the light is emitted uniformly in all directions, and the LED light bulb has excellent light emitting effect.

As shown in FIG. 16, the LED filament 100 includes electrodes 106, 108, LED chips 111 and a first conductive wire 128. There are a plurality of LED chips 111. The LED chips 111 are arranged on the LED filament 100 in two rows (that is, adjacent LED chips 111 are arranged alternately in the width direction (the X-axis direction in FIG. 16) of the LED filament 100), and the two rows of LED chips 111 are separately arranged along the length direction of the LED filament 100.

As shown in FIG. 16, in this embodiment, the LED chip 111 has the length dimension wc along the length direction of the filament 100, and the ratio of the sum of the lengths wc (that is, Σwc) of all the LED chips 111 to the length of the LED filament 100 is greater than 0.5, 0.6, 0.65 or 0.7, to ensure the arrangement density of the LED chips 111 in the length direction of the LED filament 100, so as to increase the total luminous flux and effectively reduce graininess of the emitted light. The ratio of the sum of the lengths of all the LED chips 111 to the length of the LED filament 100 is greater than 0.5, 0.6, 0.65 or 0.7.

Figure 17:
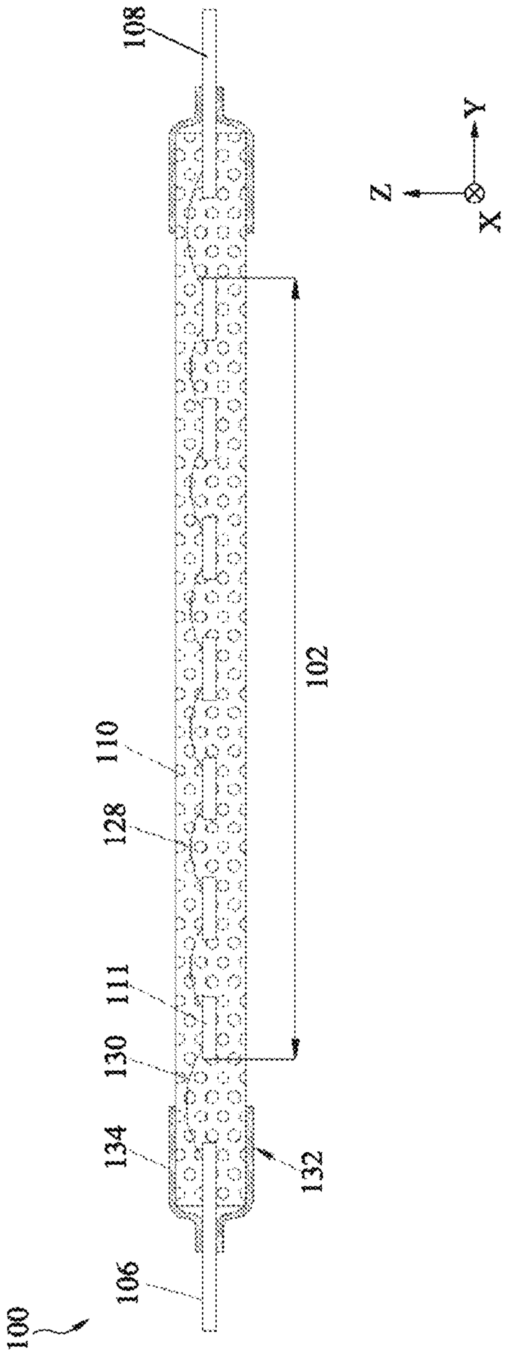
FIG. 17 is a structural schematic view (1) of the LED filament in an unbent state according to some embodiments of the disclosure.
Figure 18:
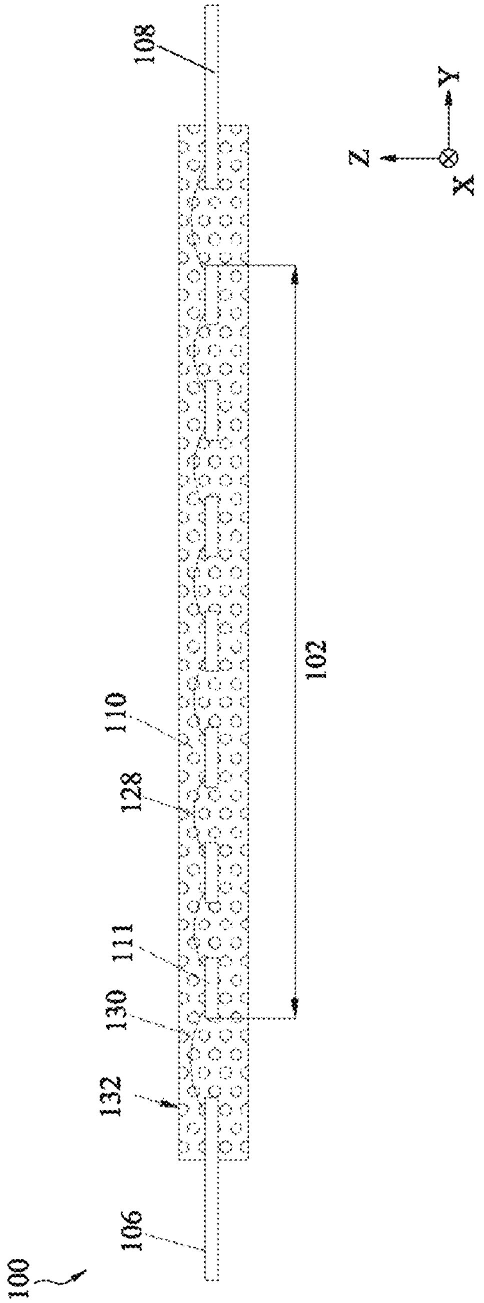
FIG. 18 is a structural schematic view (2) of the LED filament in an unbent state according to some embodiments of the disclosure.
Figure 19:
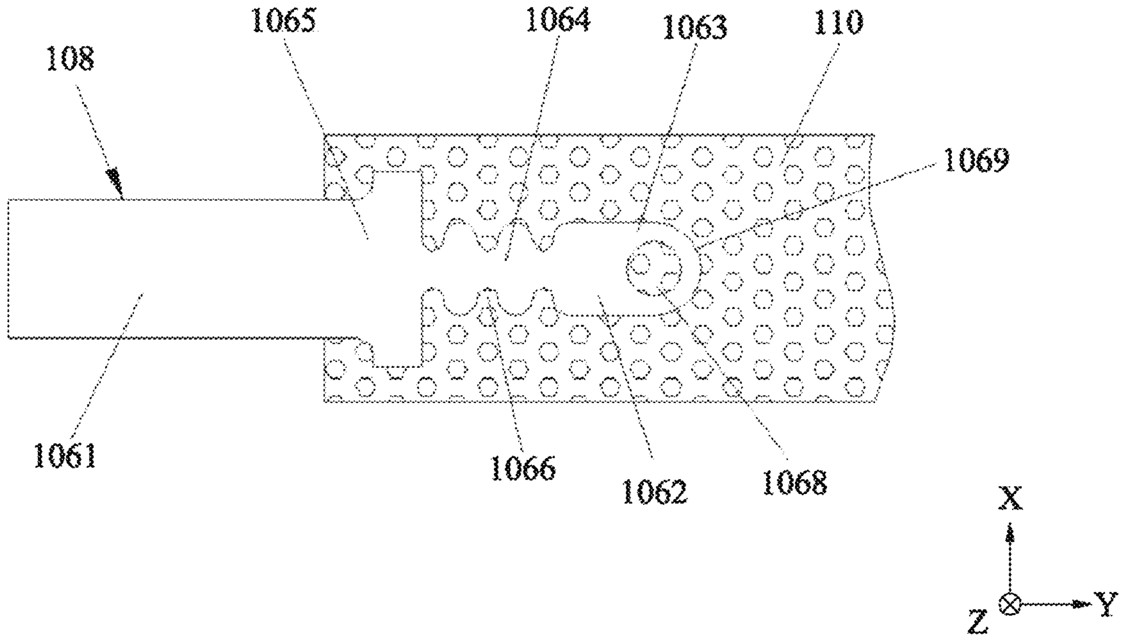
FIG. 19 is a partially structural schematic view (1) of the LED filament according to some embodiments of the disclosure.
Figure 20:
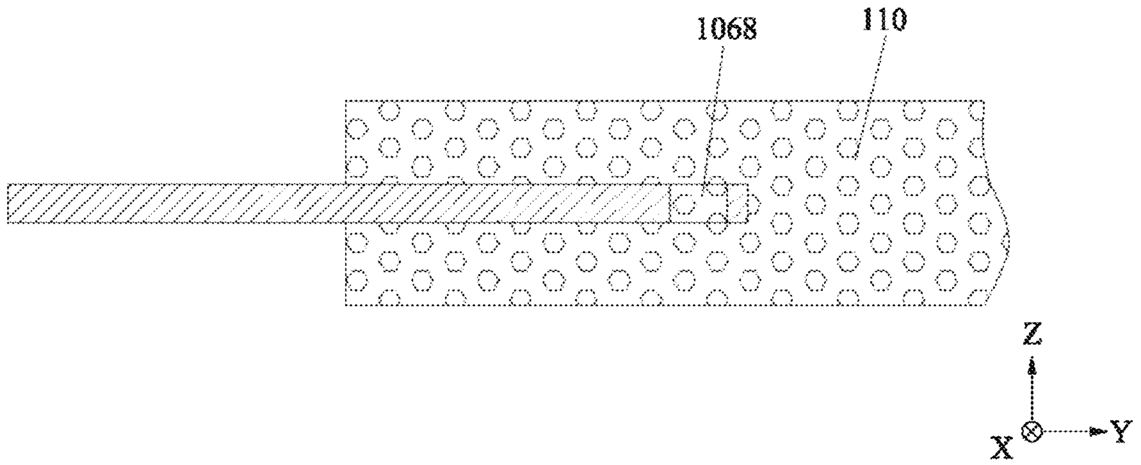
FIG. 20 is a schematic cross-sectional view of FIG. 19.

Please refer to FIG. 17, which is a structural schematic view of the LED filament in an unbent state according to some embodiments of the disclosure. As shown in FIG. 17, in some embodiments, the basic structure of the LED filament 100 can be the same as in the previous embodiments. In this embodiment, the light conversion layer 110 at the junction of the light conversion layer 110 and the electrode 106 forms a connection portion 132. The connection portion 132 covers at least part of the electrode 106 and the connection portion 132 does not cover (or include) the LED chip 111. Please refer to FIGS. 19 and 20. FIG. 19 is a partially structural schematic view of the LED filament according to some embodiments of the disclosure. FIG. 20 is a schematic cross-sectional structural view of FIG. 19. In some embodiments, the electrode 106 has a second portion 1062 wrapped or covered by the light conversion layer 110 and a first portion 1061 exposed from the light conversion layer 110. The area per unit length of the second portion 1062 is less than the area per unit length of the first portion 1061, so that the second portion 1062 has better bending performance than the first portion 1061.

The second portion 1062 has an end 1063, a bent section 1064 and a connection section 1065. The end 1063, the bent section 1064, and the connection section 1065 are arranged in sequence in the length direction of the second portion 1062 and the connection section 1065 is connected to the first portion 1061. The area per unit length of the bent section 1064 is less than the area per unit length of each of the end 1063 and the connection section 1065, so that when the second portion 1062 is subject to force, its main bending portion lies in the bent section 1064.

The area per unit length of the connection section 1065 is greater than each of the areas per unit length of the bent section 1064 and the end 1063, so that the end portion of the light conversion layer 110 and the electrode 106 have a larger connection area to improve the connection strength and prevent cracking at the junction of the end portion of the light conversion layer 110 and the electrode 106 when the LED filament 100 is bent.

As shown in FIG. 19, one or more groups of groove portions 1066 are provided on one or both sides of the bent section 1064 in the width direction to reduce the area per unit length of the bent section 1064, so as to improve the overall bendability. In addition, by the provision of the groove portion 1066, the material of the light conversion layers 110 can pass through the groove portions 1066 to make two parts of the light conversion layer 110 on two opposite sides of the electrode 106 connected by the material of the light conversion layer 110 in the groove portions 1066 to form a connection similar to riveting.

Figure 21:
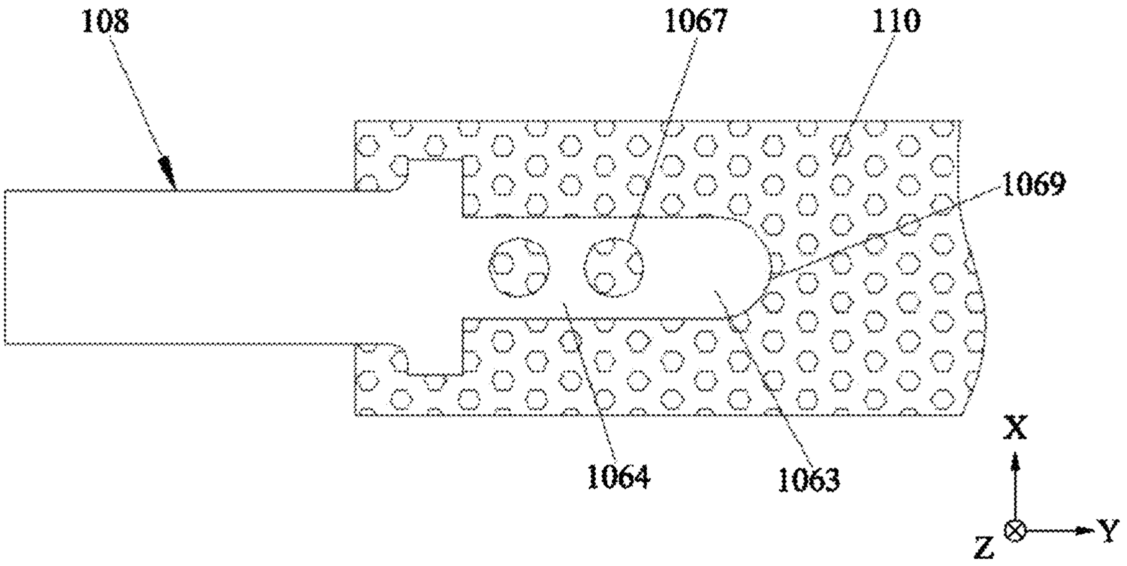
FIG. 21 is a partially structural schematic view (2) of the LED filament according to some embodiments of the disclosure.

Please refer to FIG. 21, which is a partial structural view of the LED filament according to some embodiments of the disclosure. As shown in FIG. 21, one or more groups of holes 1067 are provided at the bent section 1064 to reduce the area per unit length of the bent section 1064. Specifically, the material of the light conversion layer 110 may pass through the holes 1067, so that parts of the light conversion layers 110 at the front and reverse sides of the electrode 106 are connected by the material of the light conversion layer 110 in the holes 1067.

As shown in FIGS. 19 and 20, the end 1063 of the electrode 106 may be provided with a through hole 1068, so that parts of the light conversion layers 110 at the front and reverse sides of the electrode 106 are connected by the material of the light conversion layer 110 in the through hole 1068 to form a connection similar to riveting.

As shown in FIGS. 19 and 21, the end portion of the end 1063 of the electrode 106 is provided with an arc surface 1069 to prevent the formation of stress concentration due to the sharp angle formed at the end 1063 to force the light conversion layer 110 to crack or even fracture. In some embodiments, the end portion of the end 1063 is configured as a spherical surface to achieve the same technical effect as described above.

In some embodiments, the second portion 1062 and the first portion 1061 are made of different materials, so that the second portion 1062 has better bending performance than the first portion 1061.

Figure 22:
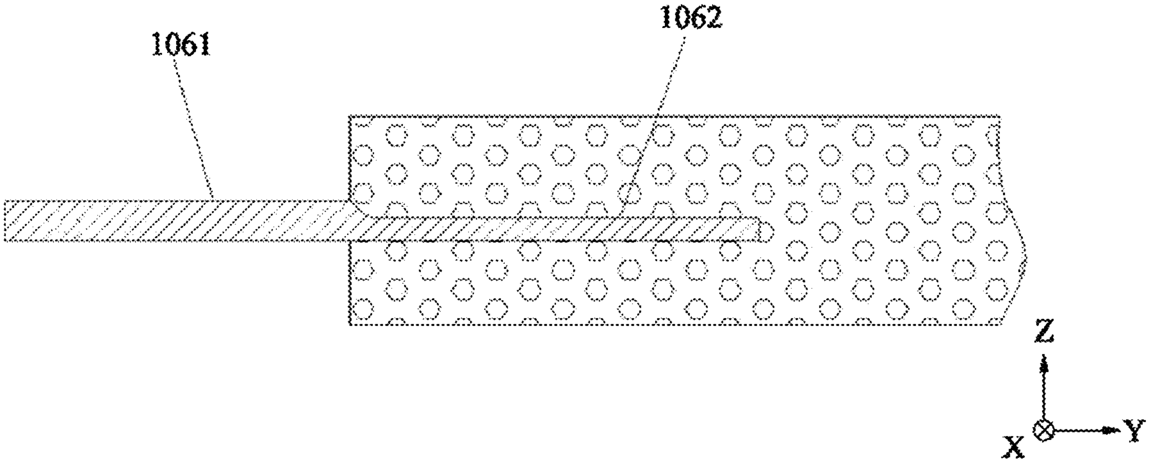
FIG. 22 is a partially structural schematic view (3) of the LED filament according to some embodiments of the disclosure.

Please refer to FIG. 22, which is a partially structural view of the LED filament according to some embodiments of the disclosure. As shown in FIG. 22, in some embodiments, a thickness (average thickness) of the second portion 1062 is less than the thickness (average thickness) of the first portion 1061, so that the second portion 1062 has better bending performance than the first portion 1061.

Figure 23:
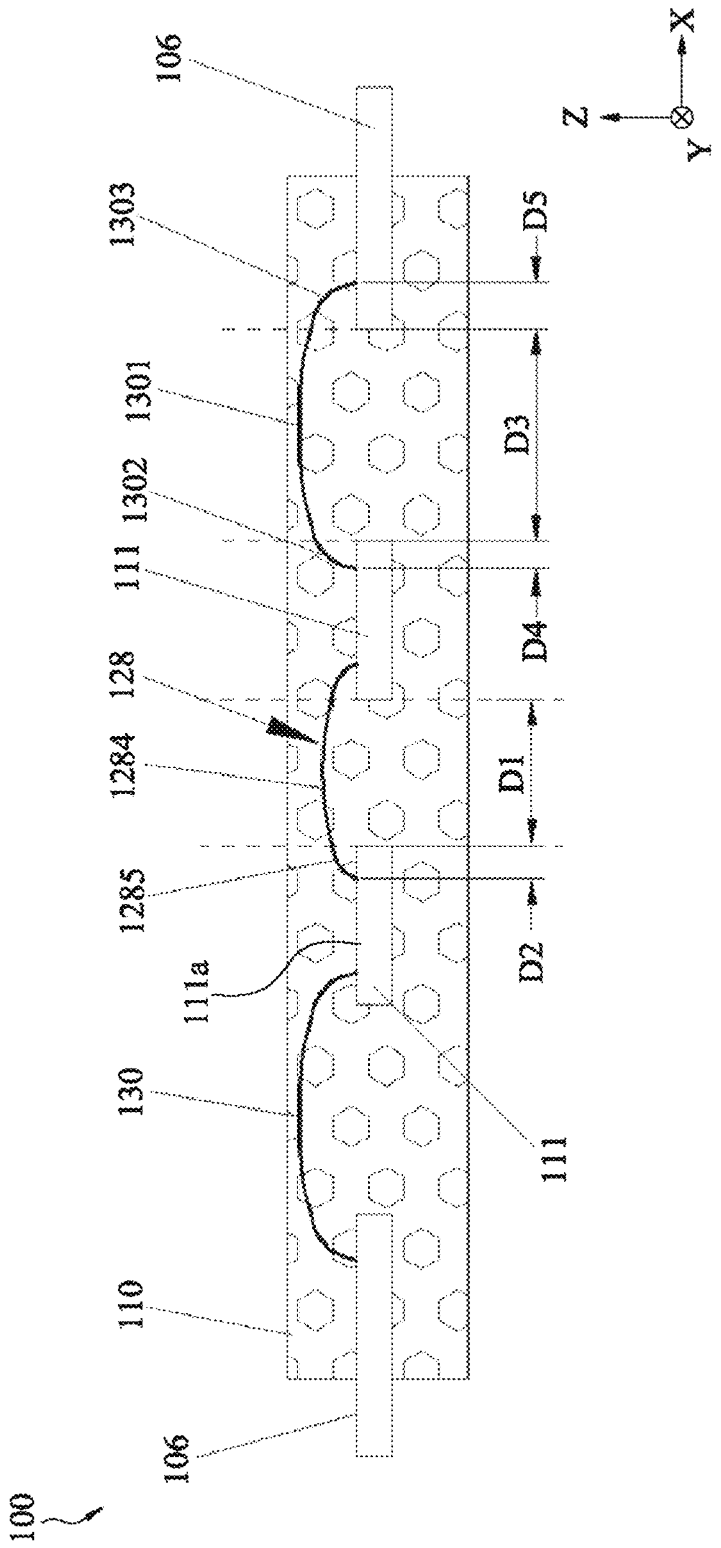
FIG. 23 is a structural schematic view (11) of the LED filament according to some embodiments of the disclosure.

Please refer to FIG. 23, which is a structural schematic view of the LED filament 100 according to some embodiments of the disclosure. As shown in FIG. 23, an LED filament 100 is provided in some embodiments, the basic structure of which may be the same as that in the above embodiments. That is, the LED filament 100 includes a light conversion layer 110, LED chips 111, and an electrode 106. The LED chips 111 are connected by a first conductive wire 128. The LED chips 110 and the electrode 106 are connected by a second conductive wire 130. The light conversion layer 110 covers the LED chips 111 and at least part of the electrode 106. In addition, the basic structure or material composition of the light conversion layer 110 in this embodiment may also be the same as that in the above embodiments.

In this embodiment, the first conductive wire 128 has a first portion 1284. The first portion 1284 is located between two sets of LED chips 111 in the length direction (the X-axis direction in FIG. 23) of the LED filament 100 (in the projection direction (the Z-axis direction in FIG. 23) of the width/thickness of the LED filament 100, the first portion 1284 is located between the edge tangents of the two sets of LED chips 111). In other words, the length of the first portion 1284 is configured to be greater than the projection length of the first portion 1284 in the width direction of the LED filament 100, so as to provide the first conductive wire 128 with a larger margin when the LED filament 100 is bent, to avoid fracture.

In some embodiments, a ratio of the length of the first portion 1284 to the distance D1 between the two sets of LED chips 111 (or the projection length of the first portion 1284 in the width direction (the X-axis direction in FIG. 23) of the LED filament) is greater than 1.1, 1.2, 1.3 or 1.4.

In some embodiments, a ratio of the length of the first portion 1284 to the distance D1 between the two sets of LED chips 1111 (or the projection length of the first portion 1284 in the width direction (the X-axis direction in FIG. 23) of the LED filament 100) is less than 2.

In some embodiments, the first portion 1284 is configured to be an arcuate shape to make its length greater than the distance D1 between the two sets of LED chips 111 (the projection length of the first portion 1284 in the width direction of the LED filament).

Figure 24:
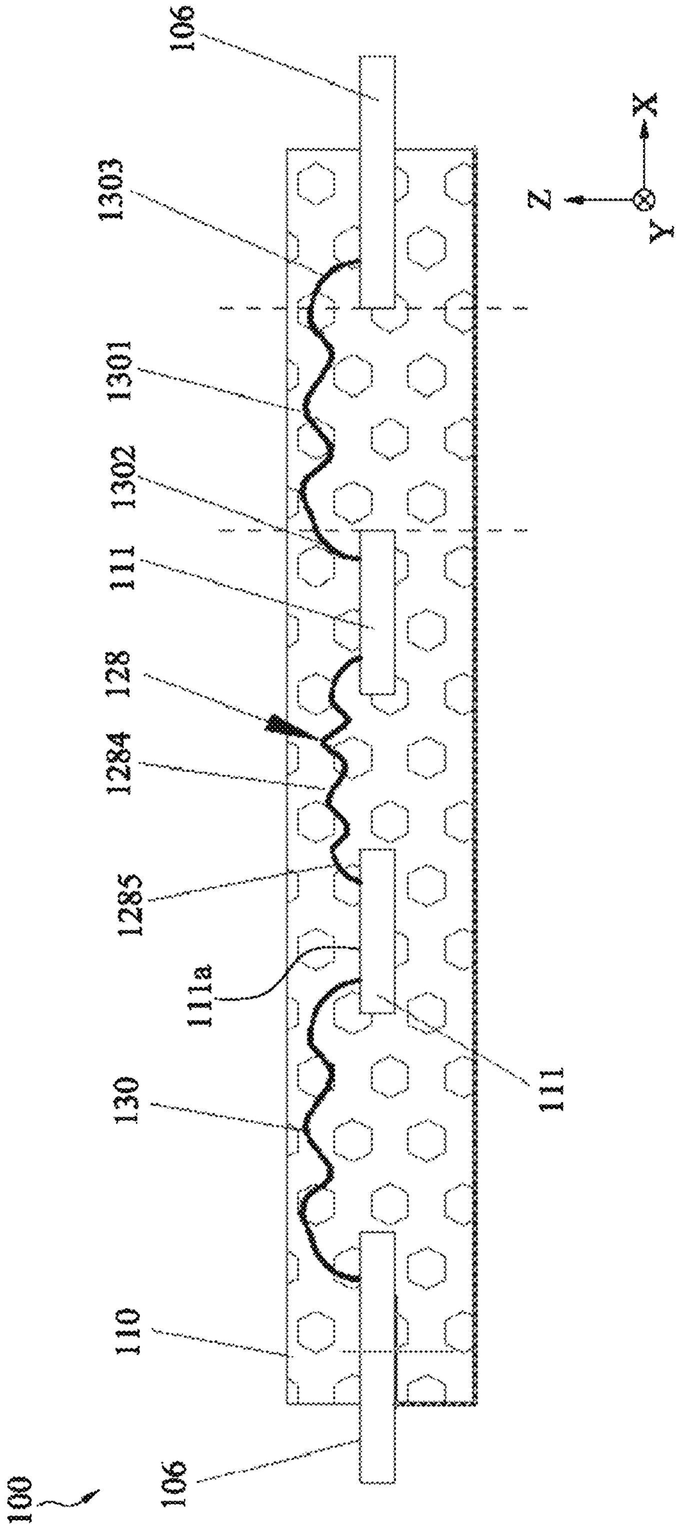
FIG. 24 is a structural schematic view (12) of the LED filament according to some embodiments of the disclosure.

Please refer to FIG. 24, which is a structural schematic view of the LED filament according to some embodiments of the disclosure. As shown in FIG. 24, in some embodiments, the first portion 1284 is configured to be a wavy or spiral shape to make its length greater than the distance between the two sets of LED chips 111 (the projection length of the first portion 1284 in the width direction (the X-axis direction in FIG. 24) of the LED filament).

Figure 26:
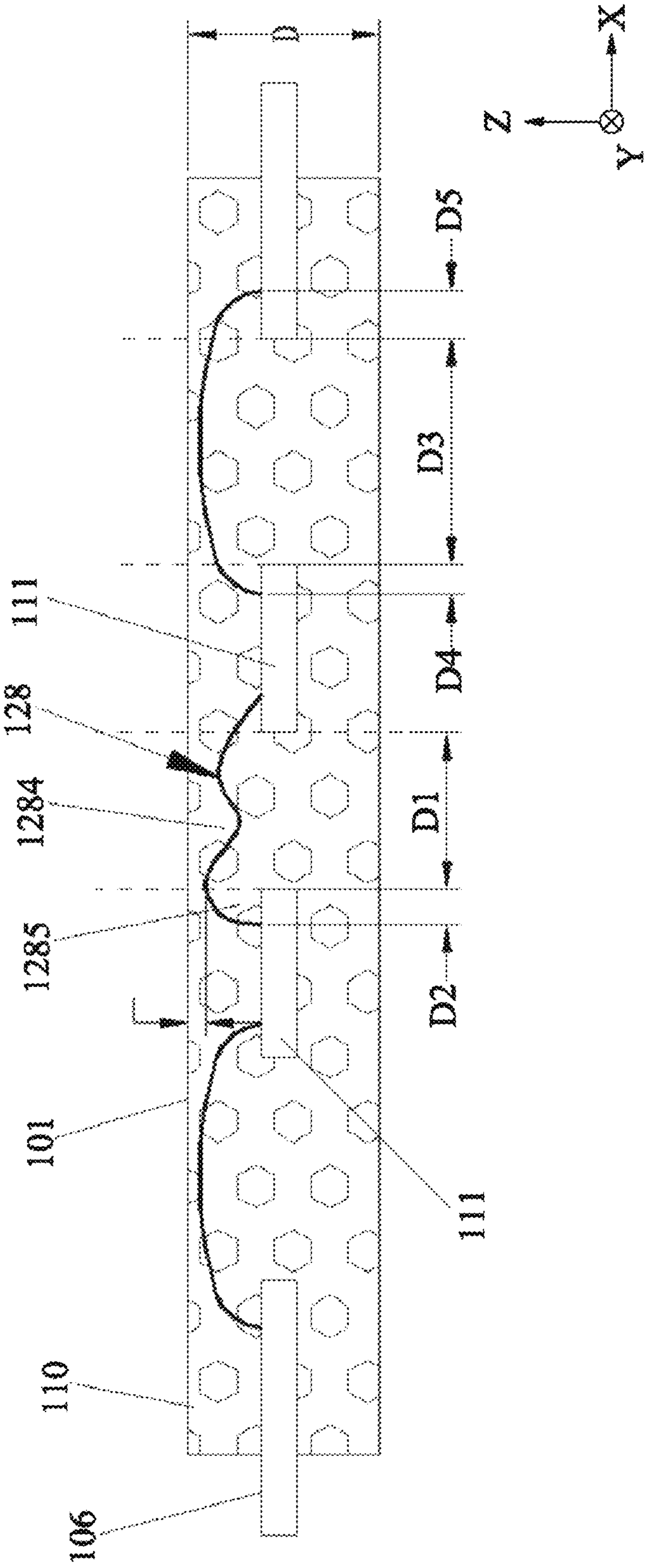
FIG. 26 is a structural schematic view (14) of the LED filament according to some embodiments of the disclosure.

Please refer to FIG. 26, which is a structural schematic view of the LED filament according to some embodiments of the disclosure. As shown in FIG. 26, in some embodiments, the first portion 1284 (or the entire first conductive wire 128) is of an approximately "m" shape when viewed from a side of the LED filament. In this case, the first portion 1284 of the first conductive wire 128 becomes longer in a unit length, and has a greater buffer against bending of the LED filament, to prevent the first portion 1284 from being broken.

Figure 36:
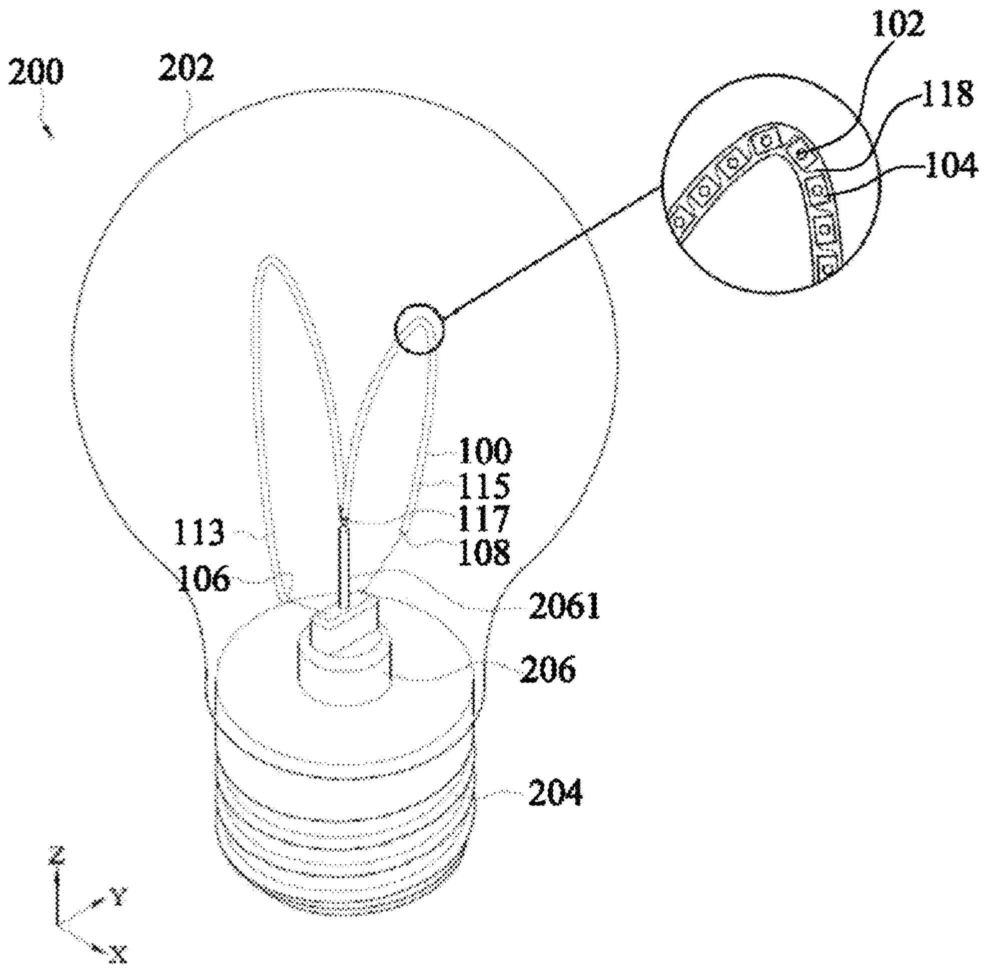
FIG. 36 is a schematic view (1) of the LED light bulb according to some embodiments of the disclosure.
Figure 37:
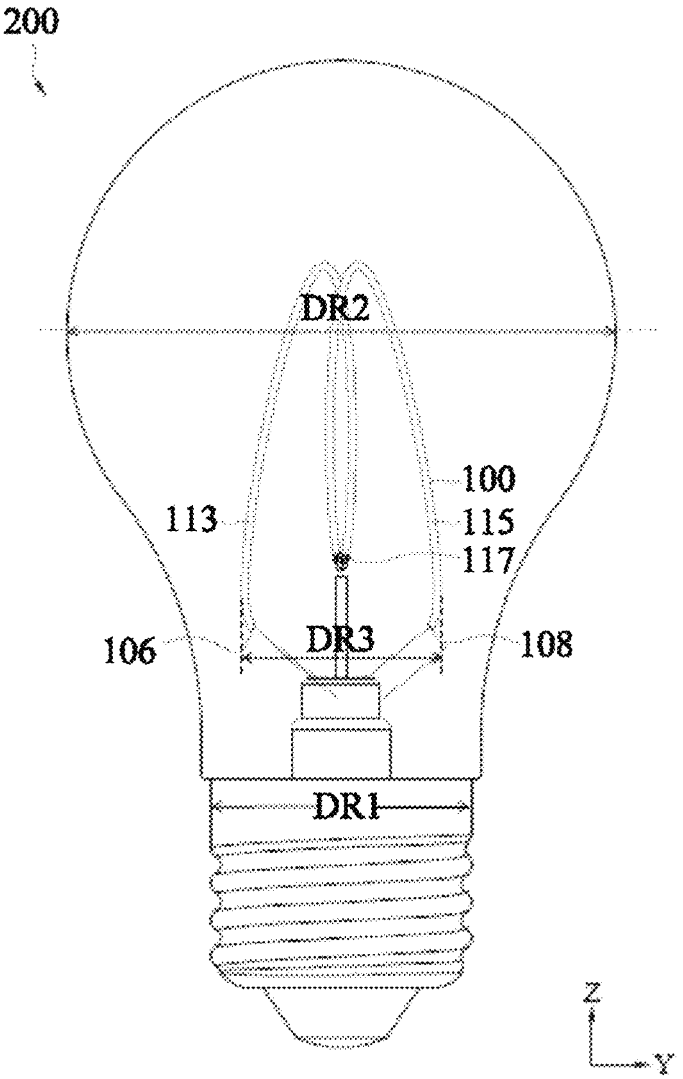
FIG. 37 is a side view of the LED light bulb in FIG. 36.
Figure 38:
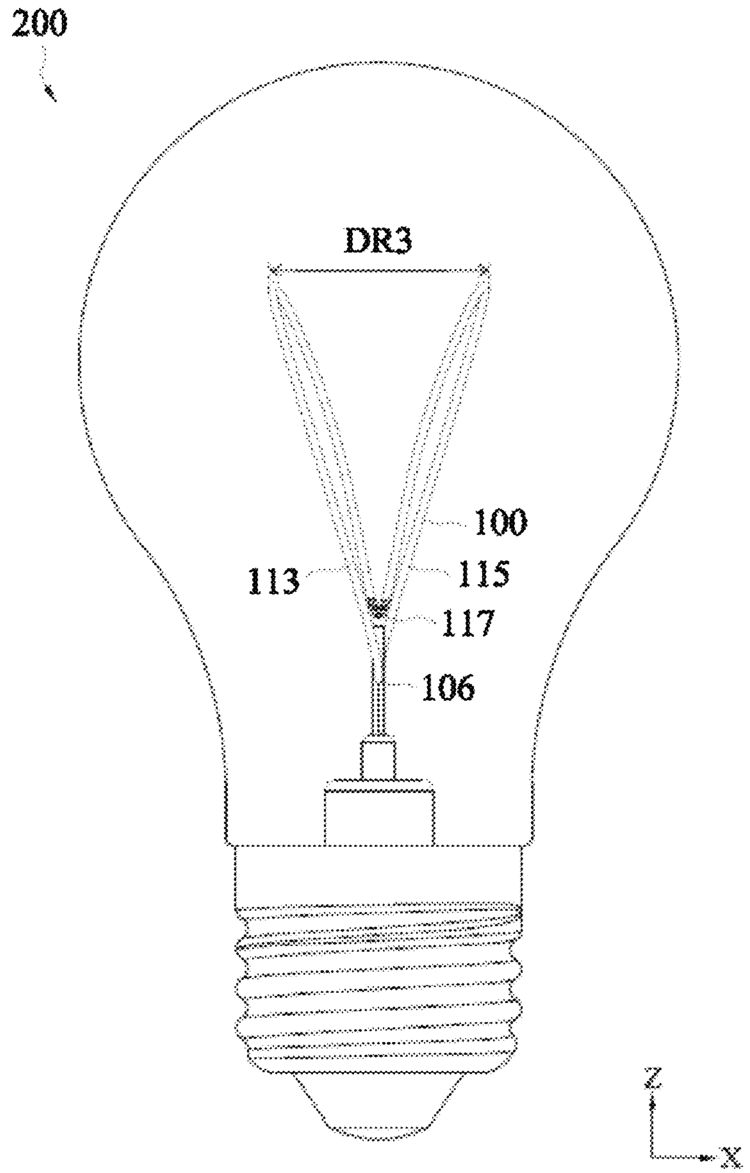
FIG. 38 is another side view of the LED light bulb in FIG. 36.
Figure 39:
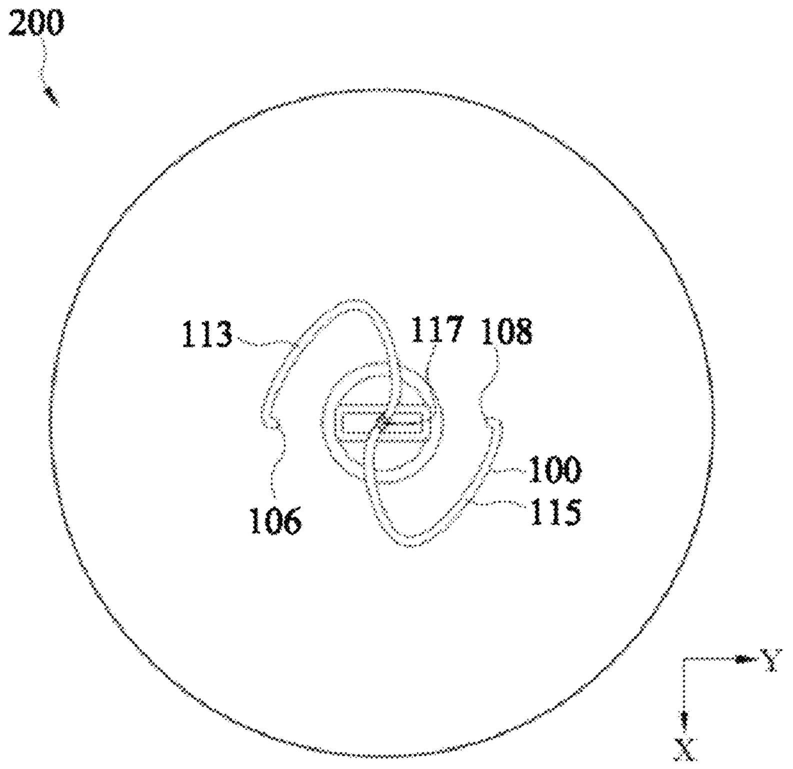
FIG. 39 is a top view of the LED light bulb in FIG. 36.

Please refer to FIGS. 36-39. FIG. 36 is a schematic view of the LED light bulb according to some embodiments of the disclosure. FIG. 37 is a side view of the LED light bulb in FIG. 36. FIG. 38 is another side view of the LED light bulb in FIG. 36. FIG. 39 is a top view of the LED light bulb in FIG. 36. Among them, the structure of the LED filament mentioned in FIGS. 36 to 39 can refer to the structure of the LED filament 100 in FIGS. 1-35. In this embodiment, as shown in FIGS. 36-44, the LED light bulb 200 includes a bulb shell 202, a lamp base 204 connected to the bulb shell 202, at least two conductive brackets, an arm (not shown), a stem 206, and a LED filament 100, the latter four of which are disposed in the bulb shell 202. The stem 206 includes a stem bottom and a stem top portion, which are opposite to each other. The stem bottom is connected to the lamp base 204. The stem top portion extends to the inside of the bulb shell 202. For example, the stem top portion may be located approximately at the center of the bulb shell 202. The conductive brackets are connected to the stem 206. The LED filament 100 includes a filament body and electrodes 106, 108 as mentioned above. The electrodes 106, 108 are located at two opposite ends of the filament body. The filament body is the rest of the LED filament 100 excluding the electrodes 106, 108. The electrodes 106, 108 are separately connected to the two conductive brackets. One end of the arm is connected to the stem 206, and the other end is connected to the filament body.

During the manufacturing process of traditional bulbs, in order to prevent a tungsten filament from burning in the air to cause oxidation, fracture and failure, a glass structure with a horn shape (hereinafter refer to as "horn stem") is designed to be disposed at the opening of the glass bulb shell and then the horn stem is sintered and sealed to the glass bulb shell. Then, a vacuum pump is connected to the bulb shell through a port of the horn stem to replace the air inside the bulb shell with nitrogen so as to avoid combustion and oxidation of the tungsten filament inside the bulb shell. Finally, the port of the horn stem will be sintered and sealed. Therefore, the vacuum pump can pump out the air inside the bulb shell and substitute it with all nitrogen or a combination of nitrogen and helium in a proper proportion through the stem, to improve the thermal conductivity of the gas inside the bulb shell and remove moisture hidden in the air at the same time. In one embodiment, the air may also be replaced with a combination of nitrogen and oxygen or nitrogen and air in a proper proportion. The content of oxygen or air is 1%-10% of the volume of the bulb shell, preferably, 1%-5%. When the base layer contains saturated hydrocarbons, during using the LED light bulb, the saturated hydrocarbons will generate free radicals under the effect of light, heat, stress, etc. The generated free radicals or activated molecules will combine with oxygen to form peroxide free radicals. Thus, filling the bulb shell with oxygen can improve the heat and light resistance of the base layer containing saturated hydrocarbons.

In the manufacturing process of the LED light bulb, in order to increase the refractive index of the bulb shell 202 to the light emitted by the LED filament 100, some foreign matter, for example, rosin, may be attached to an inner wall of the bulb shell 202. The average thickness of the foreign matter deposited per square centimeter of the inner surface area of the bulb shell 202 is 0.01 mm-2 mm, and the thickness of the foreign matter is preferably 0.01 mm-0.5 mm. In one embodiment, the content of the foreign matter per square centimeter of the inner surface area of the bulb shell 202 accounts for 1%-30% of the content of the foreign matter on the inner wall of the entire bulb shell 202, preferably 1%-10%. For example, the content of the foreign matter may be adjusted by vacuum drying the bulb shell 202. In another embodiment, some impurities may be left in the gas filled in the bulb shell 202. The content of the impurities in the gas filled is 0.1%-20% of the volume of the bulb shell 202, preferably 0.1%-5%. For example, the content of the impurities may be adjusted by vacuum drying to the bulb shell 202. Because the gas filled contains a small amount of impurities, the light emitted by the LED filament 100 is emitted or refracted by the impurities to increase its luminous angle, which is beneficial to improving the luminous effect of the LED filament 100.

The LED light bulb 200 is located in a three-dimensional coordinate system having an X-axis, a Y-axis and a Z-axis, where the Z-axis is parallel to the stem 206. Lengths of the projection of the LED filament 100 on the XY-plane, YZ-plane and XZ-plane are the first length, the second length and the third length, respectively. In an embodiment, the first length, the second length and the third length are in a ratio of 0.8:1:0.9. In some embodiments, the first length, the second length and the third length are in a ratio of (0.5 to 0.9): 1:(0.6 to 1). The ratio of the first length, the second length and the third length is closer to 1:1:1, the lighting effect of the LED light bulb 200 is better, which can perform the omnidirectional light.

The LED filament 100 has two first bending points and one second bending point when the LED filament 100 is bent. The first bending point and the second bending points are arranged alternately, and the height of the first bending point (or any one of the first bending points) on the Z-axis is greater than that of the second bending point. In one embodiment, the distances between adjacent two of the first bending points on the Y-axis or the X-axis are equal, so that the LED filament 100 has a neat and beautiful appearance. As shown in FIGS. 36-39, in this embodiment, the LED filament 100 has one conductor section 117 and two LED sections 113, 115. The two LED sections 113, 115 are connected to each other by the conductor section 117. The bend of the LED filament 100 at the highest point appears arcuate. That is, each LED section 113, 115 has an arc-shaped bend at the highest point of the LED filament 100, and the conductor section 117 also appears arcuate at a low point of the LED filament 100. The LED filament 100 may be configured to a structure where each bent conductor section 117 is followed by one segment, and each LED section 113, 115 forms a corresponding section.

Moreover, the base layer adopts a flexible base layer, which is preferably made of a silicone-modified polyimide resin composition including silicon-modified polyimide, a thermal curing agent, thermal conductive particles and fluorescent powder. In this embodiment, two LED sections 113, 115 are separately bent to form an inverted-U shape, the conductor section 117 is located between the two LED sections 113, 115, and the bending degree of the conductor section 117 is the same as or greater than that of the LED sections 113, 115. That is, each of the two LED sections 113, 115 is bent at a high point of the LED filament 100 to form an inverted-U shape and has a bending radius r1, the conductor section 117 is bent at a low point of the LED filament 100 and has a bending radius r2, and r1 is greater than r2. By the configuration of the conductor section 117, the LED filament 100 can be bent with a small radius of gyration in a limited space. In one embodiment, the bending points of the LED section 113 and the LED section 115 are different in height in the Z-axis direction in FIG. 36. For example, the height of the bending point of the LED section 113 is greater than the height of the bending point of the LED section 115. In the case of the same length of the LED filament 100, when the LED filament 100 is placed in the bulb shell 202 in this way, part of the LED filament 100 will be biased towards the bulb shell 202, so the heat dissipating effect of the LED filament 100 will become better. In addition, in the Z-axis direction, a stand 2061 in this embodiment has a smaller height than the stand 2061 in the previous embodiment, and the height of the stand 2061 of this embodiment corresponds to the height of the conductor section 117 or the stand 2061 is in contact with part of the conductor section 117. For example, the lowest portion of the conductor section 117 may be connected to the top portion of the stand 2061, so that the overall shape of the LED filament 100 is not easily deformed. In different embodiments, the conductor section 117 may pass through a through hole in the top portion of the stand 2061 to be connected thereto, or the conductor section 117 may be adhered to the top portion of the stand 2061 to be connected thereto, but it is not limited to these. In one embodiment, the conductor section 117 may be connected to the stand 2061 by a conductive thin wire, for example, the conductive thin wire is extended from the top portion of the stand 2061 and connected to the conductor section 117.

As shown in FIG. 37, in this embodiment, in the Z-axis direction in FIG. 37, the height of the conductor section 117 is greater than that of each electrode 106, 108. The two LED sections 113, 115 may be separately upward extended from the two electrodes 106, 108 to the highest point and then bendingly downward extended to connect to the conductor section 117 of the two LED sections 113, 115. As shown in FIG. 38, in this embodiment, the outline of the LED filament 100 on the XZ-plane is similar to a V shape, that is, the two LED sections separately extend upward and outward obliquely, and separately extend downward and inward obliquely to the conductor section 117 after being bent at the highest points. As shown in FIG. 39, in this embodiment, the outline of the LED filament 100 on the XY-plane has an S shape. As shown in FIGS. 37 and 39, in this embodiment, the conductor section 117 is located between the electrodes 106, 108. As shown in FIG. 39, in this embodiment, on the XY-plane, the bending point of the LED section 113, the bending point of the LED section 115, and the electrodes 106, 108 are substantially located on a circumference of a circle with the conductor section 117 (or the stem 206 or the stand 2061) as a center. For example, on the XY-plane, the bending point of the LED section 113 and the bending point of the LED section 115 are located on the same circumference of a circle with the stem 206 or the stand 2061 as a center. In some embodiments, on the XY-plane, the bending point of the LED section 113, the bending point of the LED section 115, and the electrodes 106, 108 are located on the same circumference of a circle with the stem 206 or the stand 2061 as a center.

Figure 40:
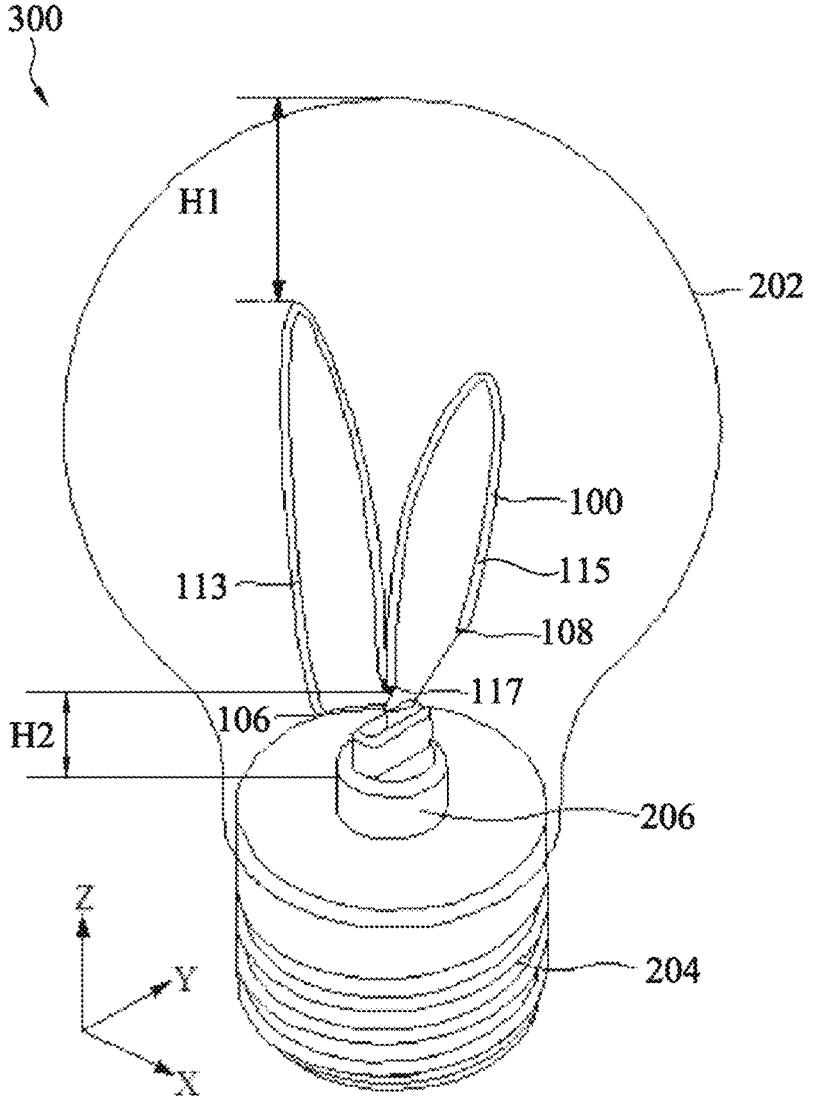
FIG. 40 is a schematic view (2) of the LED light bulb according to some embodiments of the disclosure.

Referring to FIG. 40, which is a schematic view of the LED light bulb according to some embodiments of this disclosure. The LED light bulb 300 in this embodiment has the same basic structure as the LED light bulb 200 in FIG. 36. The LED light bulb 300 includes a bulb shell 202, a lamp base 204 connected to the bulb shell 202, at least two conductive brackets, an arm (not shown), a stem 206, and an LED filament 100, the latter four of which are disposed in the bulb shell 202. The difference is that the LED light bulb 300 in this embodiment does not have a stand 2061. The stem 206 includes a filling pipe. The abovementioned gas in the bulb shell 202 is filled through the filling pipe. As shown in FIG. 40, in the Z-axis direction, the shortest distance from the LED filament 100 (or the bending point of the LED section 113 or the LED section 115) to the bulb shell 202 is H1, the shortest distance from the conductor section 117 of the LED filament 100 to the stem 206 is H2, H1 is less than or equal to H2, and the bending points of the LED sections 113, 115 are closer to the bulb shell 202, so that the cooling path of the LED filament 100 is short, thereby improving the cooling effect of the LED light bulb 300. In other embodiments, H2 is greater than H1 (not shown), the LED filament 300 is approximately located in the middle area of the bulb shell 202, and its lighting effect is better.

Figure 41:
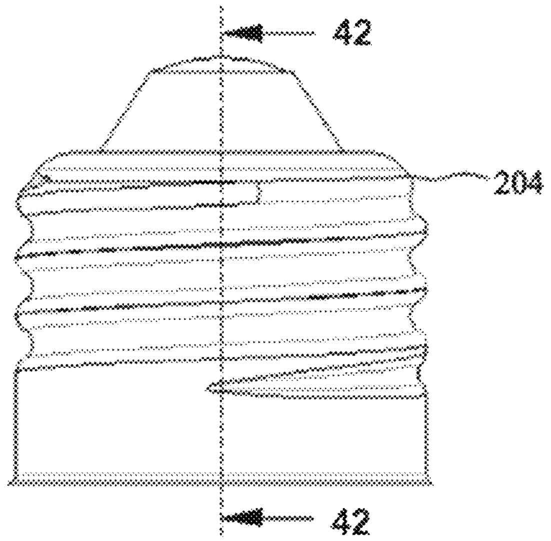
FIG. 41 is a schematic view of lamp base according to an embodiment of the disclosure.
Figure 42:
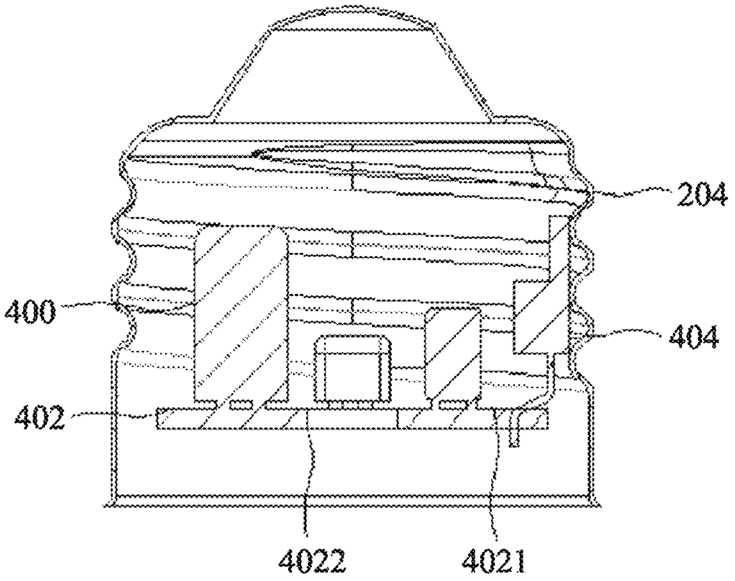
FIG. 42 is a schematic cross-sectional view of the lamp base along line A-A in FIG. 41.

Please refer to FIGS. 41 and 42. FIG. 41 is a schematic view of a lamp base according to some embodiments of the disclosure. FIG. 42 is a cross-sectional view of the lamp base along line A-A in FIG. 41. In this embodiment, the LED light bulb may be any LED light bulb disclosed in the previous embodiments, and any LED filament disclosed in the previous embodiments is disposed in the LED light bulb. In this embodiment, the LED light bulb 200 is used as an example. A power member (or a driving power supply) 400 is disposed in a lamp base 204, the power member 400 is electrically connected to the LED filament 100, and the power member 400 is electrically connected to the electrodes 106, 108 of the LED filament 100. The power member 400 includes a substrate 402. Heating elements (elements that generate more heat during operation, such as ICs or resistors) and heat-intolerant components (such as electrolytic capacitors) are disposed on the substrate 402. The lamp base 204 has an inner surface and an outer surface opposite to the inner surface. The outer surface of the lamp base 204 is away from the power member 400. The heating elements are closer to the inner surface of the lamp base 204 than the heat-intolerant components. An insulation sheet 404 is disposed on the heating elements, and the insulation sheet 404 is in contact with the inner surface of the lamp base 204. For example, the insulation sheet 404 may be in contact with the inner surface of the lamp base 204 by soldering or fasteners. In some embodiments, the heating elements are integrally encapsulated into a component, a cooling sheet is disposed on the component, and the cooling sheet is in contact with the inner surface of the lamp base 204. For example, after an integrated circuit and a rectifier bridge are encapsulated into a component, the cooling sheet is in contact with the inner surface of the lamp base 204 by soldering or fasteners. The cooling sheet may serve as a negative wire to be soldered to the inner surface of the lamp base 204.

In some embodiments, as shown in FIG. 42, the substrate 402 is in direct contact with the inner surface of the lamp base 204. Compared with the indirect contact between the substrate 402 and the lamp base 204 through glue, the direct contact can improve the cooling effect of the light bulb by way of reducing heat transfer media.

In some embodiments, as shown in FIG. 42, the heating elements are covered with thermal glue. For example, the substrate 402 has a first surface 4021 and a second surface 4022, the second surface 4022 is away from the LED filament 100, the heating elements and the heat-intolerant elements are located on the first surface 4021 and the second surface 4022, respectively, and the first surface 4021 is covered with thermal glue, the heat generated by the heating elements may be transferred to the lamp base 204 through the thermal glue, thereby improving the cooling effect of the LED light bulb (not shown in this figure).

Figure 43:
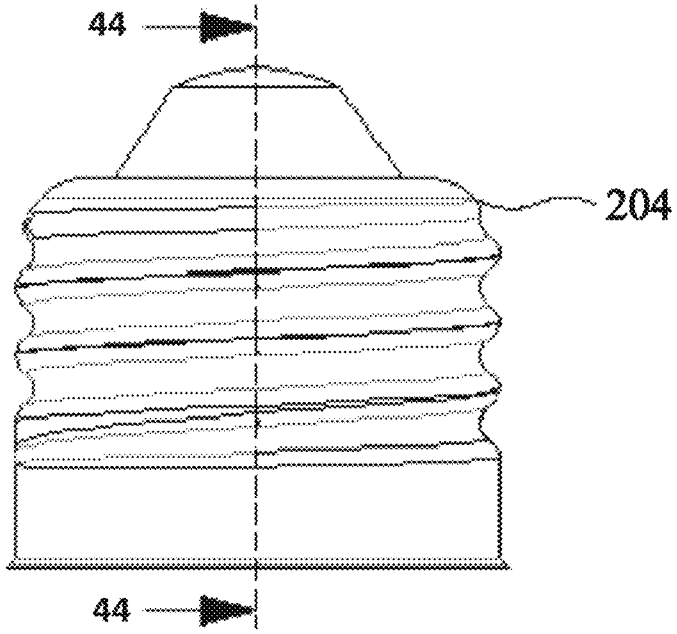
FIG. 43 is a schematic view (3) of the lamp base according to some embodiments of the disclosure.
Figure 44:
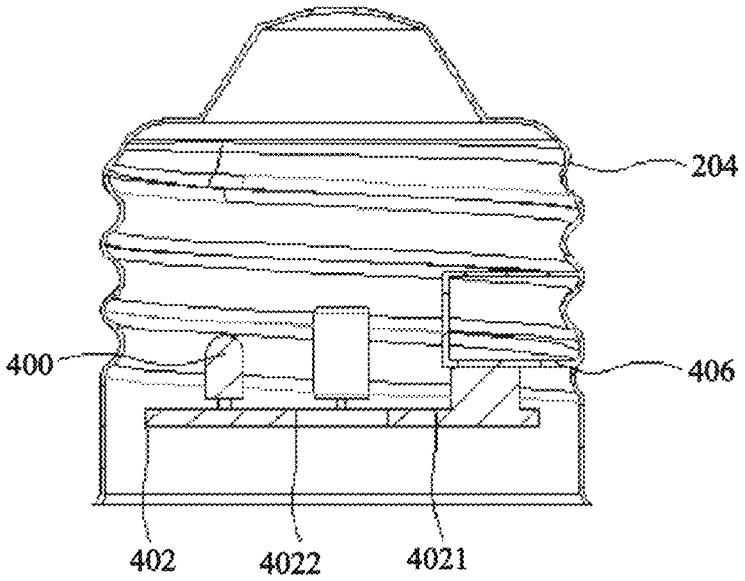
FIG. 44 is a schematic cross-sectional view (1) of the lamp base along line B-B in FIG. 43.

In some embodiments, please refer to FIGS. 43 and 44. FIG. 43 is a schematic view of the lamp base according to some embodiments of the disclosure. FIG. 44 is a schematic cross-sectional view of the lamp base along line B-B in FIG. 43. As shown in FIGS. 43 and 44, in this embodiment, the LED light bulb can be any LED light bulb disclosed in the previous embodiments, and this LED light bulb is provided with one of LED filaments disclosed in various previous implementations. The power member may also be any one disclosed in the previous embodiments. A heat conduction portion 406 is disposed on the inner surface of the lamp base 204. The heat conduction portion 406 may be a net bag accommodating the heating elements or a metal piece in contact with the heating elements. A thermal conductivity of the heat conduction portion 406 is greater than or equal to a thermal conductivity of the lamp base 204, so that the heat generated by the heating elements may be quickly transferred to the lamp base 204 through the heat conduction portion 406, thereby improving the cooling effect of the LED light bulb (not shown in this figure).

In some embodiments, each surface of the power member 400 is covered with thermal glue, and part of the thermal glue is in contact with the inner surface of the lamp base 204. For example, a flexible substrate may be used to be completely installed in the lamp base 204 with pouring thermal glue into the lamp base 204. The power member is entirely covered with thermal glue to increase cooling area, thereby greatly improving the cooling effect of the LED light bulb.

Figure 45:
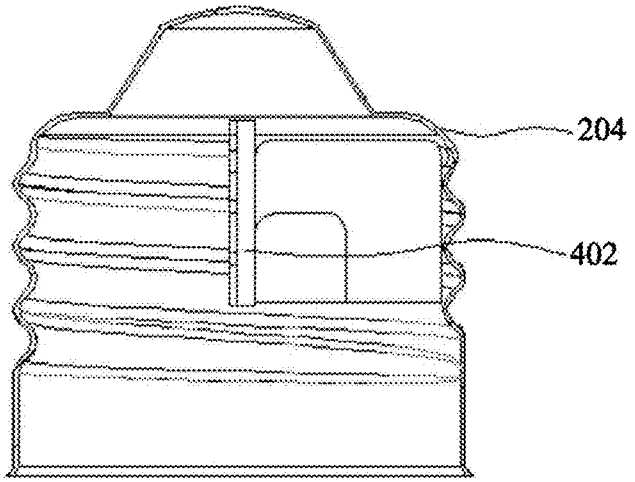
FIG. 45 is a schematic cross-sectional view (2) of the lamp base along line B-B in FIG. 43.

In another embodiment, please refer to FIG. 45, which is a schematic cross-sectional view of the lamp base along line B-B in FIG. 43. As shown in FIG. 45, in this embodiment, the LED light bulb can be any one of the LED light bulbs disclosed in the previous embodiments, and this LED light bulb is provided with any one of the LED filaments disclosed in the previous embodiments. The power member may also be any one of the power members disclosed in the previous embodiments. The substrate 402 is parallel to the axial direction of the lamp base 204 (please refer to the axial direction of the stem 206 in FIGS. 36, 40 and 46A). Since all the heating elements can be placed on a side of the substrate 402, which is adjacent to the lamp base 204, the heat generated by the heating elements can be quickly transferred to the lamp base 204, thereby improving the cooling efficiency of the power member. In addition, the heating elements and the heat-intolerant elements can be separately arranged on the different surfaces of the substrate 402 to reduce the influence of the heat generated by the heating elements to the heat-intolerant elements and improve overall reliability and service life of the power member. In one embodiment, heating elements (elements that generate more heat during operation, such as ICs or resistors) and heat-intolerant elements (such as electrolytic capacitors) are disposed on the substrate 402. The heating elements is closer to the inner surface of the lamp base 204 than other electronic elements (such as heat-intolerant elements or other non-thermosensitive elements, such as a capacitor). Therefore, compared with other electronic elements, the heating elements have a shorter heat transfer distance from the lamp base 204, which is more conducive to the heat generated by the heating elements during operation being conducted to the lamp base 204 for heat dissipation, thereby improving the cooling efficiency of the power member 400.

As shown in FIGS. 40-45, the projections of the filling pipe (not shown in the figure) and the substrate 402 on the XY-plane overlap. In some embodiments, the projections of the filling pipe and the substrate 402 on the XZ-plane and/or YZ-plane are separate (or do not overlap), or in the height direction of the lamp base 204 (or the Z-axis direction in FIG. 40), there is a certain distance between the filling pipe and the substrate 402. The filling pipe and the substrate 402 are out of contact with each other, thereby increasing an accommodation space of the power member 400 and improving a utilization rate of the substrate 402. In addition, when the substrate 402 is in contact with the inner surface of the lamp base 204, a cavity is formed between the first surface 4021 of the substrate 402 and the stem 206. The heat generated by the heating elements located on the first surface of the substrate 402 may be transferred through the cavity, which reduces thermal impact on the heat-intolerant elements located on the second surface, thereby increasing service life of the power member 400.

Figure 46A:
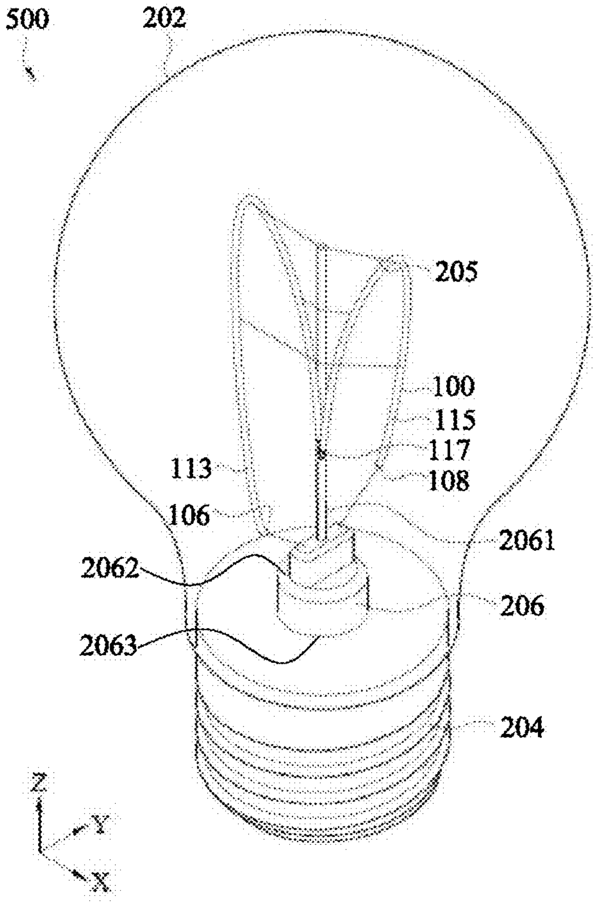
FIG. 46A is a schematic view (3) of the LED light bulb according to some embodiments of the disclosure.
Figure 46B:
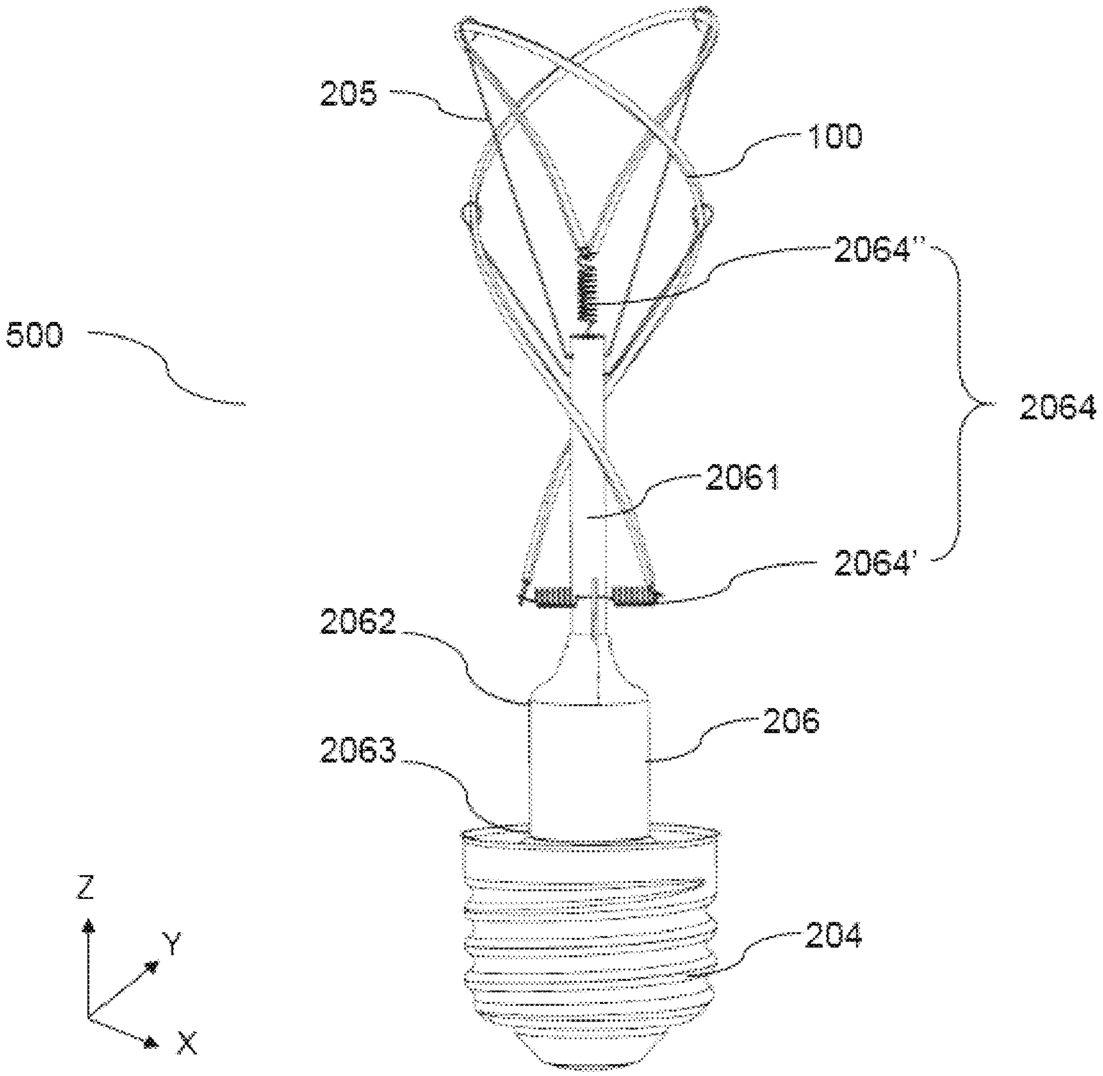
FIG. 46B is a structural schematic view (1) of the LED light bulb with a buffer structure according to some embodiments of the disclosure.
Figure 46C:
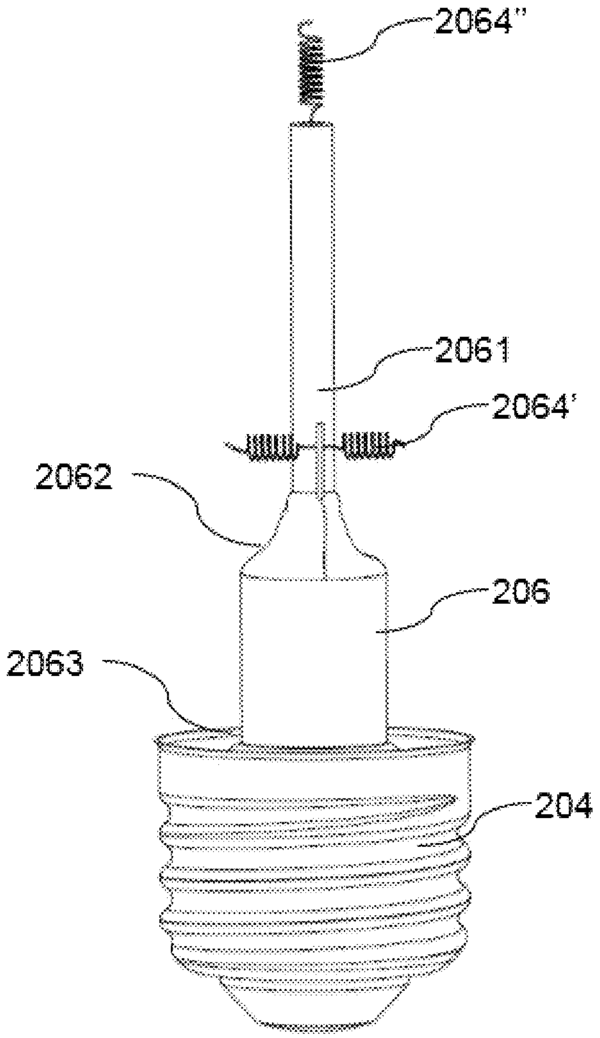
FIG. 46C is a structural schematic view (2) of the LED light bulb with a buffer structure according to some embodiments of the disclosure.
Figure 46D:
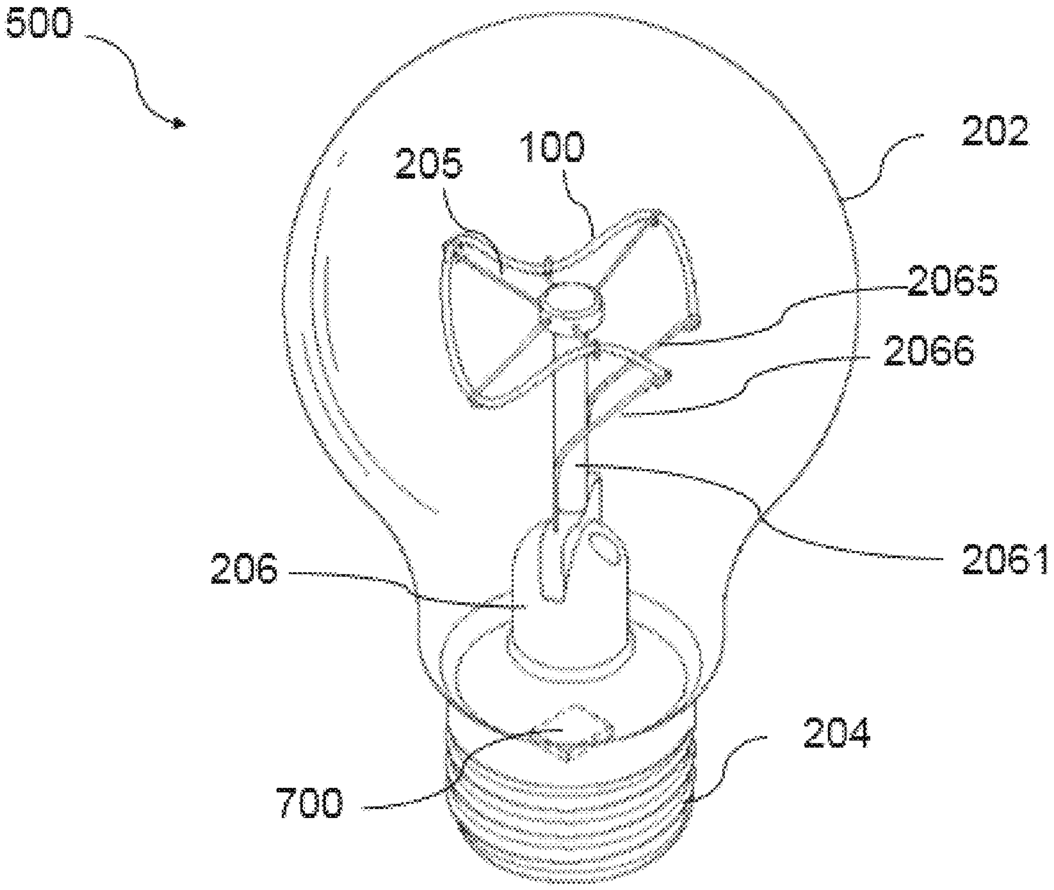
FIG. 46D is a perspective schematic view of the LED light bulb according to some embodiments of the disclosure.
Figure 47:
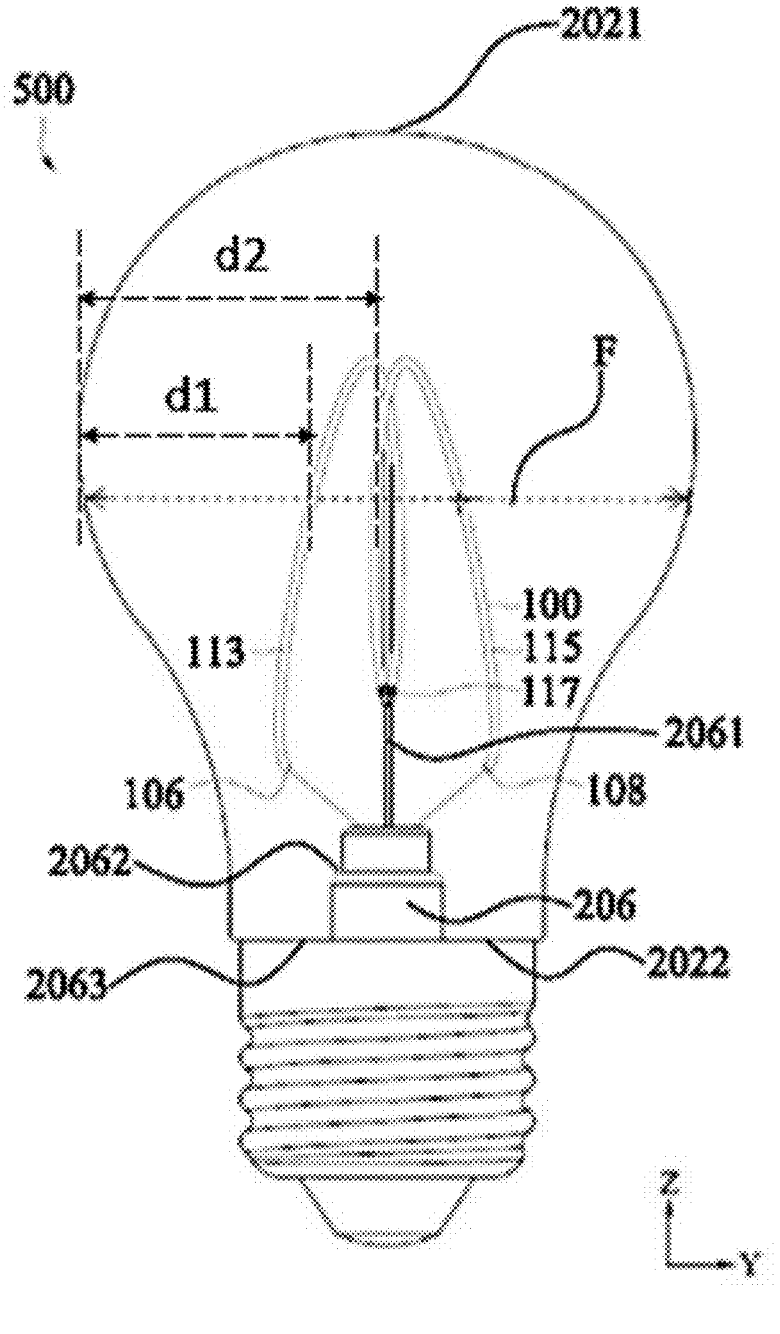
FIG. 47 is a side view of the LED light bulb in FIG. 46A.
Figure 48:
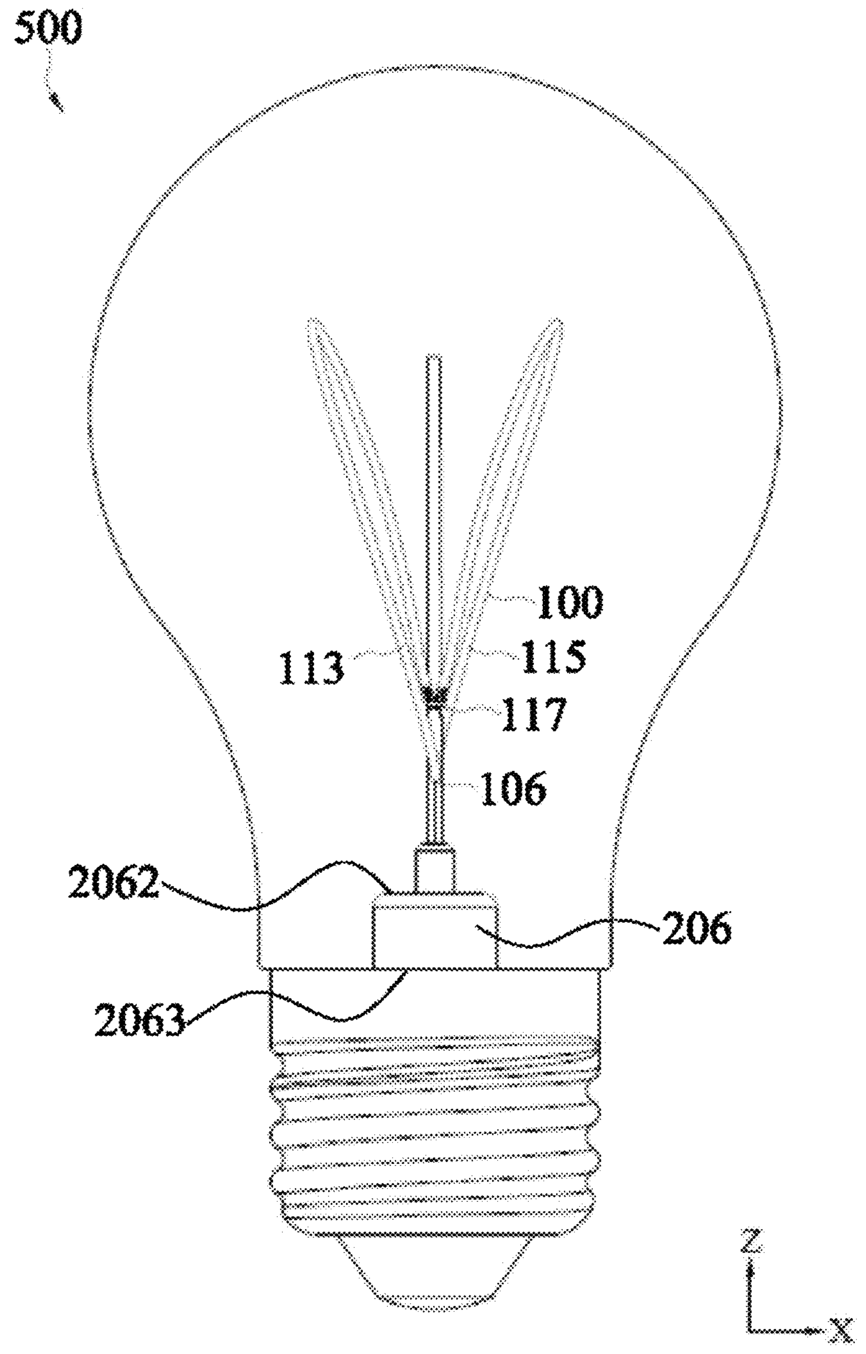
FIG. 48 is another side view of the LED light bulb in FIG. 46A.
Figure 49:
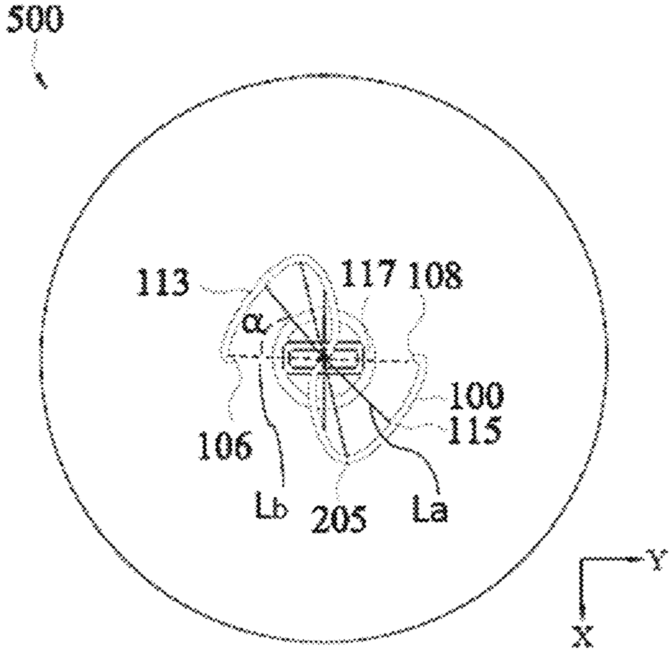
FIG. 49 is a top view of the LED light bulb in FIG. 46A.

Please refer to FIGS. 46A-49. FIG. 46A is a schematic view of the LED light bulb according to some embodiments of the disclosure. FIG. 47 is a side view of the LED light bulb in FIG. 46A. FIG. 48 is another side view of the LED light bulb in FIG. 46A. FIG. 49 is a top view of the LED light bulb in FIG. 46A. For the LED filament 100 shown in FIGS. 46A-49, please refer to the structure of the LED filament 100 in FIGS. 1-35. The LED light bulb 500 of this embodiment has the same basic structure as the LED light bulb 200 in FIG. 36. The LED light bulb 500 includes a bulb shell 202, a lamp base 204 connected to the bulb shell 202, at least two conductive brackets disposed in the bulb shell 202, at least one arm 205, a stem 206, and an LED filament 100. The arm 205 is not shown in FIGS. 47 and 48. The stem 206 includes a stand 2061. Each arm 205 includes a first end and a second end, which are opposite to each other. The first end of each arm 205 is connected to the stand 2061, and the second end of each arm 205 is connected to the LED filament 100. The LED light bulb 500 shown in FIG. 48 is different from the light bulb 200 shown in FIG. 36 in that the height of the stand 2061 is greater than the distance between a stand bottom portion and the conductor section 117 in the Z-axis direction in FIG. 48. The stand 2061 includes a stand bottom portion and a stand top portion opposite to each other. The stand bottom portion is closer to the filling pipe (not shown). As shown in FIG. 49, on the XY-plane in FIG. 49, the central angle corresponding to the arc where at least two bending points of the LED filament 100 are located in a range from 170° to 220°, so that there is a proper distance between the bending points of the LED sections 113, 115, to ensure the cooling effect of the LED filament 100. At least one arm 205 is located at the bending point of the LED filament 100, for example, at the bending point of the LED section 113 or the LED section 115. Each arm 205 has an intersection with the LED filament 100. On the XY-plane, at least two intersections are located on a circumference of a circle with the stem 206 (or the stand 2061) as a center, so that the LED filament 100 has certain symmetry, the luminous flux in all directions is roughly the same, and the light bulb 200 can emit light evenly. In some embodiments, at least one intersection and the bending point of the conductor section 117 form a straight line La, and the intersection on the straight line La and the electrodes 106, 108 of the LED filament 100 form another straight line Lb. The range of the angle $\alpha$ between the straight line La and the straight line Lb is $0° < \alpha < 90°$, preferably $0° < \alpha < 60°$, so that the LED sections 113, 115 have a proper distance after bending, and have good light emission and cooling effects. The bending point of each LED section 113, 115 has a curvature radius. For example, the bending point of the LED section 113 has a curvature radius r3, the bending point of the LED section 115 has a curvature radius r4. When r3 is equal to r4, the light emission is uniform on each plane. Certainly, it is also possible to set r3 to be greater than r4 or r3 to be less than r4 to meet lighting requirements and/or cooling requirements in some specific directions. The bending point of the conductor section 117 has a curvature radius r5. r5 is less than a maximum value of r3 and r4, that is, r5<max (r3, r4). As a result, the LED filament 100 is not easy to be broken, and there is a certain distance between the LED sections 113, 115 that are closer to the stem to prevent the heat generated by the two LED sections 113, 115 from affecting each other.

Please refer to FIG. 46D, which is a perspective schematic view of an embodiment of the disclosure. As shown in FIG. 46D, the LED light bulb 500 includes a bulb shell 202, a lamp base 204 connected to the bulb shell 202, a support portion (including arms 205 and a stem 206), at least two conductive brackets 2065, 2066, a driver circuit 700 and a single lighting portion (i.e., LED filament) 100. The driver circuit 700 is electrically connected to the conductive brackets 2065, 2066 and the lamp base 204. The stem 206 has a stand 2061 perpendicularly extending to the stand 2061 at the center of the bulb shell 202. The stand 2061 is located on the central axis line of the lamp base 204 or of the LED light bulb 500. The arms 205 are located between the stand 2061 and the LED filament 100. The arms 205 are used to support the LED filament 100 and keep the preset curve and shape of the LED filament 100. Each arm 205 includes a first end and a second end, which are opposite. The first end of each arm 205 is connected to the stand 2061 and the second end of each arm 205 is connected to the LED filament 100.

Generally speaking, in the LED light bulb 500, the amount of the arms 205 depends upon the overall shape of the LED filament 100. To keep the shape of the flexible LED filament 100, a basic principle is to provide an arm at each turn of the LED filament 100. However, among LED filament products with high lumen, an overall length of a flexible LED filament 100 is relatively long, during the transportation of the LED bulb 500, the LED filament 100 may be damaged due to shaking. Therefore, by increasing the number of the arms 205, the shaking degree of the filament 100 in the LED bulb 500 can be reduced, thereby reducing the occurrence probability of damage to the LED filament 100. More specifically, by designing the number of the arms 205 and the shaping turns of the LED filament 100 according to the following relationship, the aforementioned advantages can be achieved: the number of the arms 205 in the LED bulb 500 is X, and the number of shaping turns of the LED filament 100, which is formed in the LED light bulb 500, is Y, then $$Y+5 \geq X \geq Y+2$$

When the number of the arms 205 is too small (i.e., less than Y+2), the reinforcing effect cannot be achieved. When the number of the arms 205 is too large (i.e., greater than Y+5), it will inevitably block the light emission and affect the light emission effect of the LED filament 100 when it is working. At the same time, the product manufacturing costs increase. Therefore, the above design of the number of the arms 205 can obtain both product quality and lighting effect.

Please refer to FIGS. 40-44. In this embodiment, the LED light bulb may be any LED light bulb disclosed in the previous embodiments, and any LED filament disclosed in the previous embodiments is disposed in the LED light bulb. The power member may also be any power member disclosed in the previous embodiments. In this embodiment, the LED filament 100 includes a top layer 120 and a loading layer 122. When the LED filament 100 is bent, on a cross-section in any height direction of the LED filament 100, or on a cross-section on the central axis (or the optical axis) of the LED chip 111, in comparison with the top layer 120, the loading layer 122 is closer to the bulb shell 202. That is, the shortest distance from the loading layer 122 to the bulb shell 202 is less than the shortest distance from the top layer 120 to the bulb shell 202. In some embodiments, the LED filament 100 has a bending point (or bending region) when bent, at the bending point (or bending region), the radius of curvature of the loading layer 122 is greater than the radius of curvature of the top layer 120. In some embodiments, when the LED filament 100 is bent, on a cross-section in any height direction of the LED filament 100, or on a cross-section on the central axis (or optical axis) of the LED chip 111, in comparison with the loading layer 122, the top layer 120 is closer to the central axis (or stem 206) of the LED light bulb, and the distance from the top layer 120 to the central axis (or stem 206) of the LED light bulb is less than the distance from the loading layer 122 to the central axis (or stem 206) of the LED light bulb. In some embodiments, the LED filament 100 has a bending point (or bending region) when bent, and a light-emitting surface of the LED chip 111 at a bending point (or bending region) is directed toward the central axis (or stem 206) of the LED light bulb. By the above design, when any LED filament 100 in the LED light bulb is bent, the conductive wire in the LED filament has a small bending stress and is not easy to be broken. The LED section 113 or the LED section 115 includes a first section and a second section. The first section is formed by extending upward (in the direction of the top portion of the bulb shell 202) from the electrodes 106, 108 to the bending point. The second section is formed by extending downward (in the direction of the lamp base 204) from the bending point to the conductor section 117 connecting the two LED sections 113, 115. The first section and the second section to the bulb shell 202 have a first distance and a second distance, respectively, which are opposite to each other. The first distance is less than the second distance. In the direction of the first distance, the base layer 124 of the LED filament 100 is close to the bulb shell 202, and the top layer 120 of the LED filament 100 is away from the bulb shell 202. For example, in FIG. 47, the first section of the LED section 113 to the bulb shell 202 has a first distance d1 and a second distance d2, and the first distance d1 is less than the second distance d2. In the direction of the first distance d1 the base layer 124 of the LED filament 100 is close to the bulb shell 202, and the top layer 120 of the LED filament 100 is away from the bulb shell 202. When the LED filament 100 is bent, the conductive wire in the LED filament 100 has a small bending stress and is not easy to be broken, thereby improving the production quality of the LED light bulb.

Please refer to FIGS. 46A-49. A plane F divides the bulb shell 202 into an upper portion and a lower portion. The bulb shell 202 has the largest width on the plane F. A plan view formed by the distance (maximum horizontal distance) in FIG. 47 is located on the plane F, and when there is an intersection between the stem 206 and the plane F, the bulb shell 202 has a bulb shell top portion 2021 and a bulb shell bottom portion 2022, which are opposite to each other. The bulb shell bottom portion 2022 is close to the lamp base 204. The length of the LED filament 100 located between the bulb shell top portion 2021 and the plane F (or in the height direction of the LED light bulb 200 (as shown in the Z-axis direction in FIG. 47), the distance from the highest point of the LED filament 100 to the plane F) is less than the length of the LED filament 100 located between the plane F and the bulb shell bottom portion 2022 (or in the height direction of the LED light bulb 200, the distance from the lowest point of the LED filament 100 to the plane F). Because when there is an intersection between the stem 206 and the plane F, an inner diameter of the bulb shell 202 above the stem top portion is small and the volume of the accommodated gas is small, if a large part of the LED filament 100 is located over the stem top portion, the overall cooling effect of the LED filament 100 will be affected, thereby reducing the quality of products. When there is a distance between the stem 206 and the plane F, and the distance from a stem top portion to the plane F is less than the height of the stand 2061 (the stem 206 includes a stem bottom portion 2063 and a stem top portion 2062 opposite thereto, the stem bottom portion 2063 is connected to the lamp base 204, and the stem top portion 2062 extends toward the direction of the bulb shell top portion 2021), the length of the LED filament 100 located between the stem top portion 2062 and the bulb shell top portion 2021 (or the distance between the highest point of the LED filament 100 and the stem top portion 2062) is less than the length of the LED filament 100 located between the stem top portion 2062 and the bulb shell bottom portion 2022 (or the distance between the stem top portion 2062 and the lowest point of the LED filament 100). Most of the LED filament 100 can be indirectly supported by the stem 206, so as to ensure the stability of shape of the LED filament 100 during the transportation of the LED light bulb 200. In some embodiments, when there is a distance between the stem 206 and the plane F, and the distance from the stem top portion 2062 to the plane F is greater than the height of the stand 2061, the stem 206 includes a stem bottom portion 2063 and a stem top portion 2062 opposite thereto, the stem bottom portion 2063 is connected to the lamp base 204, the stem top portion 2062 extends toward the direction of the bulb shell top portion 2021, and the length of the LED filament 100 located between the stem top portion 2062 and the bulb shell top portion 2021 is greater than the length of the LED filament 100 located between the stem top portion 2062 and the bulb shell bottom portion 2022. Since the volume of accommodated gas between the stem top portion 2062 and the bulb shell bottom portion 2022 is large, and most of the LED filament 100 is located between the stem top portion 2062 and the bulb shell bottom portion 2022, which facilitates cooling of the LED filament 100.

Please refer to FIGS. 46B and 46C, which are structural schematic views of the LED light bulb (without the shell) according to some embodiments of the disclosure. The difference between this embodiment and other embodiments of the disclosure is the buffer (member) structure, and the other structures are basically the same. The LED light bulb 500 (without the shell) includes a lamp base 204, a stem 206 connected to the lamp base 204, at least one arm 205, at least one LED filament 100 and at least one buffer member 2064. The stem 206 includes a stand 2061. Each arm 205 includes a first end and a second end, which are opposite to each other. The first end of each arm 205 is connected to the stand 2061. The second end of each arm 205 is connected the LED filament 100. The stem 206 includes a stem top portion 2062 and a stem bottom portion 2063. The stem bottom portion 2063 is connected to the lamp base 204 and is roughly located at a central position of a horizontal section (XY-section) of the lamp base 204. The stem top portion 2062 is connected to the stand 2061. The lamp base 204, the stem 206 and the stand 2061 may be coaxial (or roughly coaxial). In some embodiments of the disclosure, the buffer member 2064 may include a first buffer member 2064' and a second buffer member 2064". The buffer member 2064 has certain deformation tolerance. When shaking occurs, the buffer member 2064 uses its own deformation to absorb kinetic energy from the shakes (displacement) of other components connected thereto, so as to prevent components in the LED light bulb from being seriously pressed or collided to cause fracture or damage during the shaking.

In some embodiments of the disclosure, an end of the LED filament 100 is connected to the first buffer member 2064', and the other end of the LED filament 100 is connected to the second buffer member 2064". The first buffer member 2064' and the second buffer member 2064" are separately disposed at two ends of the LED filament 100 to form both fixed connection in physical structure (i.e., meets certain mechanic strength to not easy to separate out) and electric conductive connection. Two ends of the buffer member 2064 are separately connected to the LED filament and the stem 206. Both fixed connection in physical structure and electric conductive connection are provided between the buffer member 2064 and the stem 206. In some embodiments of the disclosure, the buffer member 2064 includes a first buffer member 2064' and a second buffer member 2064". Two ends of the first buffer member 2064' are separately connected to the stem top portion 2062 and the LED filament 100. The other end of the LED filament 100 is connected to an end of the second buffer member 2064". The other end of the second buffer member 2064" is connected to the stand 2061. In association with the arms 205, the fixation of the LED filament 100 can be implemented. The second buffer member 2064" is arranged along the horizontal (XY-plane) direction, and the first buffer member 2064' is arranged along the vertical (Z-axis) direction. In other words, the disposing direction of the second buffer member 2064" is parallel to the length direction of the stem 206, and the disposing direction of the first buffer member 2064' is perpendicular to the length direction of the stem 206. In this way and in association with the bending shape of the LED filament 100, it is ensured that both the first buffer member 2064' and the second buffer member 2064" have better deformation tolerance in the XYZ space. Of course, angles of the first buffer member 2064' and the second buffer member 2064" can also be configured depending on demands, for example, slant arrangement.

In some other embodiments of the disclosure, the lamp base 204, the stem 206 and the stand 2061 are fixed to and electrically connected to each other. Further, the buffer member 2064 is made of conductive material with the function of electric connection. The LED filament 100 and the stem 206 or the stand 2061 can be electrically connected after being connected by the conductive buffer member 2064. In some embodiments of the disclosure, the stem 206 has a conductive structure, for example, a conductive lead may be used to connect the buffer member 2064 (or the first buffer member 2064'), there is a conductive thread in the stand 2061, an end of the conductive thread is connected to the stem 206 or the lamp base 204, and the other end is connected to the second buffer member 2064". Thus, an electric circuit can be formed by at least two of the LED filament 100, the buffer member 2064, the stem 206, the stand 2061 and the lamp base 204.

In some other embodiments of the disclosure, the amount of the first buffer member 2064' is two, the amount of the second buffer member 2064" is one, and each of the first buffer member 2064' and the second buffer member 2064" is separately connected with at least one LED filament 100. As shown in FIG. 46B, in one embodiment of the disclosure, the first buffer member 2064' is connected to one LED filament 100, and the second buffer member 2064" is connected to two LED filaments 100. That is, there is at least one LED filament 100, or two, three or more LED filaments.

In some other embodiments of the disclosure, the amount of the first buffer member 2064' may be one.

In some other embodiments of the disclosure, the amount of the first buffer member 2064' may be two or more.

In some other embodiments of the disclosure, the amount of the second buffer member 2064" may be one.

In some other embodiments of the disclosure, the amount of the second buffer member 2064" may be two or more.

In some other embodiments of the disclosure, the buffer member 2064 only includes the first buffer member 2064'.

In some other embodiments of the disclosure, the buffer member 2064 only includes the second buffer member 2064".

In some embodiments of the disclosure, the buffer member 2064 may be a spring structure with better deformation ability along both the axial and radial directions, such as stretch or compression.

In some embodiments of the disclosure, the buffer member 2064 may be a plastic material with better stretch and restoration ability, such as silicone or resin, and the plastic material may be added with conductive material for electric connection.

In some embodiments of the disclosure, the buffer member 2064 may be a hanger thread structure extended from the stem 206, such as a wavy or bendingly extended hanger thread.

In some other embodiments of the disclosure, the buffer member 2064 may be a combination of hanger threads and plastic material, and the plastic material wraps at least some hanger threads.

In some other embodiments of the disclosure, the buffer member 2064 may be a combination of hanger threads and plastic material, and the plastic material wraps all the hanger threads.

In some other embodiments of the disclosure, the buffer member 2064 may be a combination of hanger threads and plastic material, and the plastic material wraps at least parts of hanger threads.

In some other embodiments of the disclosure, the buffer member 2064 may be hanger thread extended from the LED filament 100, for example, the electrodes of the LED filament 100 are directly or indirectly extended with hanger thread.

In some other embodiments of the disclosure, the buffer member 2064 may be a combination of spring and plastic material, for example, the plastic material wraps at least or partial spring, or the buffer member 2064 includes a spring section and a plastic material section, which are connected to each other.

In some other embodiments of the disclosure, the buffer member 2064 may also be disposed at other positions, for example, an end of the buffer member 2064 is directly connected to the lamp base 204, and the other end is connected to the LED filament 100.

Figure 50:
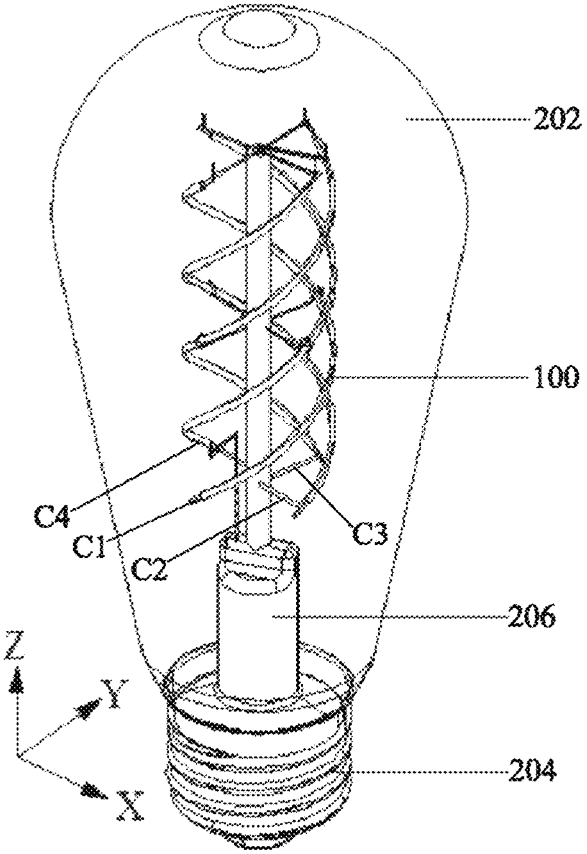
FIG. 50 is a schematic view (4) of the LED light bulb according to some embodiments of the disclosure.
Figure 51:
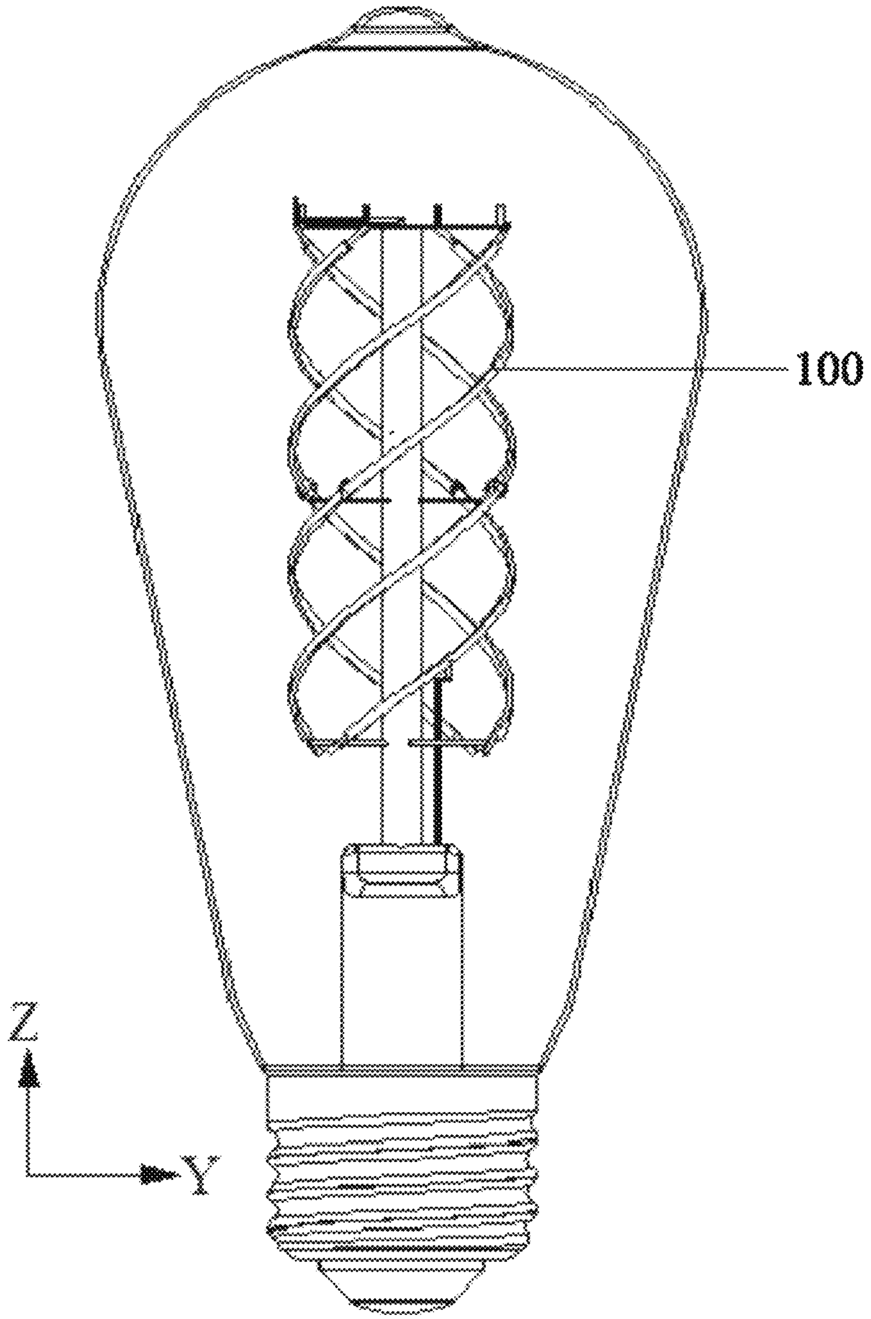
FIG. 51 is a side view of the LED light bulb in FIG. 50.
Figure 52:
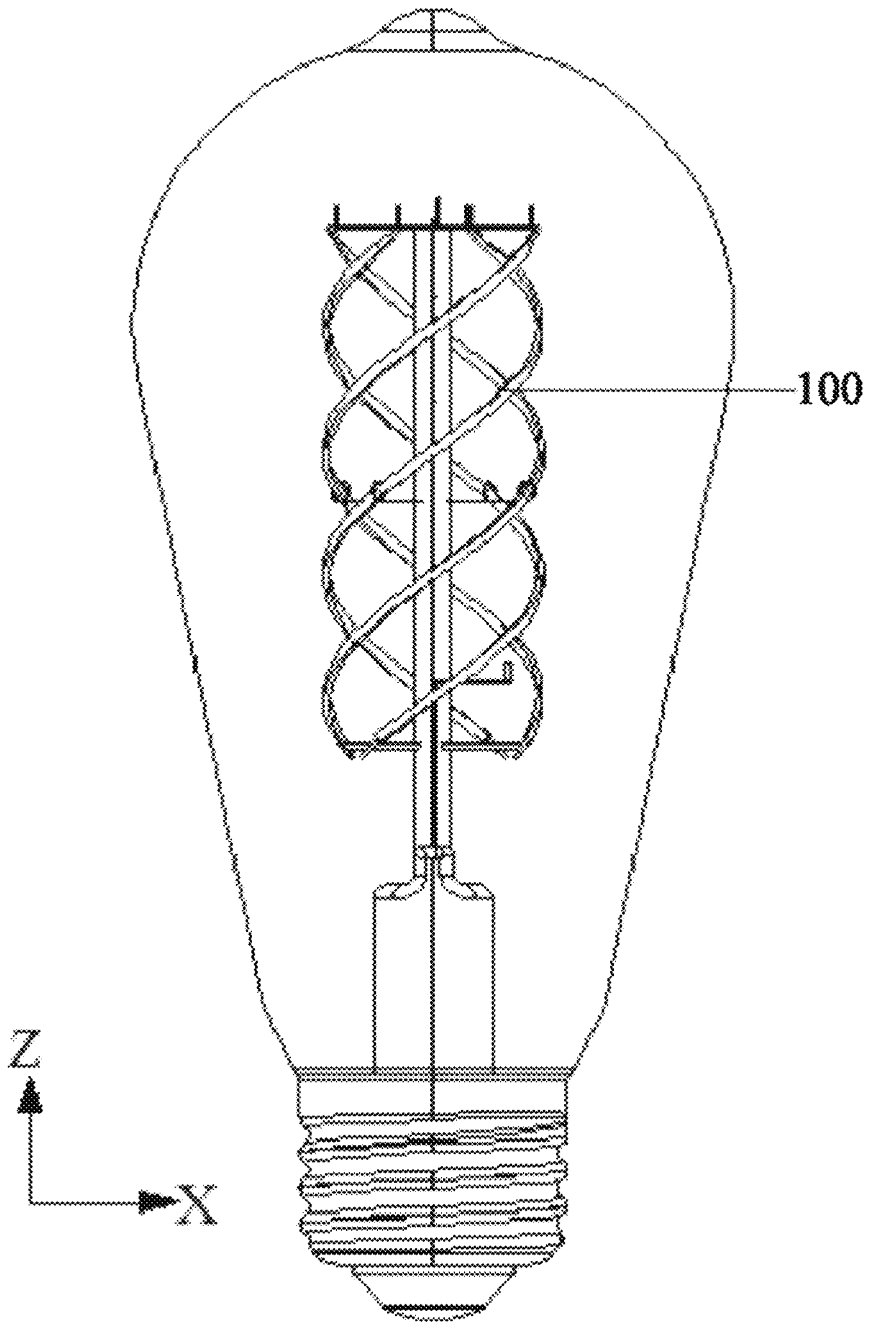
FIG. 52 is another side view of the LED light bulb in FIG. 50.
Figure 53:
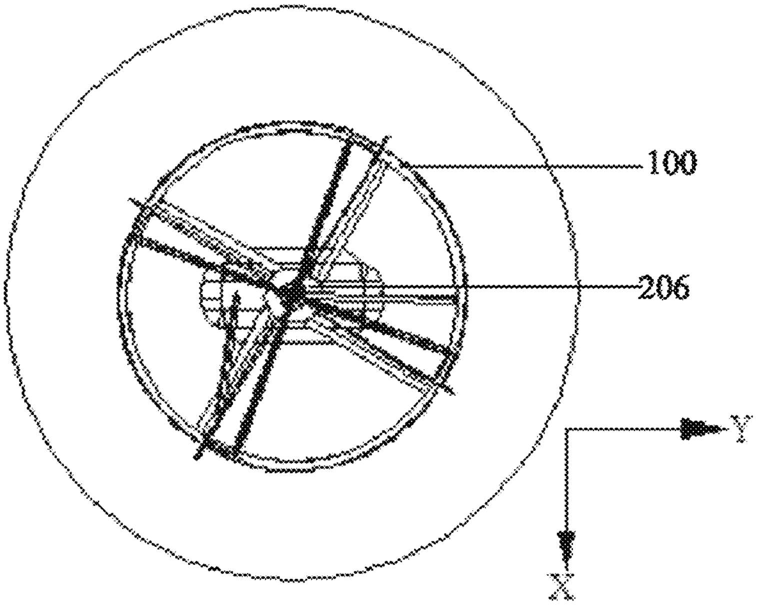
FIG. 53 is a top view of the LED light bulb in FIG. 50.

Please refer to FIGS. 50-58. FIG. 50 is a schematic view of the LED light bulb according to some embodiments of the disclosure. FIG. 51 is a side view of the LED light bulb in FIG. 50. FIG. 52 is another side view of the LED light bulb in FIG. 50. FIG. 53 is a top view of the LED light bulb in FIG. 50. In this embodiment, the LED light bulb may be any LED light bulb disclosed in the previous embodiments, and any LED filament disclosed in the previous embodiments is disposed in the LED light bulb. The power member may also be any power member disclosed in the previous embodiments. In this embodiment, the LED light bulb includes a bulb shell 202 and a lamp base 204 connected to the bulb shell 202. A plurality of LED filaments C1, C2, C3, . . . , Cn are arranged in the bulb shell 202, where n is an integer. Each LED filament C1, C2, C3 includes the aforementioned electrodes 106, 108 (not shown in this figure). The LED filament C1 serves as an example, the vertical distance between the electrodes after the LED filament C1 is bent does not exceed the height of the stem 206. In some embodiments, the LED filament C1 which is unbent yet includes a first end C11 and a second end C12 opposite thereto. The first end C11 and the second end C12 are used to connect a power member to supply power to LED chips on the LED filament C1. The length of the LED filament C1 is the distance from the first end C11 to the second end C12 (other LED filaments C2, C3 are the same). When the LED filament C1, C2, C3 are bent, both the first end and the second end of each LED filament C1, C2, C3 are separated from each other, so that each LED filament C1, C2, C3 is spatially distributed, for example, as shown in the figure, the first end C11 and the second end C12 of the LED filament C1 are separated from each other. In some embodiments, in the direction of the central axis of the LED light bulb, the vertical distance between the first end of any LED filament C1, C2, C3 and the first end of another LED filament C1, C2, C3 does not exceed 2 cm, and/or the vertical distance between the second end of any LED filament C1, C2, C3 and the second end of another LED filament C1, C2, C3 does not exceed 2 cm, so that the electrodes of the multiple LED filaments C1, C2, C3 can pass through (or roughly pass through) a first plane, and the electrodes of the multiple LED filaments C1, C2, C3 can pass through (or roughly pass through) a second plane. When the LED filaments C1, C2, C3 are electrically connected, the first ends of the multiple LED filaments C1, C2, C3 are connected together or the second ends are connected together, or the first end of a single LED filament C1, C3 or C3 is connected to the second end of another LED filament. The electrical connection is simple. The first plane is close to the bulb shell top portion 2021. The second plane is close to the bulb shell bottom portion 2022. The first plane and the second plane are separated from each other. The first plane and the second plane are parallel to each other or may also be at a certain angle to each other.

Each LED filament C1, C2, C3 is spirally shaped. Each LED filament C1, C2, C3 is separately rotationally (spirally) extended around an axis (such as the central axis of the LED light bulb). When the rotational angle of the second end of the LED filament C1, C2, C3 relative to the first end around the central axis of the LED light bulb exceeds 270 degrees and when the LED filament C1, C2, C3 is projected onto a plane along the central axis of the LED light bulb, the central angle occupied by the LED filament C1, C2, C3 on the plane is greater than 270 degrees. Preferably, the axes around which at least two LED filaments (such as LED filament C1 and LED filament C2) revolve are coincident (that is, the at least two LED filaments rotate around the same axis), or the axes around which at least two LED filaments (such as LED filament C1 and LED filament C2) revolve are parallel to each other or at a certain angle. The LED filament C1, C2, C3 extends around the axis in a smooth curve between the first end and the second end, or in a bent line between the first end and the second end. For example, the LED filament C1 extends around the axis in a smooth curve between the first end C11 and the second end C12, or in a bent line between the first end C11 and the second end C12. In some embodiments, the axis/axes around which the LED filaments C1, C2, C3 revolves/revolve is/are parallel to the stem 206, or the LED filaments C1, C2, C3 rotate and extend around the stem 206.

The distance from at least one point on the LED filament C1 to the stem 206 is the same or approximately the same as the distance from a point on the LED filament Cn ($n \neq 1$) to the stem 206. In some embodiments, in the height direction of the LED light bulb, the LED filaments C1, C2, C3, . . . , and Cn are adjacent in order, and the distance from LED filament C1 to LED filament C2 is equal to or approximately equal to the distance from LED filament Cn to LED filament Cn+1 ($n \geq 2$). On the XY-plane, the electrodes of the LED filaments C1, C2, C3 . . . and Cn are located on the circumference with the stem 206 (or the stand 2061) as the center. On the XZ-plane or the YZ-plane, the projections of the LED filaments C1, C2, C3, . . . , and Cn intersect with each other, and the projection of a single LED filament Cn intersects with the projection of the LED filament Cn+1 ($n \geq 1$). In some embodiments, on the XZ-plane or the YZ-plane, the projection of one of the LED filaments intersects with the projections of the other LED filaments. For example, the LED light bulb has four LED filaments C1, C2, C3, and C4. On the XZ-plane or the YZ-plane, the projection of the LED filament C2 intersects with the projections of the LED filament C1, LED filament C3 and LED filament C4. Certainly, in other embodiments, the projection of the LED filament C2 may intersect with the projections of at least two of LED filament C1, LED filament C3 and LED filament C4.

Figure 54:
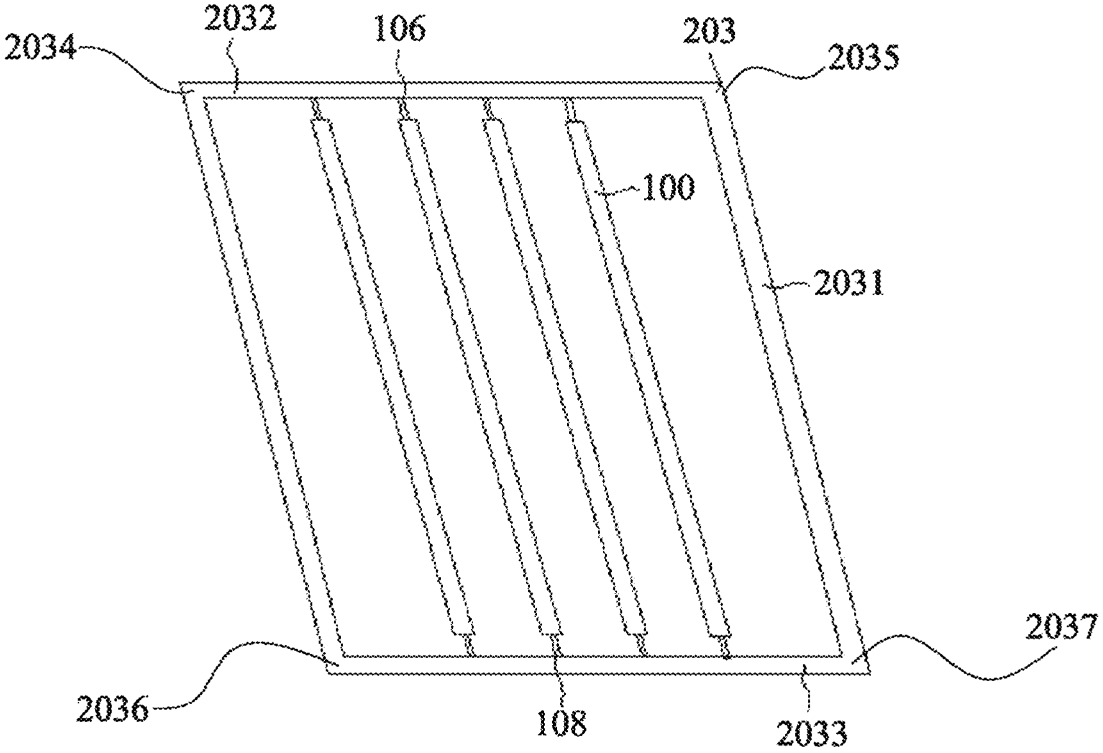
FIG. 54 is a structural schematic view (3) of the LED filament in an unbent state according to some embodiments of the disclosure.
Figure 55:
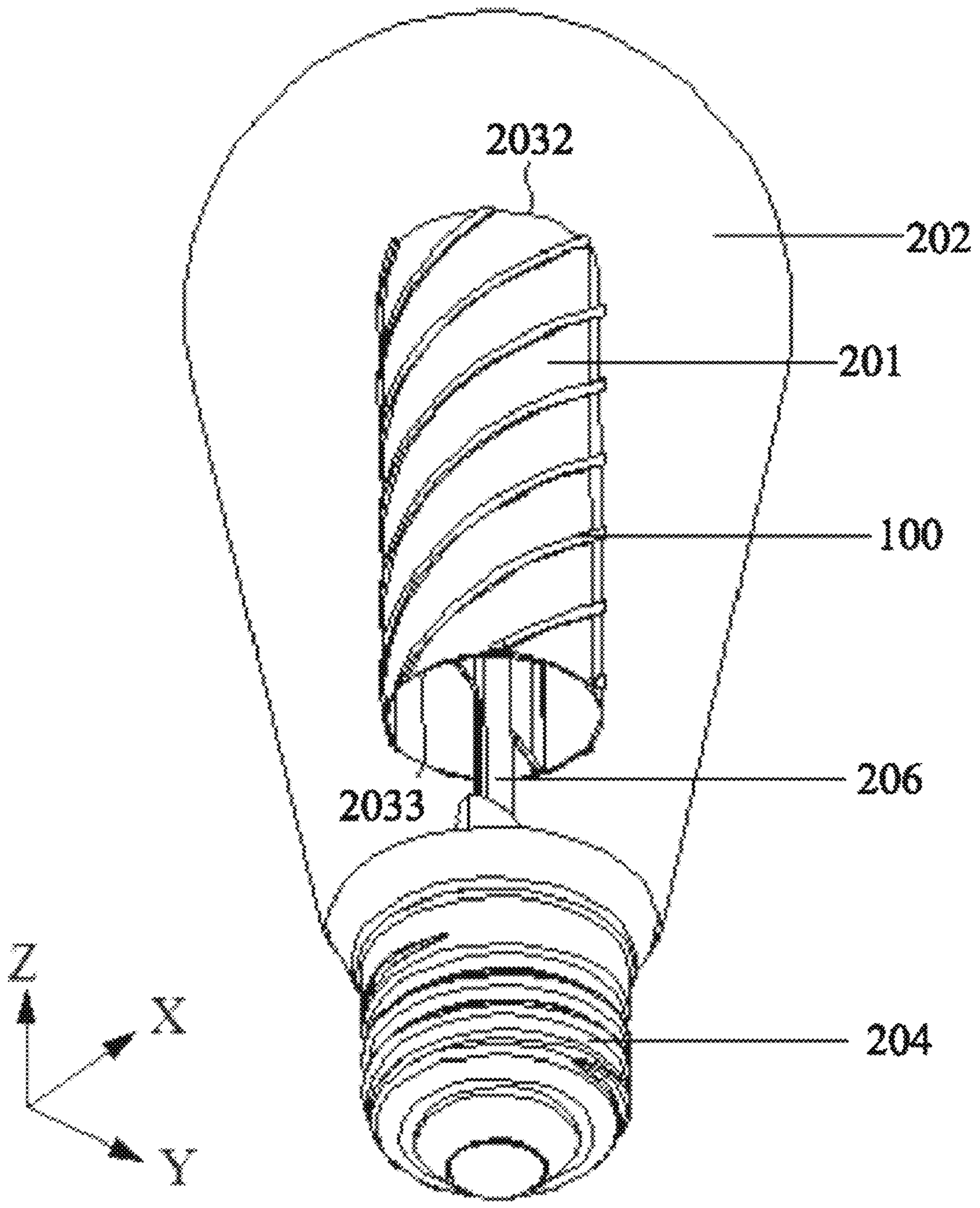
FIG. 55 is a schematic view of the LED light bulb with the LED filament in FIG. 54.
Figure 60:
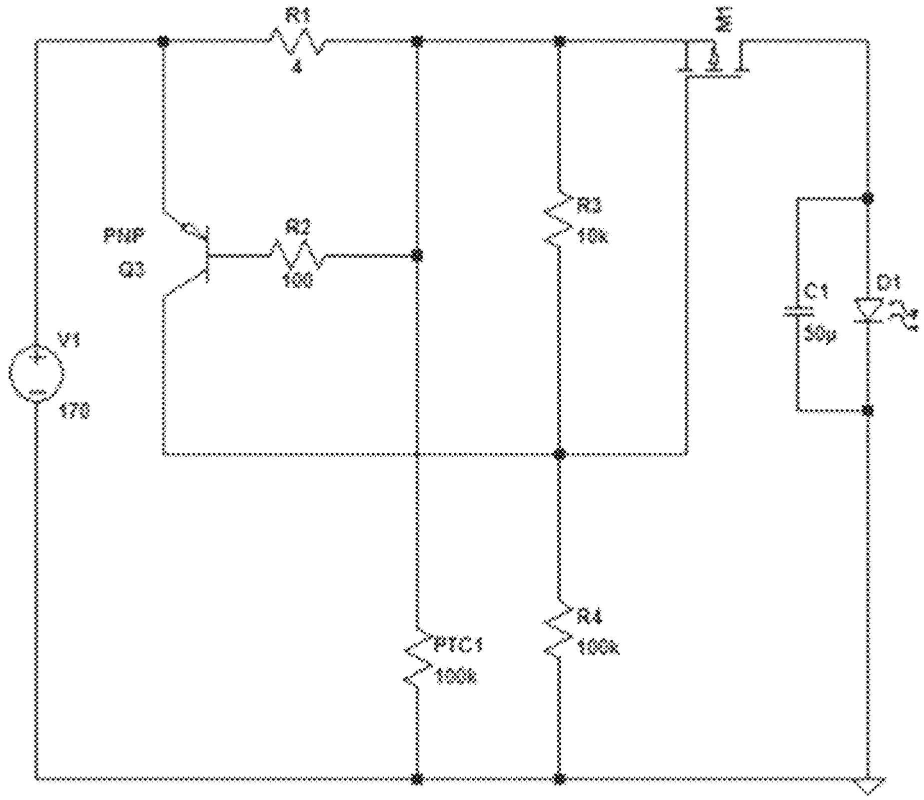
FIG. 60 is a circuit diagram of the third constant current circuit according to some embodiments of the disclosure.

Please refer to FIGS. 54 and 60. FIG. 54 is a structural schematic view of the LED filament in an unbent state according to some embodiments of the disclosure. FIG. 55 is a schematic view of the LED light bulb with the LED filament in FIG. 54. In this embodiment, the LED light bulb may be any LED light bulb disclosed in the previous embodiments, and any LED filament disclosed in the previous embodiments is disposed in the LED light bulb. The power member may also be any power member disclosed in the previous embodiments. As shown in FIGS. 54 and 55, a fixing portion 203 is disposed in the bulb shell 202, a power module (not shown in the figure) is connected to the fixing portion 203. The fixing portion 203 has a first opening 2031.

The filament body of each LED filament 100 is located in the first opening 2031. Part of the electrode 106 or 108 of each LED filament 100 is connected to the fixing portion 203 to fix the position of the LED filament 100. Specifically, the fixing portion 203 has a first connecting portion 2032 and a second connecting portion 2033 opposite thereto. The electrode 106 is connected to the first connecting portion 2032. The electrode 108 is connected to the second connecting portion 2033. The first connecting portion 2032 has a first end 2034 and a second end 2035 opposite thereto. The second connecting portion 2033 has a third end 2036 and a fourth end 2037 opposite thereto. In comparison with the second end 2035, the first end 2034 of the first connecting portion 2032 is close to the third end 2036 of the second connecting portion 2033. When the fixing portion 203 is curled, the first end 2034 of the first connecting portion 2032 approaches the second end 2035 of the first connecting portion 2032, and the third end 2036 of the second connecting portion 2033 approaches the fourth end 2037 of the second connecting portion 2033. That is, both the first connecting portion 2032 and the second connecting portion 2033 are curled toward the same direction, and the LED filament 100 is in a straight shape. In some embodiments, when the fixing portion 203 is curled, the first end 2034 of the first connecting portion 2032 approaches the second end 2035 of the first connecting portion 2032, and the fourth end 2037 of the second connecting portion 2033 approaches the third end 2036 of the second connecting portion 2033. That is, both the first connecting portion 2032 and the second connecting portion 2033 are curled toward two opposite directions, and the LED filament 100 is in a bent shape. After the fixing portion 203 is curled, the power module is separately electrically connected to the first connecting portion 2032 and the second connecting portion 2033. A carrier 201 is further disposed in the bulb shell 202. After the fixing portion 203 is curled, the LED filament 100 is attached to the carrier 201. The carrier 201 is made of a material with a light transmittance more than 70%. The carrier 201 may be made of glass so as to reduce the absorption of the light emitted by the LED filament 100 by the carrier 201. In other embodiments, the carrier 201 may be cylindrical, and the LED filament 100 is fixed on the carrier 201 by gluing or the like.

Figure 56:
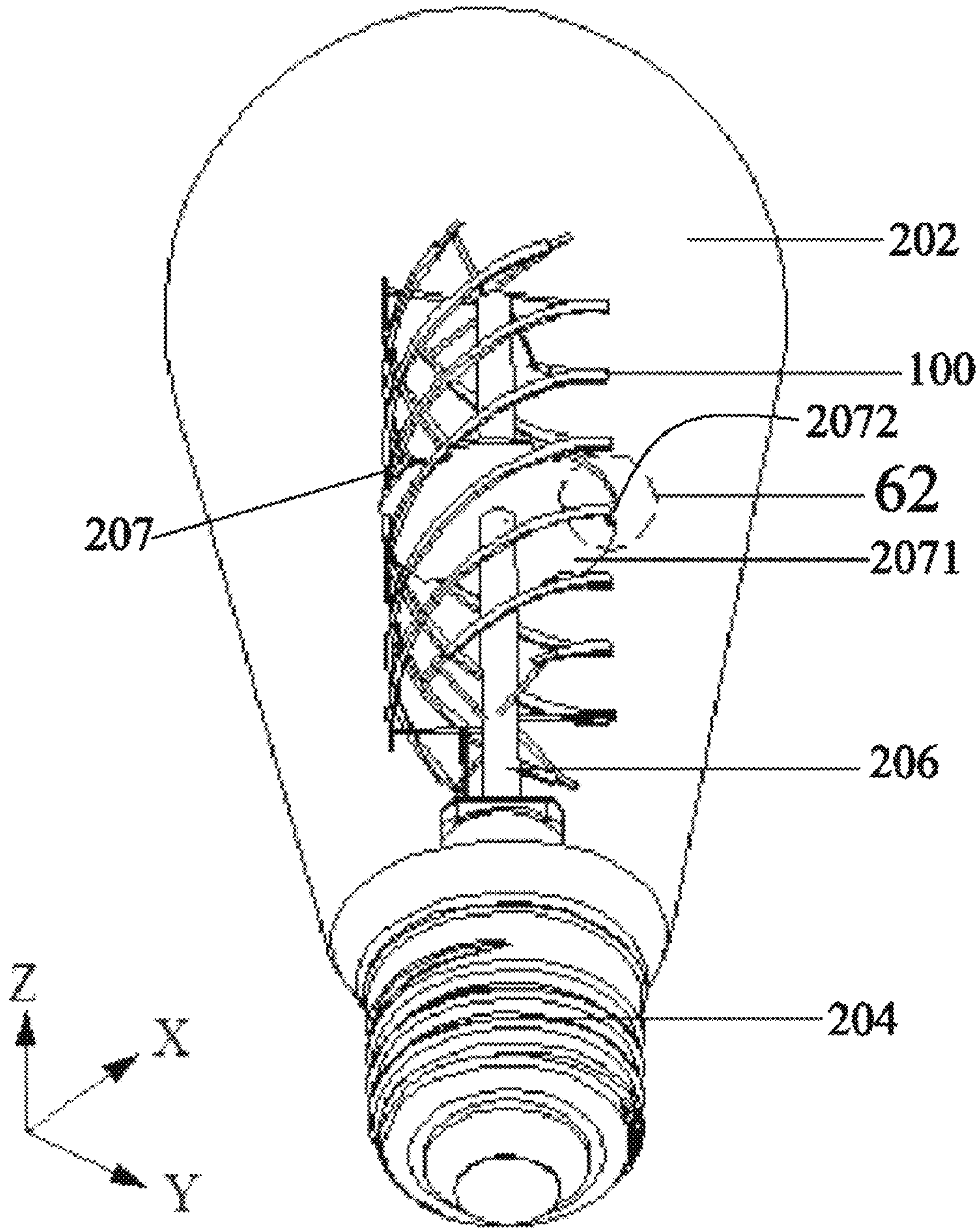
FIG. 56 is a schematic view (5) of the LED light bulb in some embodiments of the disclosure.
Figure 57:
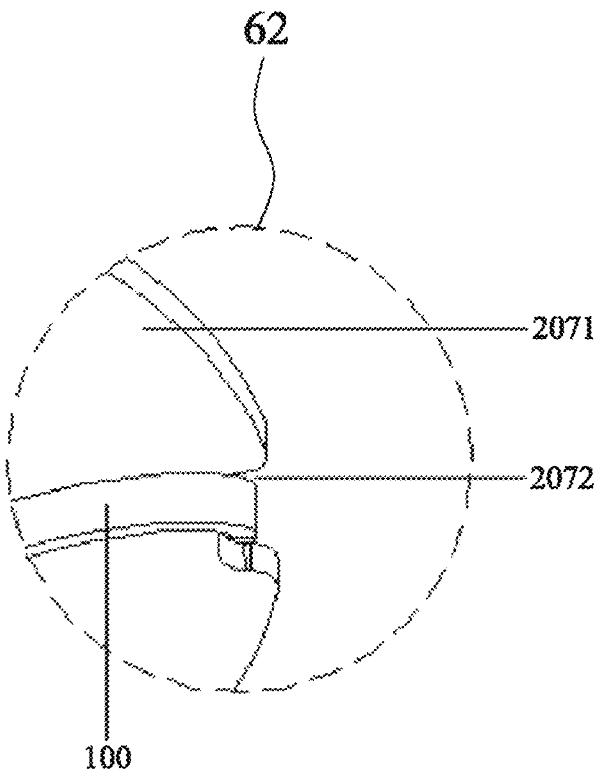
FIG. 57 is an enlarged schematic view of part 62 in FIG. 56.

Please refer to FIGS. 56-57. FIG. 56 is a schematic view (5) of the LED light bulb in some embodiments of the disclosure. FIG. 57 is a partially enlarged schematic view of part 62 in FIG. 56. In this embodiment, the LED light bulb may be any LED light bulb disclosed in the previous embodiments, and any LED filament disclosed in the previous embodiments is disposed in the LED light bulb. The power member may also be any power member disclosed in the previous embodiments. As shown in FIGS. 56-57, a support unit 207 is disposed on the stem 206. The support unit 207 is perpendicular to the stem 206 (or the central axis of the LED light bulb). The support unit 207 extends toward the top portion of the bulb shell 202 along the central axis of the LED light bulb. A plurality of support portions 2071 are disposed on the support unit 207. A second opening 2072 is provided on the support portion 2071. The height of the LED filament 100 is less than the width of the LED filament 100. The LED filament 100 may be inclined to enter the support portion 2071 through the second opening 2072 first. Since the minimum distance of the second opening 2072 is greater than the width of the LED filament 100, the LED filament 100 can be prevented from escaping from the support portion 2071, thereby fixing the shape of the LED filament 100.

Figure 58:
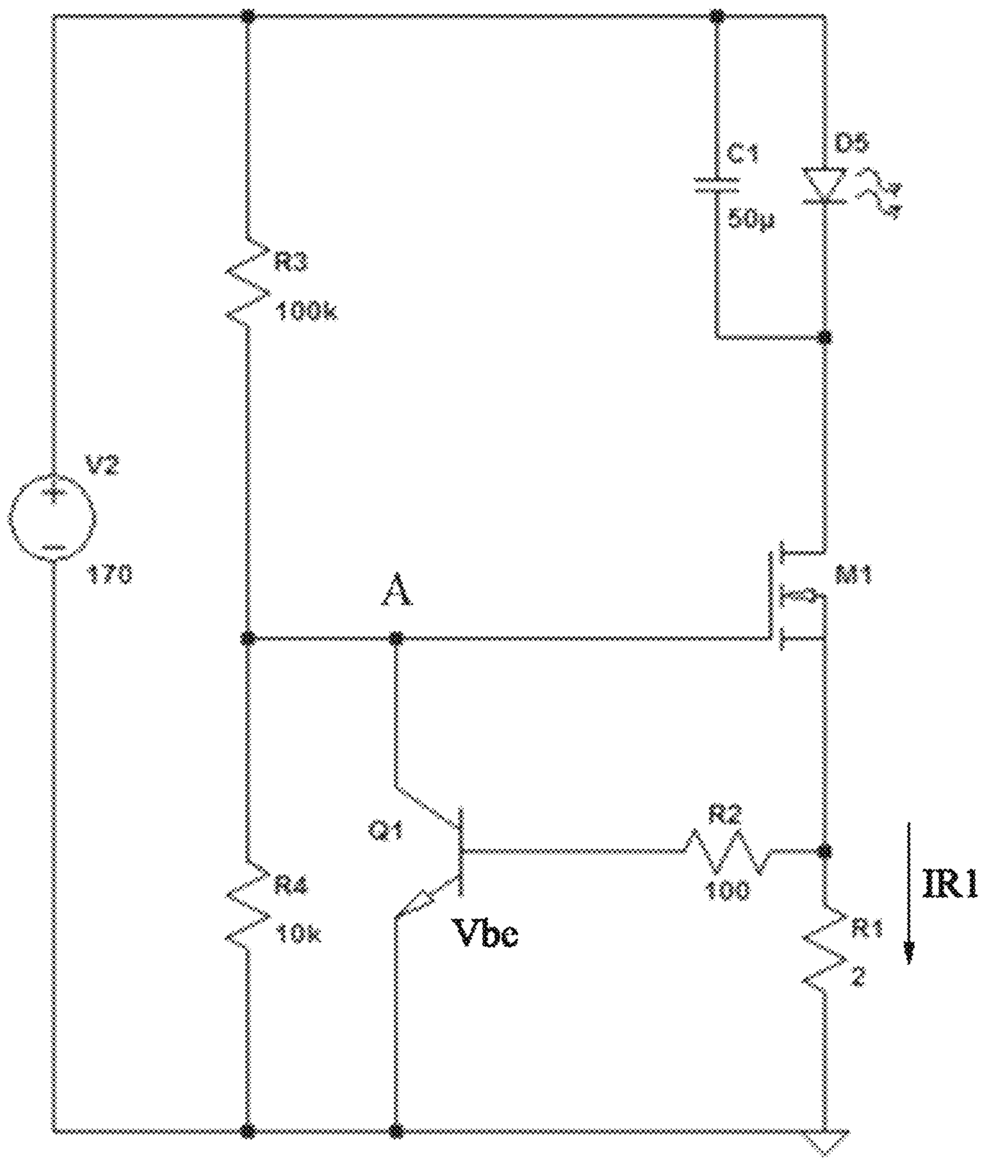
FIG. 58 is a circuit diagram of the first constant current circuit according to some embodiments of the disclosure.
Figure 59:
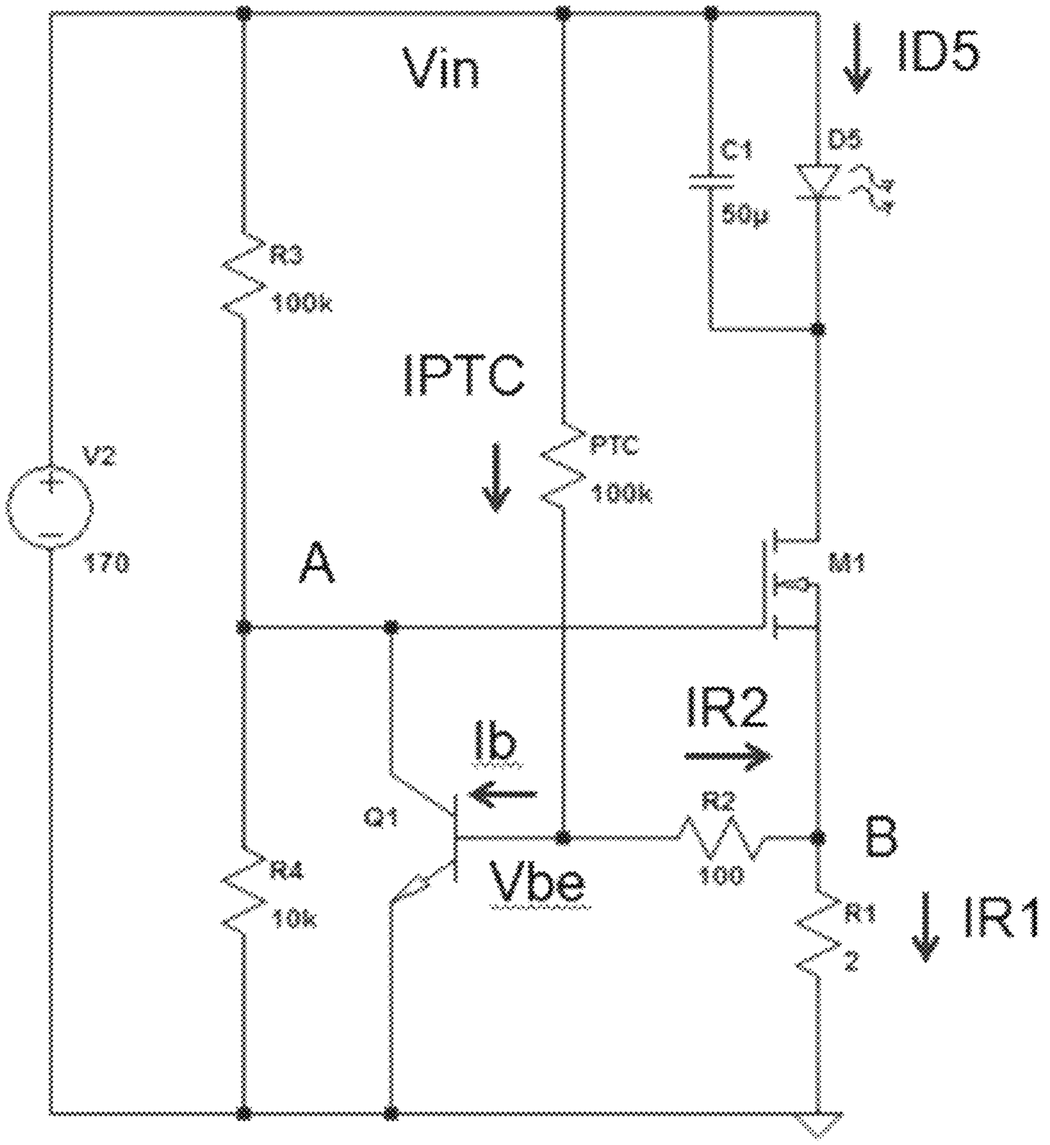
FIG. 59 is a circuit diagram of the second constant current circuit according to some embodiments of the disclosure.
Figure 61:
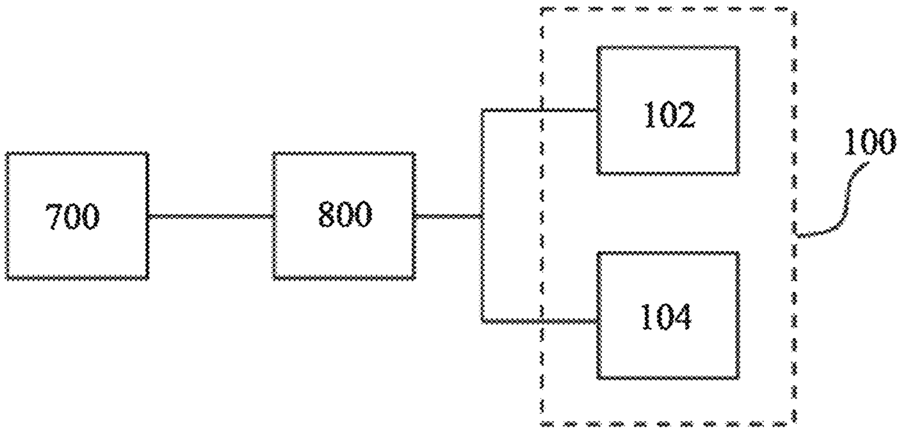
FIG. 61 is a circuit block diagram of the LED light bulb according to some embodiments of the disclosure.

Please refer to FIGS. 58-61. FIG. 58 is a circuit diagram of a first constant current circuit according to some embodiments of the disclosure. FIG. 59 is a circuit diagram of a second constant current circuit according to some embodiments of the disclosure. FIG. 60 is a circuit diagram of a third constant current circuit according to some embodiments of the disclosure. FIG. 61 is a circuit block diagram of the LED light bulb according to some embodiments of the disclosure. According to the general practice of circuit diagrams, the optional parameters of each component are marked in the figures, and the units use international standard measurement units. In the following description, for brevity, a first resistor R1 is denoted as R1, and other elements are similar. In addition, in this embodiment, the LED light bulb can be any LED light bulb disclosed in the previous embodiments, and any LED filament disclosed in the previous embodiments is disposed in the LED light bulb.

According to the circuit shown in FIG. 58, after power-on, the voltage at point A is a divided voltage of R4 on both R3 and R4, so the current between the drain and source of the main switching element M1 (hereinafter denoted as M1) rises, making Vbe large enough to turn on the secondary switching element Q1 (hereinafter denoted as Q1) and pull down the voltage at point A, and causing the current between the drain and source of M1 to be pulled down. R1 is small, so Vbe cannot reach the turn-on voltage of Q1, and then Q1 turns off. When Q1 turns off, the voltage at point A returns to the voltage divided by R4 on R3 and R4, so that the current between the drain and source of M1 rises again, and then the above process is repeated. Finally, M1 stays to turn on and the current IR1 through R1 stays approximately equal to the ratio of Vbe to R1. It can be seen that the constant current through the load D5 is achieved in this way.

The circuit structure shown in FIG. 59 is basically the same as that of FIG. 58. The difference is that a resistor PTC (hereinafter denoted as PTC) is included in FIG. 59, which may be a positive temperature coefficient thermistor. Voltages at some points and currents through some branches are marked in the FIG. 59. The current through PTC is IPTC=(Vin−Vbe)/PTC. The base current of Q1 is almost zero, so the current through PTC is IPTC=IR2. And IR2=(Vbe−VB)/R2, where VB stands for the voltage at point B. Therefore, (Vin−Vbe)/RPTC=(Vbe−VB)/R2, where PTC stands for the resistance of the PTC resistor. According to the transformation of this formula, VB=Vbe−(Vin−Vbe)×R2/RPTC. It can be obtained from FIG. 59 that VB=ID5×R1, so ID5×R1=Vbe−(Vin−Vbe) R2/RPTC, and then formula 1 is obtained as follows:

$$ID5 = Vbe/R1 - [(Vin - Vbe) \times R2]/(PTC \times R1)$$

It can be seen from the formula 1 that the load current ID5 is also affected by the resistance of PTC. Due to the physical properties of a transistor, the base voltage Vbe will decrease when the temperature rises. It can be seen from the formula 1 that the reduction of Vbe will reduce ID5, that is, the load current will decrease, which will affect the lighting of the LED light bulb (or a lamp using it). On the other hand, RPTC will increase when the temperature rises. It can be seen from the formula 1 that ID5 also increases when RPTC increases, which helps to offset the fluctuation of load current caused by the decrease of Vbe.

According to the formula 1, if the PTC resistor is replaced with a negative temperature coefficient thermistor, ID5 will increase when the temperature decreases, that is, the low temperature protection function of the LED light bulb (or a lamp using it) is realized. In addition, it can be seen from the formula 1 that the resistor R1 directly affects ID5, that is, R1 directly affects the brightness of the LED light bulb. Therefore, when the source voltage stays unchanged, the setting of the load current can be realized by selecting the value of R1.

According to the circuits shown in FIGS. 58 and 59, M1 serves as a main switching element (such as a metal oxide semiconductor field effect transistor), and its current is affected by the negative feedback loop composed of R1, R2 and Q. Q1 serves as a secondary switching element, which is turned on or off by the action of the M1 current, and finally the turn-on-current of M1 can be maintained at a fixed level, thereby realizing a constant current circuit for the load. FIGS. 58 and 59 are only used as examples, and there can be other circuit topologies.

According to the circuit shown in FIG. 60, when a resistor PTC1 (hereinafter denoted as PTC1, where PTC1 may also be an NTC resistor) is preferably added, similar to the previous analysis, after power-on, the turn-on-current of M1 rises, so that Q3 is turned on. The turning-on of Q3 further reduces the turn-on-current of M1, which also forms the negative feedback similar to that in FIGS. 58 and 59, so that M1 maintains a constant turn-on-current state, and then the current flowing through the load D1 keeps constant.

In some embodiments, M1 and Q1 may also adopt other types of switching devices. In addition to using a DC voltage source, the power supply may also be a rectifier circuit, which can convert an external AC input (usually mains power) into DC power. In addition, a fourth resistor R4 may be connected to a capacitor in parallel, so that the voltage at point A increases gradually after power-on, so as to realize the function of delayed booting.

In some embodiments, the main switching element and the negative feedback circuit are used to realize that the current flowing through the main switching element is a constant value, thereby realizing a constant current circuit. In this way, the constant current circuit can be realized by using fewer discrete components, and the problem of electromagnetic compatibility is not involved. In the specific circuit structure, PTC or NTC may also be used to improve the temperature drift phenomenon. When the constant current circuit is applied to a lamp, the occupied volume is small and the light emission is stable.

In some embodiments, as shown in FIG. 61, the LED light bulb includes a constant-current driving circuit 700, a shunt circuit 800, and an LED filament 100. The constant-current driving circuit 700 is a constant current source for providing a constant current. The LED filament 100 includes LED chip units 102, 104. The LED chip units 102, 104 are electrically connected to the shunt circuit 800. The shunt circuit 800 is used to receive the constant current from the constant-current driving circuit 700 and distribute the current to the LED chip unit 102 and the LED chip unit 104. In this embodiment, the LED chip units 102, 104 may be a single LED chip or multiple LED chips connected in series as aforementioned.

In some embodiments, the LED chip unit 102 and the LED chip unit 104 are configured with different color temperatures. The brightness of the LED chip unit 102 and the LED chip unit 104 can be adjusted by adjusting the currents flowing through the LED chip unit 102 and the LED chip unit 104. The color temperature can be regulated by adjusting the brightness ratio of the LED chip unit 102 to the LED chip unit 104.

In some embodiments, the LED chip unit 102 and the LED chip unit 104 are configured with different colors.

In some embodiments, the LED chip unit 102 and the LED chip unit 104 include different amounts of light emitting diodes.

Through the configuration of the above embodiment, only one constant-current driving circuit is required to realize the control of at least two paths of LED elements, so as to realize the function of adjusting color temperature or color. Especially when the LED chip units include different amounts of light emitting diodes, the regulation of currents of the different LED chip units can still be achieved.

Figure 62:
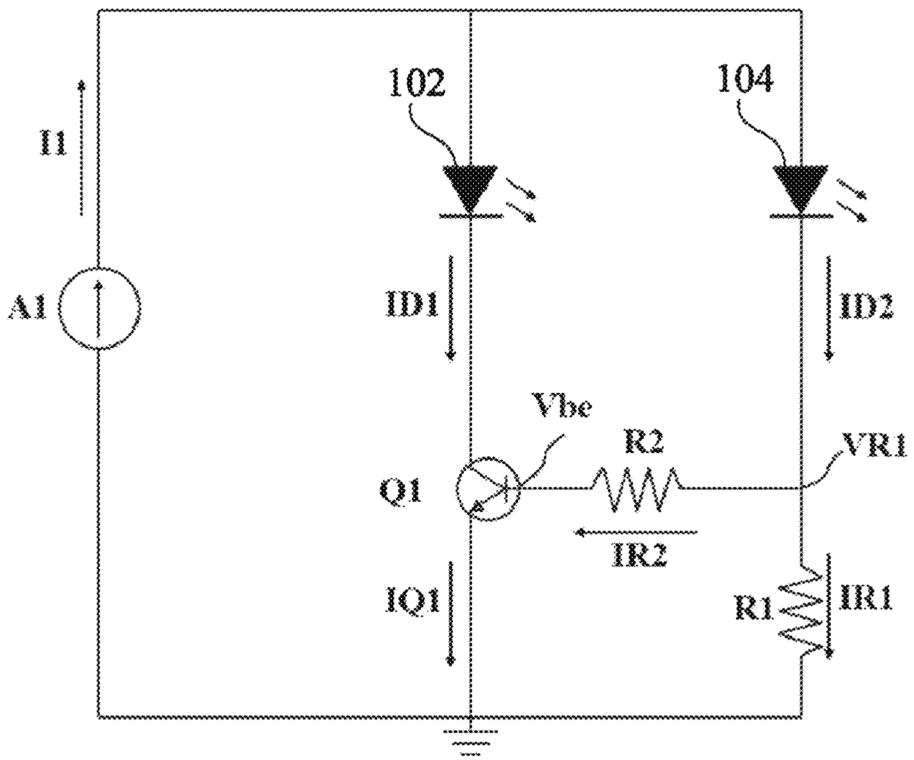
FIG. 62 is a schematic view (1) of the circuit structure of the LED light bulb according to some embodiments of the disclosure.

A cathode of the LED chip unit 102 is electrically connected to a collector of Q1. An emitter of Q1 is electrically connected to a common ground end. A base of Q1 is electrically connected to a first pin of R2. A second pin of R2 is electrically connected to a first pin of R1 and a cathode of the LED chip unit 104. A second pin of R1 is electrically connected to the common ground end. A second output end of the constant current source A1 is electrically connected to the common ground end. Refer to FIG. 62, which is a schematic circuit structure view of the LED light bulb according to some embodiments of the disclosure. In this embodiment, the LED light bulb may be any LED light bulb disclosed in the previous embodiments, and any LED filament disclosed in the previous embodiments is disposed in the LED light bulb. In this embodiment, the circuit of the LED light bulb includes LED chip units 102, 104. The constant-current driving circuit 700 includes a constant current source A1. The shunt circuit 800 includes Q1, R1 and R2. An anode of the LED chip unit 102 is electrically connected to an anode of the LED chip unit 104 and is further electrically connected to a first output end of the constant current source A1.

In this embodiment, each of the LED chip unit 102 and the ELD chip unit 104 includes a light emitting diode or a plurality of light emitting diodes connected in series (that is, the LED chips 111 in the aforementioned embodiments).

The operation principle of the shunt circuit 800 is described below. In this embodiment, the constant current source A1 provides a constant current I1. After being shunted by the shunt circuit 800, the current flowing through the LED chip unit 102 is ID1, and the current flowing through the LED chip unit 104 is ID2. The current flowing through the resistor R1 is IR1, and the current flowing through the resistor R2 is IR2. The base voltage of Q1 is Vbe, and the emitter current of Q1 is IQ1. The currents satisfy the following relationships:

$$I1 = ID1 + ID2$$

$$ID2 = IR1 + IR2$$

$$IQ1 = ID1 + IR2$$

In this embodiment, the current of IR2 is small enough to be omitted, so $$ID2 \approx IR1$$

$$IQ1 \approx ID1$$

$$IR1 \approx Vbe/R1$$

When ID2 has an increasing trend, VR1 increases, IR2 also increases. According to the amplification principle of transistor, ID1 increases, ID1 and ID2 are added up to a constant value I1, so when ID1 increases, ID2 decreases. Therefore, when ID2 has an increasing trend, the increasing trend of ID2 is suppressed through the regulation by the shunt circuit 800, so that ID2 tends to be a stable value. Similarly, when ID2 has a decreasing trend, VR1 decreases, and IR2 decreases. According to the amplification principle of transistor, ID1 decreases, ID1+ID2=I1, so when ID1 decreases, ID2 increases. Therefore, when ID2 has a decreasing trend, the decrease of ID2 is suppressed through the regulation by the shunt circuit 800, so that ID2 tends to be a stable value.

$$ID2 \approx Vbe/R1$$

$$ID1 = I1 - ID2$$

In this embodiment, Vbe is a constant value about 0.7V. By adjusting the resistor R1, the current ID1 and the current ID2 can be regulated, so as to achieve the purpose of adjusting the brightness of the LED chip units 102 and 104.

In some embodiments, the amount of the LED chips included in the LED chip unit 102 is less than or equal to the amount of LED chips included in the LED chip unit 104.

In some embodiments, the LED chip units 102, 104 are configured with different colors or color temperatures.

In some embodiments, the secondary switching element Q1 may be replaced with a field effect transistor, which does not affect the technical effect to be achieved by this disclosure.

Figure 63:
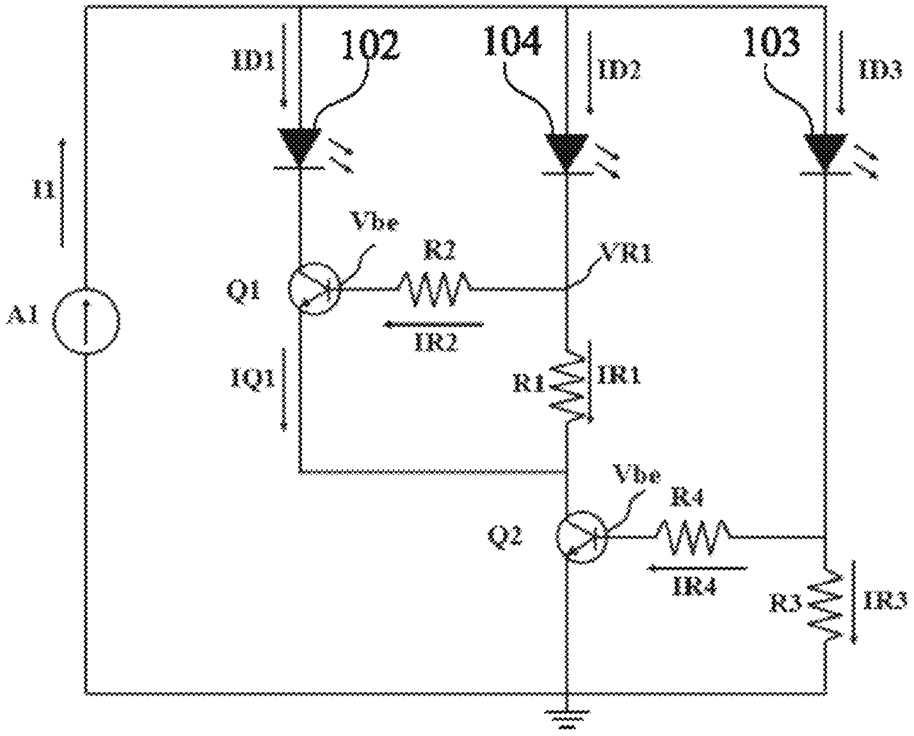
FIG. 63 is a schematic view (2) of the circuit structure of the LED light bulb according to some embodiments of the disclosure.

Please refer to FIG. 63, which is a schematic circuit structure view of the LED light bulb according to some embodiments of the disclosure. In this embodiment, the LED light bulb may be any LED light bulb disclosed in the previous embodiments, and any LED filament disclosed in the previous embodiments is disposed in the LED light bulb. In addition, the circuit structure of the LED lamp in this embodiment is similar to the embodiment in FIG. 62. The difference is that the circuit of the LED light bulb in this embodiment further includes an LED chip unit 103, wherein the current flowing through the LED chip unit 103 is ID3. The shunt circuit 700 further includes a transistor Q2 and resistors R3 and R4. The anode of the LED chip unit 102 is electrically connected to the anode of the LED chip unit 104 and an anode of the LED chip unit 103, and is further electrically connected to the first output end of the constant current source A1. The cathode of the LED chip unit 102 is electrically connected to the collector of Q1. The emitter of Q1 is electrically connected to the second pin of the resistor R1, and the base of Q1 is electrically connected to the first pin of the resistor R2. The second pin of the resistor R2 is electrically connected to both the cathode of the LED chip unit 104 and the first pin of the resistor R1. A collector of Q2 is electrically connected to the second pin of the resistor R1, an emitter of Q2 is electrically connected to the common ground end, and a base of Q2 is electrically connected to a first pin of the resistor R4. The second pin of the resistor R4 is electrically connected to both the cathode of the LED chip unit 103 and the first pin of the resistor R3. A second pin of the resistor R3 is electrically connected to the common ground end. The second output end of the constant current source A1 is electrically connected to the common ground end.

The principle of regulation to the currents in the three paths of LED chip units 102, 103, 104 by the shunt circuit in this embodiment is similar to the embodiment in FIG. 62. The currents in this embodiment satisfy the following relationships:

$$I1 = ID1 + ID2 + ID3$$

$$ID3 \approx IR3$$

$$ID2 \approx IR1$$

$$ID1 \approx IQ1$$

In this embodiment, both IR2 and IR4 may be omitted. Therefore, $$ID3 \approx Vbe/R3$$

$$ID2 \approx Vbe/R1$$

$$ID1 = I1 - ID2 - ID3$$

In this embodiment, Vbe is a constant value about 0.7V. By adjusting the resistance values of the resistors R1 and R3, the currents ID2, ID3 and ID1 can be regulated, so as to regulate the brightness of the LED chip units 102, 103, 104.

In this embodiment, the amount of diodes included in the LED chip unit 102 is less than or equal to the amount of light emitting diodes included in the LED chip unit 104. The amount of light emitting diodes included in the LED chip unit 104 is less than or equal to the amount of light emitting diodes included in the LED chip unit 103.

In some embodiments, the LED chip units 102, 103, 104 are configured with different colors or color temperatures.

In some embodiments, Q1 and Q2 may be replaced with field effect transistors, which does not affect the technical effect to be achieved by this disclosure.

By the configuration of the above embodiment, only one constant-current driving circuit is required to realize the control of three paths of LED chip units, so as to realize the function of adjusting color temperature or color. Especially when the LED chip units include different amounts of LED chips, the current regulation of different LED chip units can still be achieved.

Figure 64:
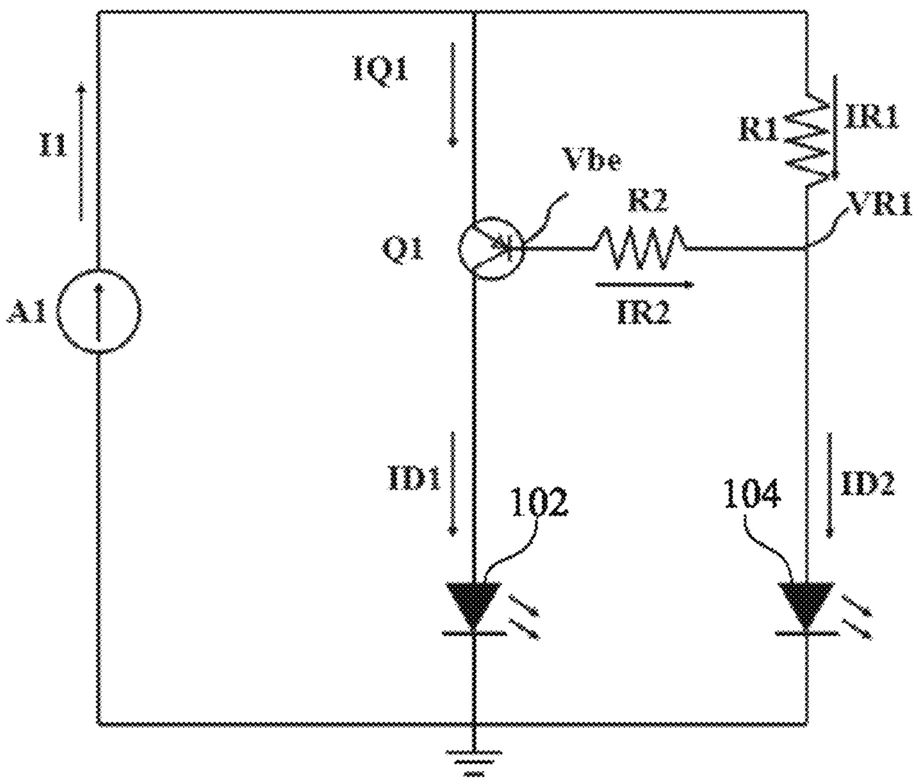
FIG. 64 is a schematic view (3) of the circuit structure of the LED light bulb according to some embodiments of the disclosure.

Please refer to FIG. 64. FIG. 64 is a schematic circuit structure view of the LED light bulb according to some embodiments of the disclosure. The circuit structure of the LED light bulb in this embodiment is similar to the embodiment in FIG. 62. The difference is that the transistor used for the shunt circuit 800 in this embodiment is a PNP transistor, while the transistor used in the embodiment in FIG. 62 is an NPN transistor. In this embodiment, the constant-current driving circuit 700 includes a constant current source A1, the LED filament 100 includes LED chip units 102 and 104, and the shunt circuit 700 includes Q1, R1 and R2. The emitter of Q1 is electrically connected to both the first pin of R1 and the first output end of the constant current source A1. The collector of Q1 is electrically connected to the anode of the LED chip unit 102, and the base of Q1 is electrically connected to the first pin of R2. The second pin of R2 is electrically connected to both the second pin of R1 and the anode of the LED chip unit 104. The cathode of the LED chip unit 102 and the cathode of the LED chip unit 104 are electrically connected to each other and jointly electrically connected to the common ground end. A second output end of the constant current source A1 is electrically connected to the common ground end.

The operation principle of the shunt circuit 800 in this embodiment is similar to the embodiments in FIGS. 62 and 63. Details are not described herein again. In this embodiment, the current IR2 is small enough to be omitted. The currents satisfy the following relationships:

$$ID2 \approx Vbe/R1$$

$$ID1 = I1 - ID2$$

By adjusting the resistor R1, the currents ID1 and ID2 can be regulated, so as to regulate the brightness of the LED chip units 102 and 104

In some embodiments, the amount of light emitting diodes included in the LED chip unit 102 is less than or equal to the amount of light emitting diodes included in the LED chip unit 104.

In some embodiments, the LED chip units 102, 104 are configured with different colors or color temperatures, at the same time, LED filaments can achieve functions of dimming and color adjustment.

In some embodiments, Q1 may be replaced with a field effect transistor, which does not affect the technical effect to be achieved by this disclosure.

By the configuration of the above embodiment, only one constant-current driving circuit is required to realize the control of two paths of LED chip units, so as to realize the function of adjusting color temperature or color. Especially when the LED chip units include different amounts of light emitting diodes, the current regulation of different LED chip units can still be achieved.

By the description of the above embodiments, a person skilled in the art may properly carry out the shunt regulation of multiple paths of LED chip units, not limited to two paths or three paths.

The term "an LED filament" in this disclosure is formed by connecting the abovementioned conductor sections and the LED sections or is only formed by the LED sections (or LED chip units), which has the same and continuous light conversion layer (including the same and continuously formed top layer or bottom layer), and only provides two electrodes electrically connected to the conductive brackets of the light bulb at two ends. Anyone that meets the abovementioned structural description is the single LED filament structure mentioned in this disclosure.

This disclosure has been disclosed above with preferred embodiments. However, those skilled in the art should understand that these embodiments are only used to describe some implementations in this disclosure, and should not be construed as a limitation. It should be noted that all changes and substitutions equivalent to these embodiments or reasonable combinations between these embodiments (especially the aforementioned embodiments of LED filament are combined with the aforementioned embodiments of LED light bulb) should fall within the scope supported by the specification of this disclosure. Therefore, the protection scope of this disclosure shall be subject to the appended claims.

What is claimed is:

1. An LED light bulb, comprising:

a bulb shell having a central axis;

a lamp base connected to the bulb shell and substantially being coaxial with the bulb shell;

a stem comprising a stand having two ends, disposed in the bulb shell along the central axis of the bulb shell;

at least one first buffer member disposed in the bulb shell and connected to a first end of the stand;

a second buffer member disposed in the bulb shell and connected to a second end of the stand;

a driving circuit disposed in the lamp base and electrically connected to the first buffer member, the second buffer member and the lamp base; and at least one flexible LED filament being bent in a space curved shape in the bulb shell and electrically connected to the first buffer member and the second buffer member, the flexible LED filament comprising:

a base layer;

a plurality of LED chips disposed on the base layer and electrically connecting in series by first wires;

two electrodes disposed on the base layer and respectively at two ends of the base layer, the two electrodes electrically connecting the plurality of LED chips by two second wires, the two electrodes electrically connected to the first buffer member and the second buffer member respectively;

a top layer covering the plurality of LED chips, the first wires, the second wires and a portion of each of the two electrodes; and a layer body comprising a chromogenic particles and covering the top layer, wherein the flexible LED filament being bent in a space curved shape in the bulb shell around the central axis of the bulb shell and extends along the axial direction of the central axis, wherein at any point of the flexible LED filament the top layer is closer to the central axis of the bulb shell than the base layer.

2. The LED light bulb of claim 1, wherein the stand extends along the central axis of the bulb shell, the second buffer member connects to the second end of the stand and extends along the central axis of the bulb shell.

3. The LED light bulb of claim 2, wherein the LED light bulb further comprises at least one arm disposed in the bulb shell, an end of the arm connects to the stand and another end of the arm connects to the LED filament.

4. The LED light bulb of claim 3, wherein each one of the plurality of LED chips comprises a light-emitting surface being directed toward the central axis of the LED light bulb.

5. The LED light bulb of claim 3, wherein the layer body completely covers the top layer.

6. The LED light bulb of claim 3, wherein the layer body covers a portion of the two electrodes.

7. The LED light bulb of claim 6, wherein the stand comprises two ends, an end of the stand connects to the stem and the another end is a floating end in the bulb shell, the second buffer member connects to the floating end of the stand and be disposed along the central axis of the bulb shell.

8. The LED light bulb of claim 7, wherein the LED light bulb comprises two first buffer members, one second buffer member, a first flexible LED filament and a second flexible LED filament, the first flexible LED filament electrically connects between one of the first buffer member and the second buffer member, the second flexible LED filament electrically connects between another one of the first buffer member and the second buffer member.

9. The LED light bulb of claim 8, wherein the first and second flexible LED filaments being bent in a space curved shape in the bulb shell around the central axis of the bulb shell and extends along the axial direction of the central axis.

10. The LED light bulb of claim 9, wherein at any point of any one of the first and second flexible LED filaments the top layer is closer to the central axis of the bulb shell than the base layer.

11. The LED light bulb of claim 8, wherein the driving circuit comprises a constant-current driving circuit and a shunt circuit, the shunt circuit electrically connects to the constant-current driving circuit and the first and second flexible LED filaments electrically connects to the shunt circuit.

12. The LED light bulb of claim 11, wherein the first flexible LED filament comprises a plurality of first LED chips and the second flexible LED filament comprises a plurality of second LED chips, the shunt circuit receives the constant current from the constant-current driving circuit and distributes the current to the plurality of first LED chips and the plurality of second LED chips.

13. The LED light bulb of claim 7, wherein the layer body appears white or gray when the LED filament is in an unlit status.

14. The LED light bulb of claim 13, wherein when the LED filament is in an unlit status, the layer body under an RGB standard, a color value of the layer body is within a range of R(235-255), G(235-255) and B(235-255), and an absolute value of a difference between any two of R, G and B is less than or equal to a less one of the three or 10% of a greater one of the three.

15. The LED light bulb of claim 13, wherein when the LED filament is in an unlit status, the layer body under an RGB standard, a color value of the layer body is within a range of R(100-234), G(100-234) and B(100-234), and an absolute value of a difference between any two of R, G and B is less than or equal to a less one of the three or 10% of a greater one of the three.

16. The LED light bulb of claim 7, wherein the layer body comprises titanium dioxide particles, and a weight of titanium dioxide accounts for 0.2%-10% of a total weight of the layer body.

17. The LED light bulb of claim 16, wherein a thickness of the layer body is less than or equal to a thickness of the top layer.

18. The LED light bulb of claim 17, wherein the base layer comprises titanium dioxide and color presented by the base layer and the layer body are in the same RGB value range.

19. The LED light bulb of claim 18, wherein the base layer comprises a fluorescent powder and thermal conductive particles, the thermal conductive particle selects from at least one of aluminum dioxide and silicon dioxide.

20. The LED light bulb of claim 18, wherein the thickness of the base layer is less than or equal to one third of the total thickness of the base layer, the top layer and the layer body.

* * * * *